US008547492B2

(12) United States Patent  
Tsubata

(10) Patent No.: US 8,547,492 B2  
(45) Date of Patent: Oct. 1, 2013

(54) ACTIVE MATRIX SUBSTRATE, LIQUID CRYSTAL PANEL, LIQUID CRYSTAL DISPLAY DEVICE, LIQUID CRYSTAL DISPLAY UNIT AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 210 days.

(21) Appl. No.: 13/146,637

(22) PCT Filed: Oct. 22, 2009

(86) PCT No.: PCT/JP2009/068211  
§ 371 (c)(1),  
(2), (4) Date: Jul. 27, 2011

(87) PCT Pub. No.: WO2010/089922  
PCT Pub. Date: Aug. 12, 2010

(65) Prior Publication Data  
US 2011/0279735 A1    Nov. 17, 2011

(30) Foreign Application Priority Data  
Feb. 3, 2009   (JP) ................................. 2009-022978

(51) Int. Cl.  
G02F 1/1343    (2006.01)
(52) U.S. Cl.  
USPC .......................................................... 349/39
(58) Field of Classification Search  
None  
See application file for complete search history.

(56) References Cited

U.S. PATENT DOCUMENTS

| | | |
|---|---|---|
| 5,808,706 A | 9/1998 | Bae |
| 6,380,591 B1* | 4/2002 | Kawano .................. 257/359 |
| 6,784,949 B1 | 8/2004 | Nagata et al. |
| 2004/0114059 A1 | 6/2004 | Lee et al. |
| 2006/0023137 A1 | 2/2006 | Kamada et al. |
| 2006/0236917 A1 | 10/2006 | Denda |
| 2007/0008444 A1 | 1/2007 | Nakanishi et al. |
| 2007/0024786 A1 | 2/2007 | Tanaka et al. |
| 2007/0070008 A1 | 3/2007 | Shin et al. |
| 2007/0132690 A1 | 6/2007 | Nakanishi et al. |
| 2008/0062108 A1 | 3/2008 | Kim |
| 2008/0062340 A1 | 3/2008 | Um et al. |
| 2008/0067512 A1 | 3/2008 | Lee et al. |
| 2008/0158455 A1 | 7/2008 | Yoo et al. |
| 2009/0027582 A1 | 1/2009 | Ohta et al. |

(Continued)

FOREIGN PATENT DOCUMENTS

| | | |
|---|---|---|
| JP | H6-130412 A | 5/1994 |
| JP | 10-232405 A | 9/1998 |

(Continued)

OTHER PUBLICATIONS

Applicant brings the attention of the Examiner to the following pending U.S. Appl. No. 13/146,636, filed Jul. 27, 2011, which is a national stage of PCT application No. PCT/JP2009/005753 published as WO2010/089820.

*Primary Examiner* — Lucy Chien  
(74) *Attorney, Agent, or Firm* — Chen Yoshimura LLP

(57) ABSTRACT

Provided is an active matrix substrate including a capacitance electrode (47a) electrically connected to a pixel electrode (17a), in which a storage capacitance wiring (18p) is formed in the layer between the capacitance electrode (47a) and the pixel electrode (17a), the capacitance electrode (47a) and the storage capacitance wiring (18p) overlap through a first insulating film and the storage capacitance wiring (18p) and the pixel electrode (17a) overlap through a second insulating film. With this configuration, in the active matrix substrate, the storage capacitance value can be increased without lowering the aperture ratio.

29 Claims, 35 Drawing Sheets

(56) References Cited

U.S. PATENT DOCUMENTS

| | | |
|---|---|---|
| 2010/0045883 A1 | 2/2010 | Kim et al. |
| 2010/0118010 A1 | 5/2010 | Shibasaki et al. |
| 2011/0012941 A1 | 1/2011 | Shin et al. |
| 2011/0128455 A1 | 6/2011 | Tsubata |
| 2011/0279734 A1 | 11/2011 | Tsubata |

FOREIGN PATENT DOCUMENTS

| | | |
|---|---|---|
| JP | 11-202369 A | 7/1999 |
| JP | 2000-323698 A | 11/2000 |
| JP | 2001-223362 A | 8/2001 |
| JP | 2003-91017 A | 3/2003 |
| JP | 2006-39290 A | 2/2006 |
| JP | 2006-276432 A | 10/2006 |
| JP | 2006-330499 A | 12/2006 |
| JP | 2006-330633 A | 12/2006 |
| JP | 2007-086791 A | 4/2007 |
| WO | 2006/100861 A1 | 9/2006 |
| WO | 2010/089820 A1 | 8/2010 |

* cited by examiner

ACTIVE MATRIX SUBSTRATE, LIQUID CRYSTAL PANEL, LIQUID CRYSTAL DISPLAY DEVICE, LIQUID CRYSTAL DISPLAY UNIT AND TELEVISION RECEIVER

TECHNICAL FIELD

The present invention relates to an active matrix substrate equipped with a storage capacitance wiring, and also relates to a liquid crystal display device using such active matrix substrate.

BACKGROUND ART

In a conventionally proposed configuration of a liquid crystal display device, in order to maintain the voltage applied to a pixel electrode, a storage capacitance wiring is provided to form a storage capacitance at a location where the storage capacitance wiring overlaps the pixel electrode. FIG. 37 shows a skeleton framework of an active matrix substrate, illustrating an example of such a configuration. In this illustrated configuration, a storage capacitance wiring 38 is disposed in parallel with the scan signal line 32, and a storage capacitance is formed where the storage capacitance wiring 38 and a pixel electrode 39 overlap. In this configuration, however, the storage capacitance wiring 38 is formed in the same layer as the scan signal line 32. As a result, a gate insulating film, which is an insulating film for the scan signal line 32 and the storage capacitance wiring 38, and an interlayer insulating film, which is an insulating film for a data signal line formed on the gate insulating film, are present between the storage capacitance wiring 38 and the pixel electrode 39. Consequently, a sufficient storage capacitance value cannot be obtained at a location where the storage capacitance wiring 38 overlaps the pixel electrode 39. Also, in order to obtain a greater capacitance value, the line width of the storage capacitance wiring 38 could be increased, but such configuration lowers the aperture ratio.

An example of the technology that can solve the problem is disclosed in Patent Document 1. Patent Document 1 discloses a liquid crystal display device (see FIG. 38) that includes a storage capacitance wiring disposed in parallel with the data signal line.

As shown in FIG. 38, for the active matrix substrate disclosed in Patent Document 1, a storage capacitance wiring 8 is formed on the gate insulating film, and an interlayer insulating film is formed on the storage capacitance wiring 8. As a result, only the interlayer insulating film is present between the storage capacitance wiring 8 and the pixel electrode 9. That is, in comparison to the configuration shown in FIG. 37, the distance between the storage capacitance wiring 8 and the pixel electrode 9 can be shortened by the amount equivalent to the film thickness of the gate insulating film. Consequently, if the area of the overlapping portion of the storage capacitance wiring and the pixel electrode is the same in the configurations of FIG. 37 and FIG. 38, the configuration of FIG. 38 can provide a larger storage capacitance. If the storage capacitance value is the same in the configurations of FIG. 37 and FIG. 38, the configuration of FIG. 38 can provide a thinner storage capacitance wiring, which increases the aperture ratio.

As discussed above, in comparison with the case in which the storage capacitance wiring is disposed in parallel with the scan signal line, in the configuration where the storage capacitance wiring is arranged in parallel with the data signal line, the storage capacitance value can be increased without sacrificing the aperture ratio.

RELATED ART DOCUMENTS

Patent Documents

Patent Document 1: Japanese Patent Application Laid-Open Publication No. H6-130412 (publication date: May 13, 1994)

SUMMARY OF THE INVENTION

Problems to be Solved by the Invention

However, even with the active matrix substrate shown in FIG. 38, in order to further increase the storage capacitance value, the line width of the storage capacitance wiring must be increased, which unavoidably reduces the aperture ratio. For further improvement in the display quality of liquid crystal display devices of recent years, it is important to achieve both a higher aperture ratio and a greater storage capacitance value.

The present invention addresses the issues described above, and presents an active matrix substrate configuration that can provide a greater storage capacitance without lowering the aperture ratio.

Means for Solving the Problems

The present active matrix substrate includes a scan signal line extending in a row direction when a data signal line extend in a column direction, a transistor connected to the data signal line and the scan signal line, and a storage capacitance wiring, wherein a first pixel electrode connected to the data signal line through the transistor is provided in a single pixel region, a first capacitance electrode electrically connected to the first pixel electrode is provided in a single pixel region, the storage capacitance wiring is formed in a layer interposed between the first capacitance electrode and the first pixel electrode, the first capacitance electrode and the storage capacitance wiring overlap with each other through a first insulating film, and the storage capacitance wiring and the first pixel electrode overlap with each other through a second insulating film.

Effects of the Invention

In an active matrix substrate of the present invention, the storage capacitance is composed of a capacitance formed where the first capacitance electrode and the storage capacitance wiring overlap with each other (first capacitance) and a capacitance formed where the storage capacitance wiring and the first pixel electrode overlap with each other (second capacitance). In comparison with a conventional configuration (see FIG. 38), this configuration provides a greater storage capacitance value (increased by the amount of the first capacitance).

Also, because the storage capacitance wiring is formed in the layer between the first capacitance electrode and the first pixel electrode in the above configuration, the first capacitance electrode that forms the first capacitance can be disposed under the storage capacitance wiring. As a result, the aperture ratio is not reduced in contrast to the conventional configuration (see FIG. 38).

That is, in the above configuration, two storage capacitances (the first and second capacitances) are made in the direction of the substrate thickness. Consequently, in comparison to the conventional configuration, storage capacitance value can be increased without lowering the aperture ratio.

DETAILED DESCRIPTION OF EMBODIMENTS

Embodiments of the present invention are described below with reference to FIGS. 1 to 36 and FIGS. 39 to 41. In the description below, it is assumed that the direction in which the scan signal line extends is the row direction, for convenience. Needless to say, however, when a liquid crystal display device equipped with the present liquid crystal panel (or the active matrix substrate used in the liquid crystal panel) is in use (when viewed), the scan signal line can extend either horizontal or vertical direction. Alignment control structures formed on the liquid crystal panel is briefly described as necessary.

Embodiment 1

Figure 1:
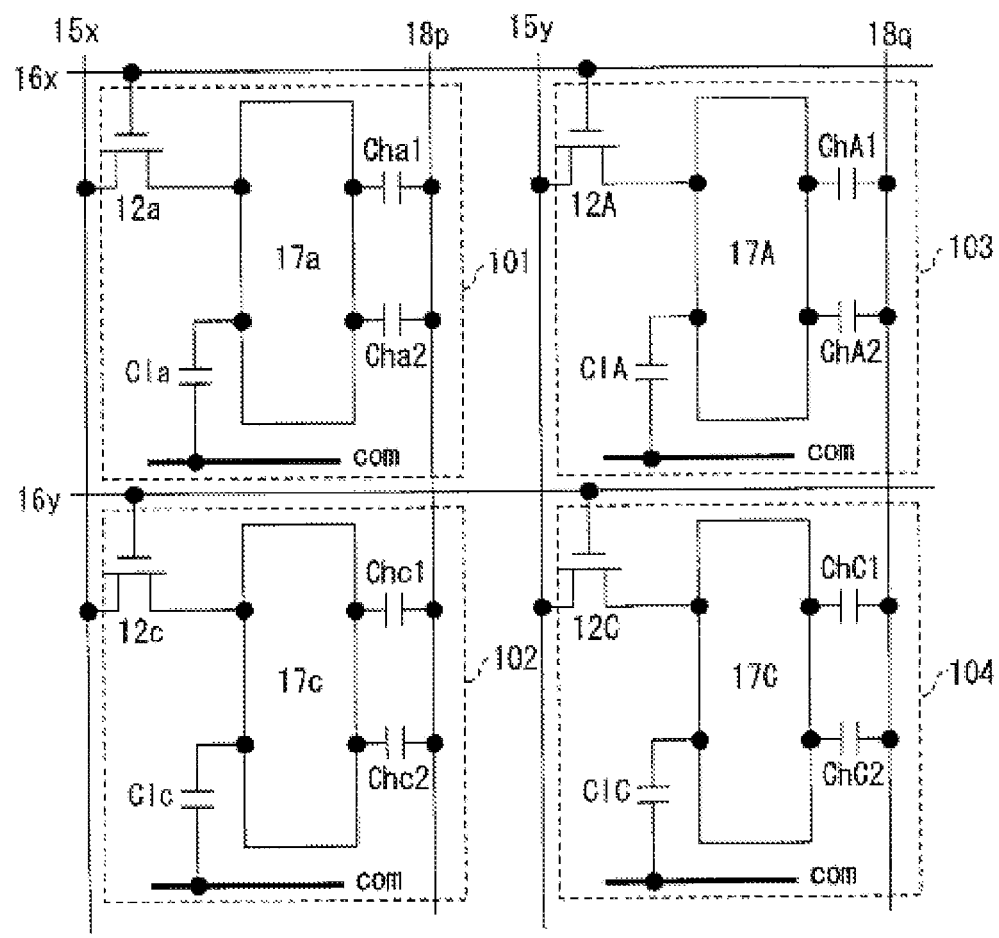
FIG. 1 is an equivalent circuit diagram showing the configuration of the liquid crystal panel according to Embodiment 1.

FIG. 1 is an equivalent circuit diagram showing a part of the liquid crystal panel according to Embodiment 1. As shown in FIG. 1, the present liquid crystal panel includes data signal lines ($15x$ and $15y$) and storage capacitance wirings ($18p$ and $18q$) extending in the column direction (up/down direction in the figure), and scan signal lines ($16x$ and $16y$) extending in the row direction (right/left direction in the figure), pixels (101 to 104) arranged in the column and row directions, and a common electrode (opposite electrode) com. All pixels have an identical structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

In the present liquid crystal panel, one data signal line and one scan signal line are provided for each of the pixels. One pixel electrode (first pixel electrode) is provided in a pixel. A pixel electrode 17a provided in a pixel 101 and a pixel electrode 17c provided in a pixel 102 are arranged in a column; a pixel electrode 17A provided in a pixel 103 and a pixel electrode 17C provided in a pixel 104 are arranged in a column; and pixel electrodes 17a and 17A and pixel electrodes 17c and 17C are adjacent to each other in the row direction.

In the pixel 101, the pixel electrode 17a is connected to a data signal line 15x through a transistor 12a connected to a scan signal line 16x, storage capacitances Cha1 (first capacitance) and Cha2 (second capacitance) are formed between the pixel electrode 17a and a storage capacitance wiring 18p, and a liquid crystal capacitance Cla is formed between the pixel electrode 17a and the common electrode com.

In the pixel 102, which is adjacent to the pixel 101 in the column direction, the pixel electrode 17c is connected to the data signal line 15x through a transistor 12c connected to a scan signal line 16y, storage capacitances Chc1 (first capacitance) and Chc2 (second capacitance) are formed between the pixel electrode 17c and the storage capacitance wiring 18p, and a liquid crystal capacitance Clc is formed between the pixel electrode 17c and the common electrode com.

In a pixel 103, which is adjacent to the pixel 101 in the row direction, pixel electrode 17A is connected to a data signal line 15y through a transistor 12A connected to the scan signal line 16x, storage capacitances ChA1 (first capacitance) and ChA2 (second capacitance) are formed between the pixel electrode 17A and a storage capacitance wiring 18q, and a liquid crystal capacitance ClA is formed between the pixel electrode 17A and the common electrode com.

Figure 2:
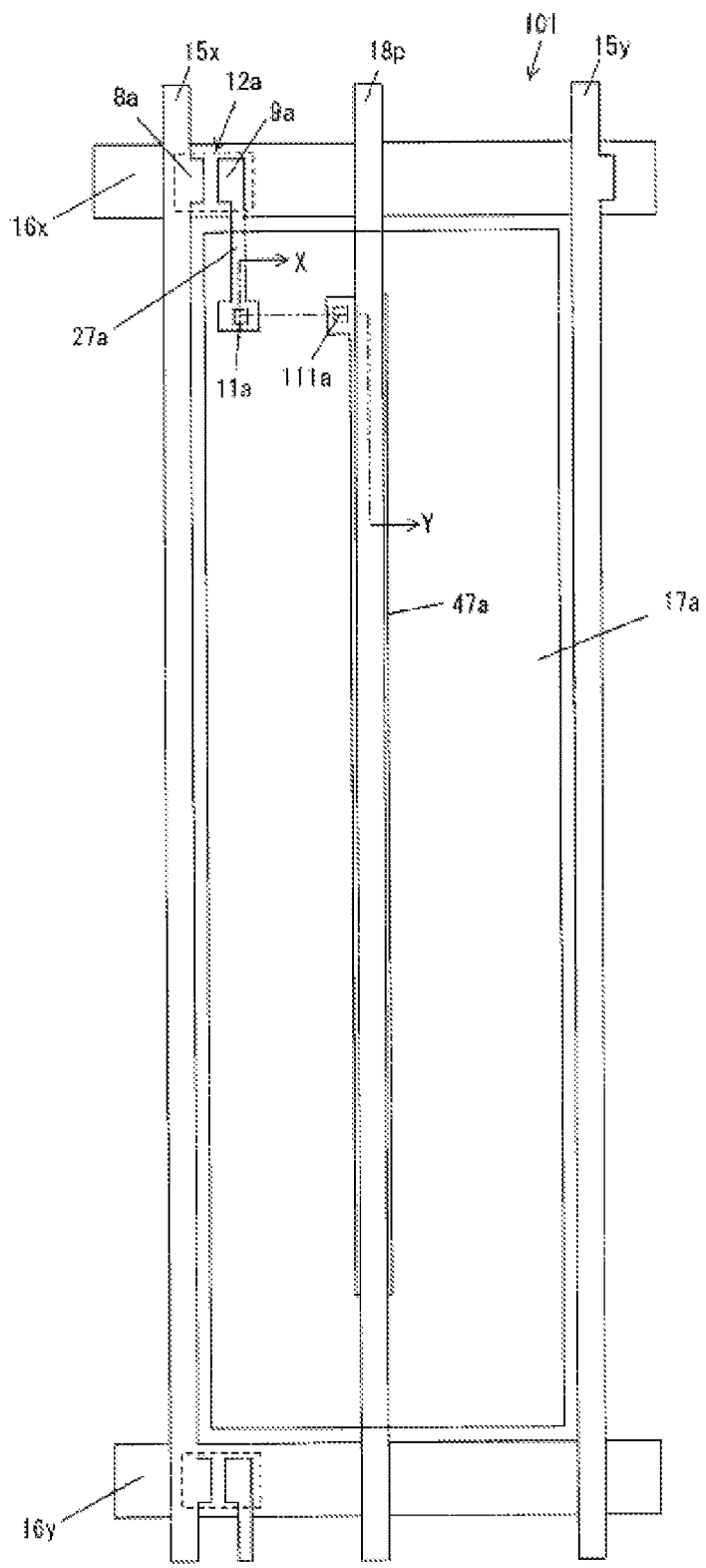
FIG. 2 is a plan view showing a specific example of the liquid crystal panel of FIG. 1.

A specific example of the pixel 101 of FIG. 1 is shown in FIG. 2. As shown in the figure, a transistor 12a is disposed in the vicinity of the intersection of the data signal line 15x and the scan signal line 16x, the rectangular-shaped pixel electrode 17a is provided in a pixel region defined by the signal lines (15x and 16x), and the storage capacitance wiring 18p is disposed vertically across the pixel region in the same layer with and in parallel with the data signal line 15x. Further, in the pixel region, a capacitance electrode 47a (first capacitance electrode) is arranged to overlap with the storage capacitance wiring 18p when observed in a plan view.

Over the scan signal line 16x, a source electrode 8a and a drain electrode 9a of the transistor 12a are formed, and the source electrode 8a is connected to the data signal line 15x. The drain electrode 9a is connected to a drain lead-out electrode 27a, and the drain lead-out electrode 27a is connected to the pixel electrode 17a through a contact hole 11a.

The capacitance electrode 47a is formed under the storage capacitance wiring 18p, in the same layer as the scan signal line 16x, overlaps the storage capacitance wiring 18p through the gate insulating film (first insulating film), and is connected to the pixel electrode 17a through a contact hole 111a. As a result, a storage capacitance Cha1 (see FIG. 1) is formed where the capacitance electrode 47a and the storage capacitance wiring 18p overlap with each other. Also, the storage capacitance wiring 18p and the pixel electrode 17a overlap through an interlayer insulating film (second insulating film), and a storage capacitance Cha2 (see FIG. 1) is formed at the location of the overlap. All other pixels have the same configuration (shapes, arrangement, and connection relationship of respective members) as the pixel 101.

Figure 38:
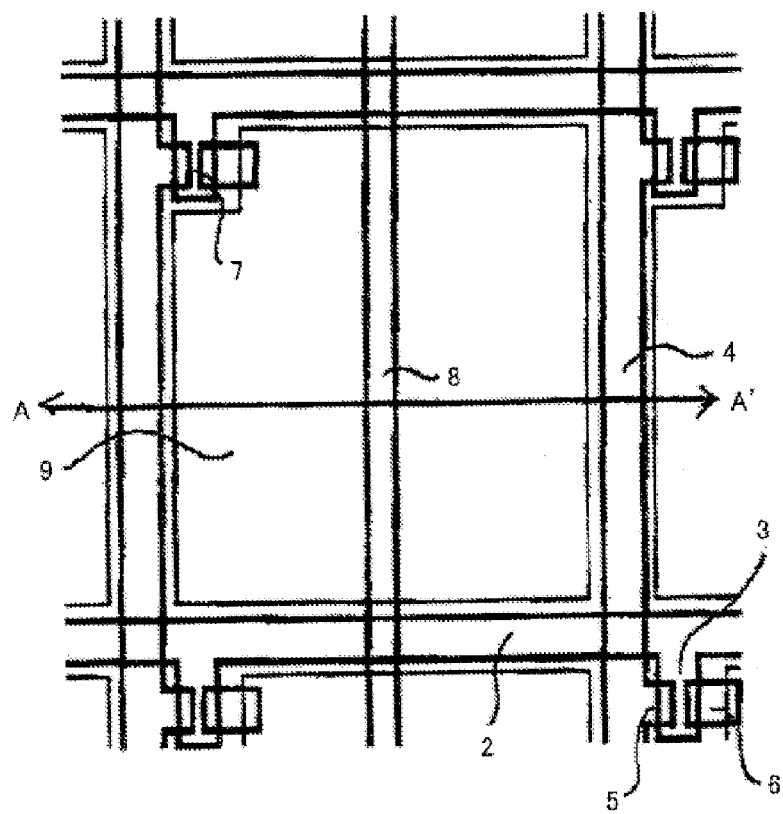
FIG. 38 is a plan view showing the configuration of a conventional liquid crystal panel.

According to this configuration, the storage capacitance value of the pixel 101 is the sum of the storage capacitance Cha1 formed between the capacitance electrode 47a and the storage capacitance wiring 18p and the storage capacitance Cha2 formed between the storage capacitance wiring 18p and the pixel electrode 17a (i.e., Cha1+Cha2). According to a previous configuration (the configuration disclosed in Patent Document 1 shown in FIG. 38, for example), on the other hand, when fit in the configuration of FIG. 2, the storage capacitance value of the pixel 101 is just the storage capacitance Cha2 (second capacitance) formed between the storage capacitance wiring 18p and the pixel electrode 17a. That is, in the present configuration, in comparison to the conventional configuration, the capacitance value can be increased by the amount of the storage capacitance Cha1 (first capacitance) formed between the capacitance electrode 47a and the storage capacitance wiring 18p. As a result, the aperture ratio can be increased without changing the storage capacitance, by reducing the widths of the storage capacitance wiring 18p and the capacitance electrode 47a to make the overlapping area small. Or, the storage capacitance value can be increased without changing the overlapping area (that is, without changing the aperture ratio).

Figure 3:
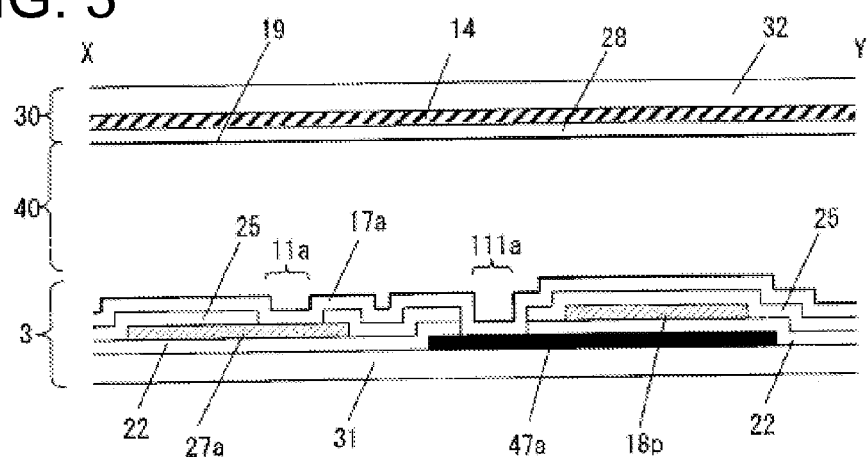
FIG. 3 is a cross-sectional arrow view taken along the line X-Y of FIG. 2.

FIG. 3 is a cross-sectional arrow view taken along the line X-Y of FIG. 2. As shown in the figure, the present liquid crystal panel includes an active matrix substrate 3, a color filter substrate 30 facing the active matrix substrate, and a liquid crystal layer 40 interposed between the substrates (3 and 30).

The active matrix substrate 3 includes a capacitance electrode 47a formed on the glass substrate 31, and an inorganic gate insulating film 22 (first insulating film) formed to cover the capacitance electrode 47a. Although not illustrated, scan signal lines are also formed on the glass substrate 31. Over the inorganic gate insulating film 22, semiconductor layers (i layer and n+ layer; not shown), a source electrode and a drain electrode (both not shown) in contact with the n+ layer, a drain lead-out electrode 27a, and the storage capacitance wiring 18p are formed, and these are covered by an inorganic interlayer insulating film 25 (second insulating film). On the inorganic interlayer insulating film 25, a pixel electrode 17a is formed, and further, an alignment film (not shown) is formed covering the pixel electrode 17a.

Here, in contact hole 11a, the inorganic interlayer insulating film 25 is removed so that the pixel electrode 17a and the drain lead-out electrode 27a are connected together. In contact hole 111a, the inorganic interlayer insulating film 25 and the inorganic gate insulating film 22 are removed so that the pixel electrode 17a and the capacitance electrode 47a are electrically connected together. The capacitance electrode 47a and the storage capacitance wiring 18p overlap with each other through the inorganic gate insulating film 22 to form the storage capacitance Cha1 (see FIG. 1), and the storage capacitance wiring 18p and the pixel electrode 17a overlap with each other through an inorganic interlayer insulating film 25 to form a storage capacitance Cha2 (see FIG. 1).

Also, as shown in FIG. 3, the color filter substrate 30 includes a colored layer 14 formed on the glass substrate 32, a common electrode (com) 28 formed over the colored layer 14, and further, an alignment film 19 formed to cover the common electrode (com) 28.

Figure 4:
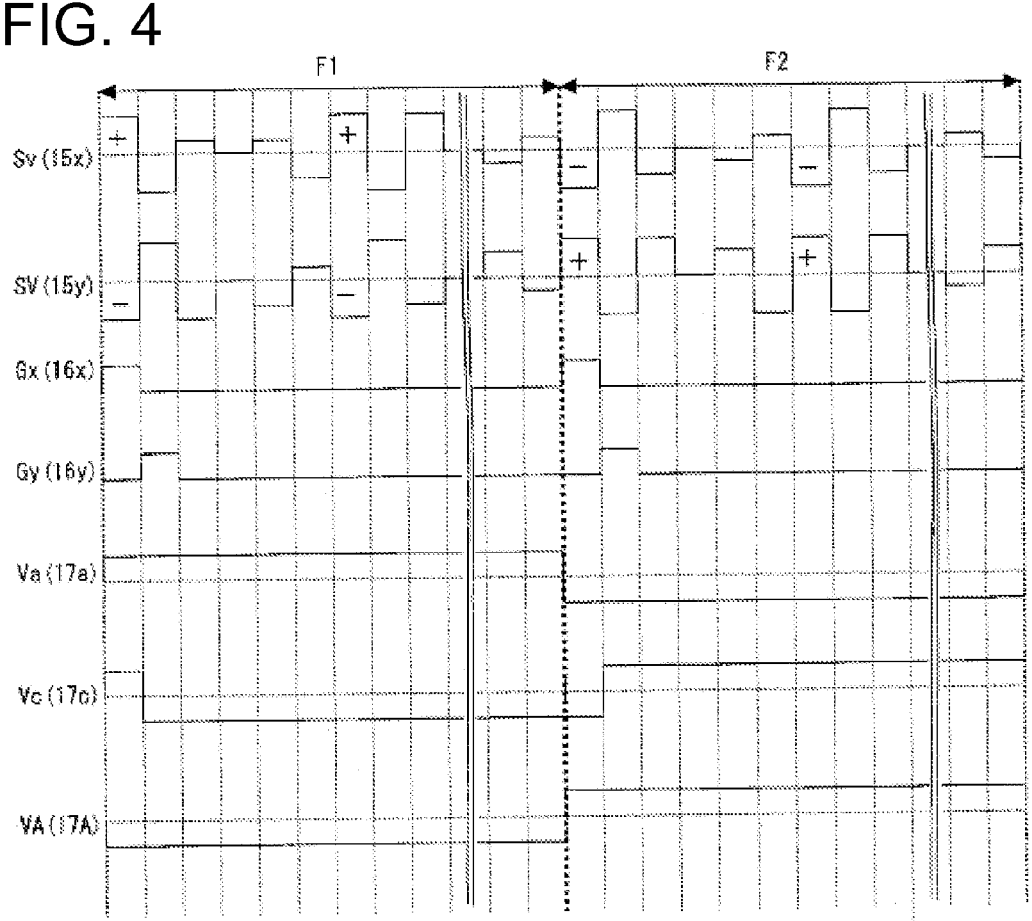
FIG. 4 is a timing chart showing the driving method of the liquid crystal display device equipped with the liquid crystal panel of FIG. 1.

In a liquid crystal display device equipped with the present liquid crystal panel, scan signal line 16x and 16y are selected sequentially in sequential scanning to perform the display operation. FIG. 4 is a timing chart showing the driving method of a present liquid crystal display device (liquid crystal display device operating in the normally black mode) equipped with the liquid crystal panel shown in FIG. 1 and FIG. 2. "Sv" and "SV" respectively denote the signal potentials supplied to two adjacent data signal lines (15x and 15y, for example); "Gx" and "Gy" respectively denote the gate-on pulse signals supplied to the scan signal lines 16x and 16y; and "Va", "VA", and "Vc" respectively denote the electrical potentials of the pixel electrodes 17a, 17A, and 17c.

In this driving method, as shown in FIG. 4, scan signal lines are selected sequentially, the polarity of the signal potential supplied to the data signal lines is reversed in every one horizontal scan period (1H), the polarity of the signal potential supplied during the same horizontal scan period in each frame is reversed for each frame, and during the same horizontal scan period, signal potentials of opposite polarities are supplied to two adjacent data signal lines.

Specifically, in F1 of two consecutive frames F1 and F2, scan signal lines are sequentially selected (for example, the scan signal lines 16x and 16y are selected in this order), and to one of the two neighboring data signal lines (data signal line 15x, for example), a signal potential of positive polarity is supplied during the first horizontal scan period (including the writing period of the pixel electrode 17a, for example), and a signal potential of negative polarity is supplied during the second horizontal scan period (including the writing period of the pixel electrode 17c, for example). To the other of the two data signal lines (data signal line 15y, for example), a signal potential of negative polarity is supplied during the first horizontal scan period (including the writing period of the pixel electrode 17A, for example), and a signal potential of positive polarity is supplied during the second horizontal scan period (including the writing period of the pixel electrode 17C, for example).

In F2, scan signal lines are sequentially selected (for example, the scan signal lines 16x and 16y are selected in this order), and to one of the two neighboring data signal lines (data signal line 15x, for example), a signal potential of negative polarity is supplied during the first horizontal scan period (including the writing period of the pixel electrode 17a, for example), and a signal potential of positive polarity is supplied during the second horizontal scan period (including the writing period of the pixel electrode 17c, for example). To the other of the two data signal lines (data signal line 15y, for example), a signal potential of positive polarity is supplied during the first horizontal scan period (including the writing period of the pixel electrode 17A), and a signal potential of negative polarity is supplied during the second horizontal scan period (including the writing period of the pixel electrode 17C, for example).

For the present liquid crystal panel, silicon nitride (SiNx) is used for the gate insulating film 22 and the interlayer insulating film 25, and the interlayer insulating film 25 is formed thinner than the gate insulating film 22. The thickness of the gate insulating film 22 gives significant influence on the transistor characteristics, and therefore it is not desirable to significantly change this thickness in order to obtain the aforementioned effects such as aperture ratio improvement or an increase in the storage capacitance value. On the other hand, the influence the thickness of the interlayer insulating film 25 (channel protection film) can give to the transistor characteristics is relatively small. For that reason, in order to enhance the aforementioned effects while maintaining the transistor characteristics, the thickness of the interlayer insulating film 25 is preferably made small, and, like the present liquid crystal panel, the thickness of the interlayer insulating film 25 is preferably made smaller than that of the gate insulating film 22. Also obtained is an effect that, if the thickness of the interlayer insulating film 25 is made greater, the dielectric breakdown voltage can be improved while maintaining the transistor characteristics. That is, because the interlayer insulating film 25 allows for a higher level of design freedom compared to the gate insulating film 22, it can be made to a desired thickness.

Figure 5:
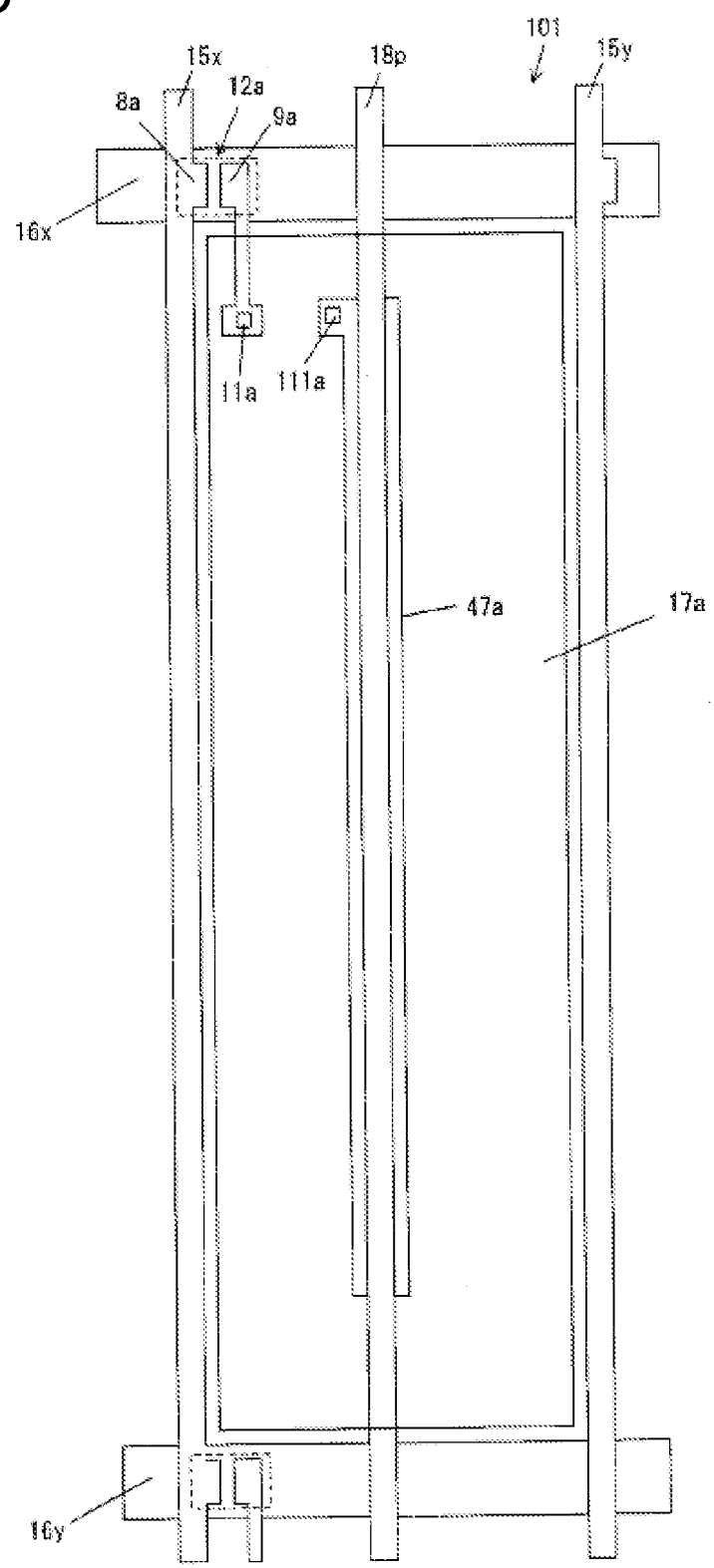
FIG. 5 is a plan view showing another specific example of the liquid crystal panel shown in FIG. 1.

In the present liquid crystal panel, as shown in FIG. 5, the width of the capacitance electrode 47a (the width in the row direction) is preferably greater than the width of the storage capacitance wiring 18p when observed in a plan view. With this configuration, even if the capacitance electrode 47a is misaligned in the row direction, the storage capacitance value does not easily fluctuate (strong resistance to misalignment).

In the present liquid crystal panel, the capacitance electrode 47a is preferably formed of transparent electrode layer such as ITO or IZO. With such capacitance electrode material, the storage capacitance can be increased while reduction in the aperture ratio (transmittance) is suppressed.

With this configuration, even if the area of the capacitance electrode 47a is changed, the transmittance can be maintained constant. Therefore, this configuration is suitable for, for example, a multi-gap type liquid crystal panel (see FIG. 39) in which the liquid crystal layer has different thicknesses for R (red), G (green), and B (blue) pixels. Because a multi-gap type liquid crystal panel has different liquid crystal capacitances for R, G, and B pixels, the lead-in voltage when the transistor is off is different for R, G, and B pixels. This configuration can cause problems such as burning and flickering.

Figure 39:
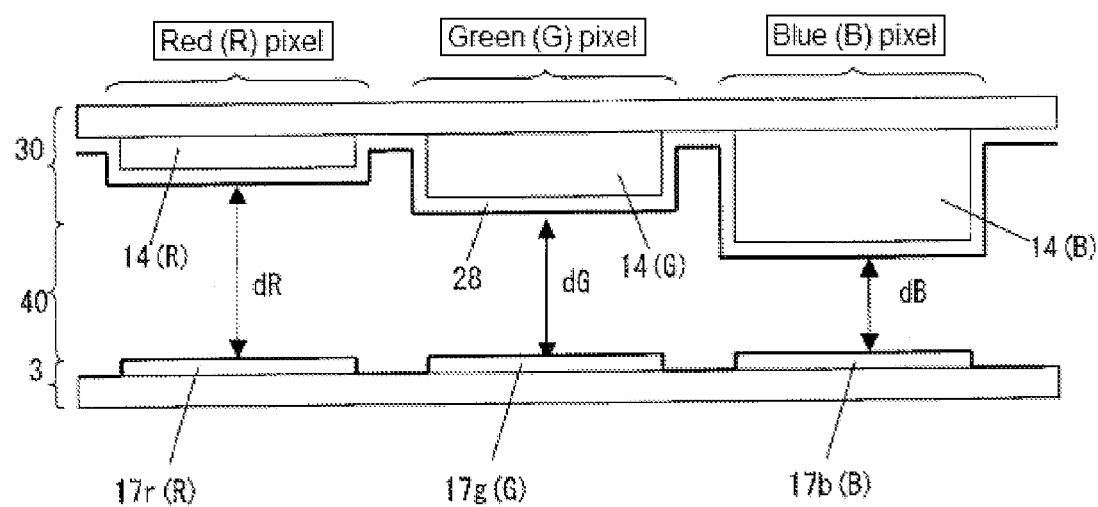
FIG. 39 is a cross-sectional view showing an example of a multi-gap type liquid crystal panel.

For this reason, it is preferable to make the area of the overlapping portion of the capacitance electrode 47a and the storage capacitance wiring 18p different for R, G, and B pixels based on the thicknesses of the liquid crystal layer to obtain different storage capacitance values for R, G, and B pixels. That is, suppose the liquid crystal panel of FIG. 2 is modified to be a multi-gap type liquid crystal panel as shown in FIG. 39, where dR (the thickness of the liquid crystal layer for R pixel)>dG (the thickness of the liquid crystal layer for G pixel)>dB (the thickness of the liquid crystal layer for B pixel), preferably the storage capacitance value is modified for R, G, and B pixels. More specifically, it is preferable that the relation of R pixel storage capacitance>G pixel storage capacitance>B pixel storage capacitance is satisfied. This configuration allows compensation of the variation in the liquid crystal capacitance with the storage capacitance, without changing the aperture ratio (transmittance) of R, G, and B pixels. Consequently, the lead-in voltage can be made consistent for R, G, and B pixels.

Figure 40:
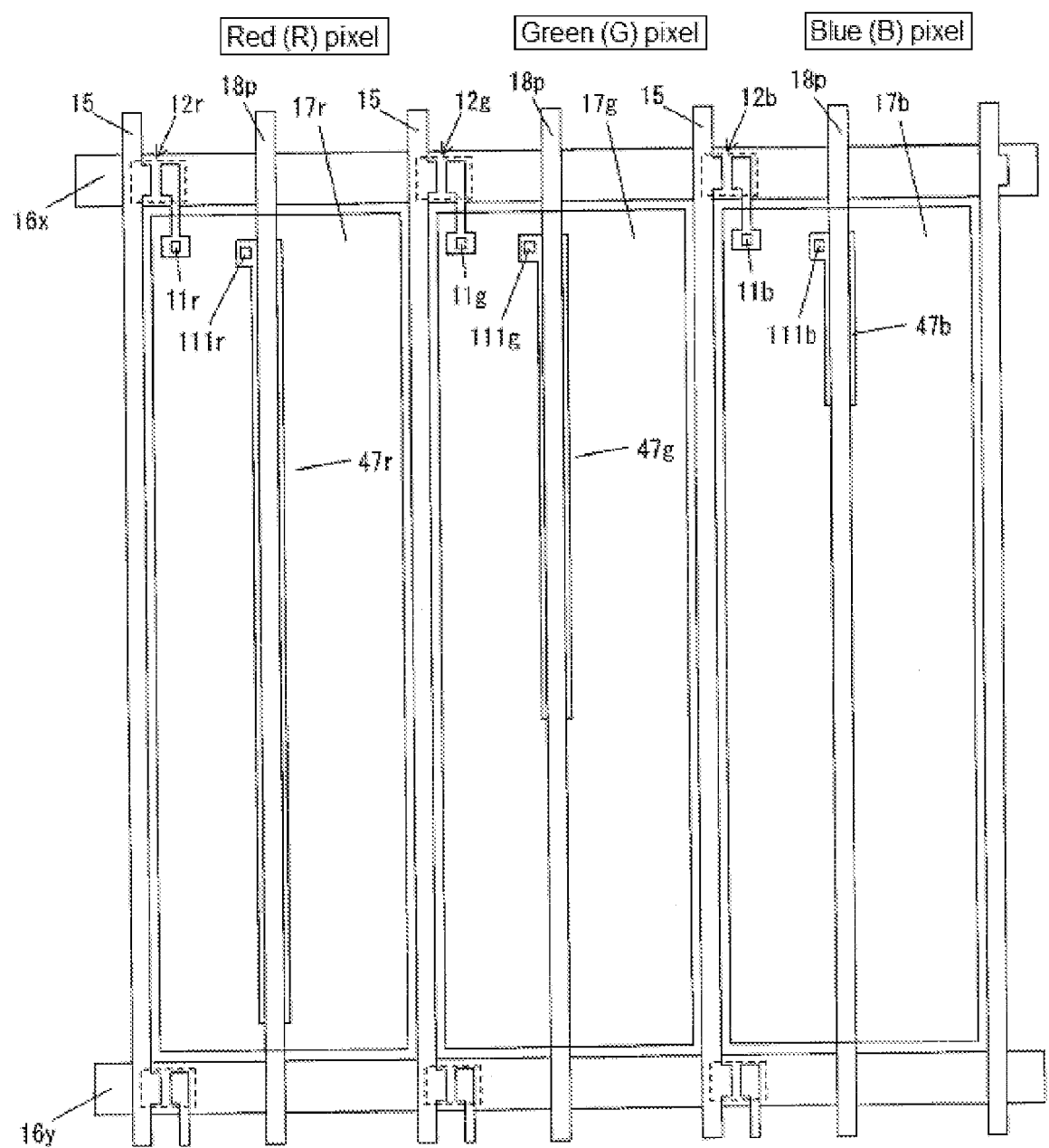
FIG. 40 is a plan view showing a specific example of the liquid crystal panel shown in FIG. 2 as modified into a multi-gap type.

FIG. 40 shows a specific example of the liquid crystal panel of FIG. 2 as modified into the multi-gap type. As shown in FIG. 40, a capacitance electrode 47r is connected to a pixel electrode 17r through a contact hole 111r, a capacitance electrode 47g is connected to a pixel electrode 17g through contact hole 111g, and a capacitance electrode 47b is connected to a pixel electrode 17b through a contact hole 111b. The capacitance electrodes 47r, 47g, and 47b are formed of a transparent electrode layer and have different lengths for R, G, and B pixels, which are arranged adjacent to each other. Specifically, the capacitance electrodes 47r, 47g, and 47b are formed to have lengths that satisfy the relation of 47r (R pixel)>47g (G pixel)>47b (B pixel). With this configuration, different storage capacitance values are obtained for R, G, and B pixels, and as a result, the lead-in voltage can be made consistent for R, G, and B pixels. Because the capacitance electrode is formed of a transparent electrode layer, the transmittance is not lowered, and further, the storage capacitance value can be increased without widening the width of the storage capacitance wiring. Consequently, the aperture ratio is not reduced.

Figure 41:
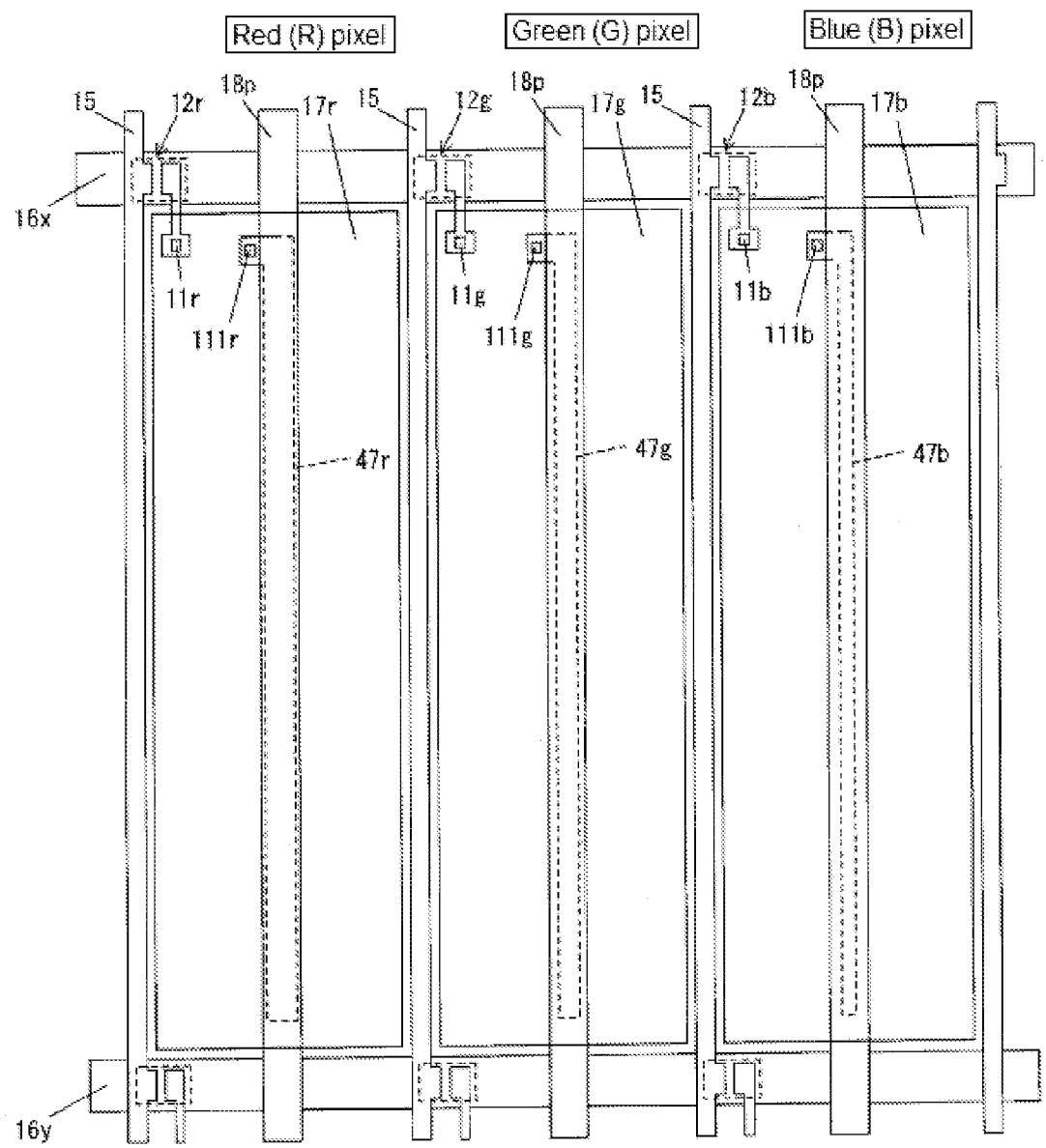
FIG. 41 is a plan view showing another specific example of the liquid crystal panel shown in FIG. 2 as modified into a multi-gap type.

FIG. 41 shows another specific example of a liquid crystal panel of FIG. 2 as modified into a multi-gap type. As shown in FIG. 41, capacitance electrodes (47$r$, 47$g$, and 47$b$) of each pixel are formed such that the two edges of the capacitance electrodes (47$r$, 47$g$, and 47$b$) extending in the column direction fall between the two edges of the storage capacitance wiring 18$p$ extending in the column direction, and the lengths of the capacitance electrodes satisfy the relation of 47$r$ (R pixel)>47$g$ (G pixel)>47$b$ (B pixel). Also in this configuration, different storage capacitance values can be obtained for R, G, and B pixels without affecting the aperture ratio (transmittance). As a result, effects similar to those described above can be obtained.

Next, a method for manufacturing the present liquid crystal panel is described. The method for manufacturing the liquid crystal panel includes the steps of: manufacturing the active matrix substrate; manufacturing the color filter substrate; and assembling the substrates in which the substrates are bonded together and the liquid crystal is filled.

Below, the process of manufacturing an active matrix substrate is described.

First, over a substrate made of glass, plastic, or the like, a metal film of titanium, chrome, aluminum, molybdenum, tantalum, tungsten, copper, or the like, an alloy film of such metals, or a layered film (thickness: 1000 Å-3000 Å) of such metals are deposited by sputtering. Then, patterning is conducted by a photolithographic technology (Photo Engraving Process; hereinafter referred to as "PEP technology") to form scan signal lines, gate electrodes of transistors, (in some cases, scan signal lines also function as gate electrodes), and gate metal layer (capacitance electrode 47$a$).

Next, over the entire substrate with the scan signal lines and the like formed thereon, an inorganic insulating film (thickness: approx. 3000 Å-5000 Å) made of silicon nitride, silicon oxide, or the like is deposited by CVD (Chemical Vapor Deposition) to form a gate insulating film. For example, silicon nitride is deposited while the substrate temperature is kept at 350° C.

Subsequently, an intrinsic amorphous silicon film (thickness: 1000 Å-3000 Å) and an n+amorphous silicon film (thickness: 400 Å-700 Å) doped with phosphorus are continuously deposited over the gate insulating film (over the entire substrate) by CVD. Then, the films are patterned by PEP technology to form an island-shaped multi-layered body of silicon composed of the intrinsic amorphous silicon layer and the n+amorphous silicon layer on the gate electrode.

Next, over the entire substrate with the multi-layered body of silicon formed thereon, a metal film of titanium, chrome, aluminum, molybdenum, tantalum, tungsten, copper, or the like, an alloy film of such metals, or a layered film (thickness: 1000 Å-3000 Å) of such metals is deposited by sputtering. Then, patterning is conducted by the PEP technology to form data signal lines, source electrodes and drain electrodes of transistors, drain lead-out electrode, and storage capacitance wirings.

Further, using the source electrode and the drain electrode as a mask, the n+amorphous silicon layer constituting the multi-layered body of silicon is etched away to form a transistor channel. Here, although the semiconductor layer may be formed of amorphous silicon film as described above, a polysilicon film may alternatively be deposited. Also, the amorphous silicon film or the polysilicon film may optionally be subjected to a laser annealing treatment for improved crystallinity. This treatment makes the electrons in the semiconductor layer move faster, and therefore improves the characteristics of the transistor (TFT).

Next, over the entire substrate with data signal lines and storage capacitance wirings formed thereon, an inorganic insulating film (thickness: 2000 Å-5000 Å) of silicon nitride, silicon oxide, or the like is deposited by CVD to form an inorganic interlayer insulating film. For example, silicon nitride is deposited while the substrate temperature is kept at 250° C.

Subsequently, by PEP technology, the interlayer insulating film, or the interlayer insulating film and the gate insulating film are etched away to form various contact holes. Next, over the entire substrate, on the interlayer insulating film in which contact holes are formed, a transparent conductive film (thickness: 1000 Å-2000 Å) made of ITO (Indium Tin Oxide), IZO (Indium Zinc Oxide), zinc oxide, tin oxide, or the like is deposited by sputtering, and then patterned by PEP technology to form a pixel electrode.

Lastly, a polyimide resin is printed to a thickness of 500 Å to 1000 Å over the entire substrate with the pixel electrodes formed thereon. Then, through baking and a unidirectional rubbing treatment using a rotating cloth, an alignment film is formed. The active matrix substrate is manufactured in this manner.

Below, the process of manufacturing the color filter substrate is described.

First, over a substrate made of glass, plastic, or the like (over the entire substrate), a chrome thin film or a resin containing a black pigment is deposited. Then, using the PEP technology, the film is patterned to form a black matrix. Next, in openings in the black matrix, a color filter layer (thickness: approx. 2 μm) of red, green, and blue is formed by patterning using a pigment dispersing method or the like.

Next, on the color filter layer over the entire substrate, a transparent conductive film (thickness: approx. 1000 Å) made of ITO, IZO, zinc oxide, tin oxide or the like is deposited to form a common electrode (com).

Lastly, a polyimide resin is printed to a thickness of 500 Å to 1000 Å over the entire substrate with the common electrode formed thereon. Then, through baking and a unidirectional rubbing treatment using a rotating cloth, an alignment film is formed. The color filter substrate can be manufactured in this manner.

Below, the assembly process is described.

First, a sealing material made of a thermosetting epoxy resin or the like is applied on either the active matrix substrate or the color filter substrate by screen printing in a frame-like pattern with an opening, which will be the inlet for the liquid crystal. On the other substrate, ball-shaped spacers made of plastic or silica and having a diameter equivalent to the thickness of the liquid crystal layer are dispersed.

Next, the active matrix substrate and the color filter substrate are bonded together, and the sealing material is cured.

Lastly, liquid crystal material is introduced into the space surrounded by the active matrix substrate, the color filter substrate, and the sealing material by a decompression procedure. Then, a UV-curable resin is applied to the inlet for the liquid crystal and is subjected to UV radiation to seal in the liquid crystal material and thereby to form a liquid crystal layer. The liquid crystal panel is manufactured in this manner.

Figure 6:
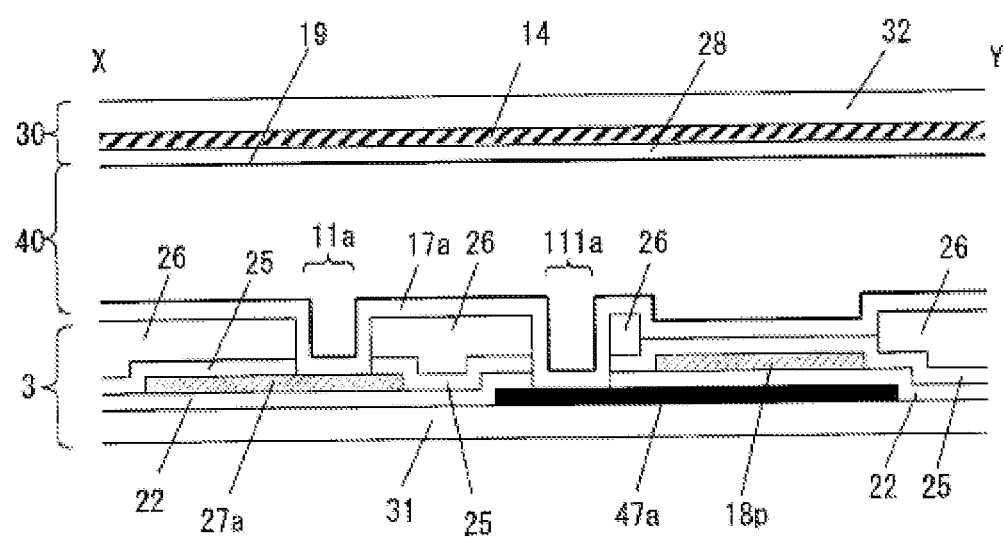
FIG. 6 is a cross-sectional arrow view showing another specific example of FIG. 2, taken along the line X-Y.

The present liquid crystal panel can be configured to include an organic interlayer insulating film 26 provided over an inorganic interlayer insulating film 25 of FIG. 3, where the organic interlayer insulating film 26 is thicker than the inorganic interlayer insulating film 25, to make the channel protection film (interlayer insulating film) double-layer structured, as shown in FIG. 6. This configuration provides effects such as reduction in various parasitic capacitances, prevention of short-circuiting between wirings, and reduction of problems such as torn pixel electrode due to planarization.

The inorganic interlayer insulating film 25, organic interlayer insulating film 26, and contact holes 11a and 111a of FIG. 6 can be formed as described below, for example. That is, after transistors and data signal lines are formed, a mixed gas of $SiH_4$, $NH_3$, and $N_2$ is used to deposit an inorganic interlayer insulating film 25 (passivation film) of SiNx having a thickness of 3000 Å over the entire substrate by CVD. Then, an organic interlayer insulating film 26 made of a positive photosensitive acrylic resin having a thickness of about 3 μm is formed by spin coating or die coating. Next, the organic interlayer insulating film 26 is subjected to photolithography for patterning of portions to be removed and of various contacts. Using the patterned organic interlayer insulating film 26 as a mask, a mixed gas of $CF_4$ and $O_2$ is used to dry-etch the inorganic interlayer insulating film 25 at the location of the contact hole 11a, and also to dry-etch the inorganic interlayer insulating film 25 and a gate insulating film 22 at the location of contact hole 111a. Specifically, for contact hole 11a, for example, the organic insulating film is half-exposed in the photolithography process so that a thin layer of the organic interlayer insulating film remains when development is complete, and for contact hole 111a, the organic insulating film is fully exposed in the photolithography process so that there is no residue of the organic insulating film left when development is complete. Here, when the dry-etching using a mixed gas of $CF_4$ and $O_2$ is conducted, for the location of contact hole 11a, first, the remaining organic interlayer insulating film, and then the inorganic interlayer insulating film 25 are removed. For the location of contact hole 111a, the inorganic interlayer insulating film 25 under the organic interlayer insulating film is removed first, and then, the gate insulating film 22 is removed. The organic interlayer insulating film 26 may be an insulating film made of, for example, SOG (spin-on-glass) material. Also, the organic interlayer insulating film 26 may contain at least any one of acrylic resin, epoxy resin, polyimide resin, polyurethane resin, novolac resin, or siloxane resin.

Figure 7:
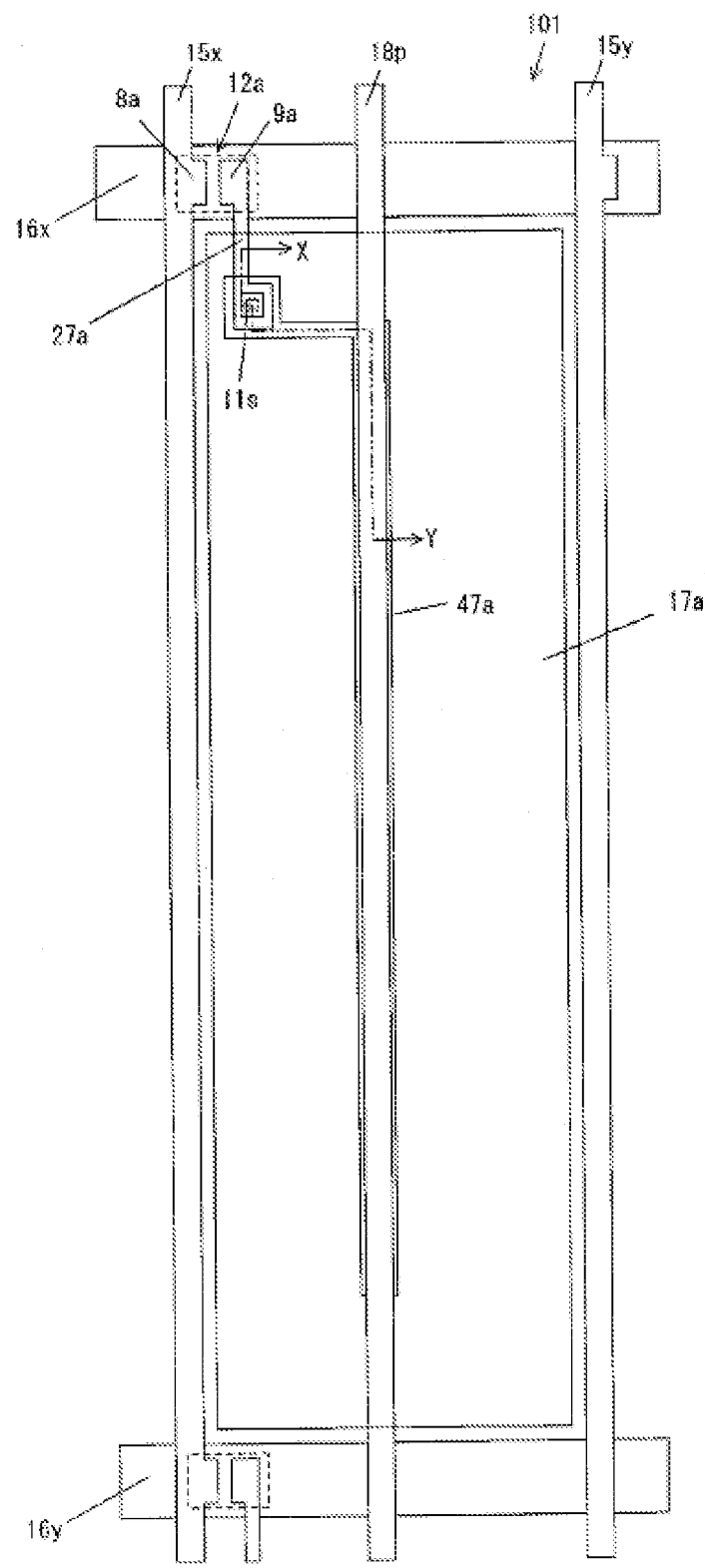
FIG. 7 is a plan view showing another specific example of the liquid crystal panel shown in FIG. 1.

The liquid crystal panel of FIG. 1 can be configured as shown in FIG. 7. That is, the capacitance electrode 47a is extended to a location where it overlaps the drain lead-out electrode 27a, and the capacitance electrode 47a, the drain lead-out electrode 27a, and the pixel electrode 17a are connected together through the contact hole 11s. This way, the two contact holes (11a and 111a) of FIG. 2 can be combined into one contact hole (11s). The liquid crystal alignment tends to be disturbed at locations where contact holes are formed because of the stepped structure of the contact holes, which can make contact holes visually identifiable. By combining the contact holes as described above, the region where the liquid crystal alignment can be disturbed is made smaller, which improves the display quality. When such liquid crystal alignment disturbance is concealed by a light-shielding film (black matrix, for example) or by widened capacitance electrode, the light-shielding area can be reduced by combining the contact holes, and the aperture ratio can be improved accordingly.

Figure 8:
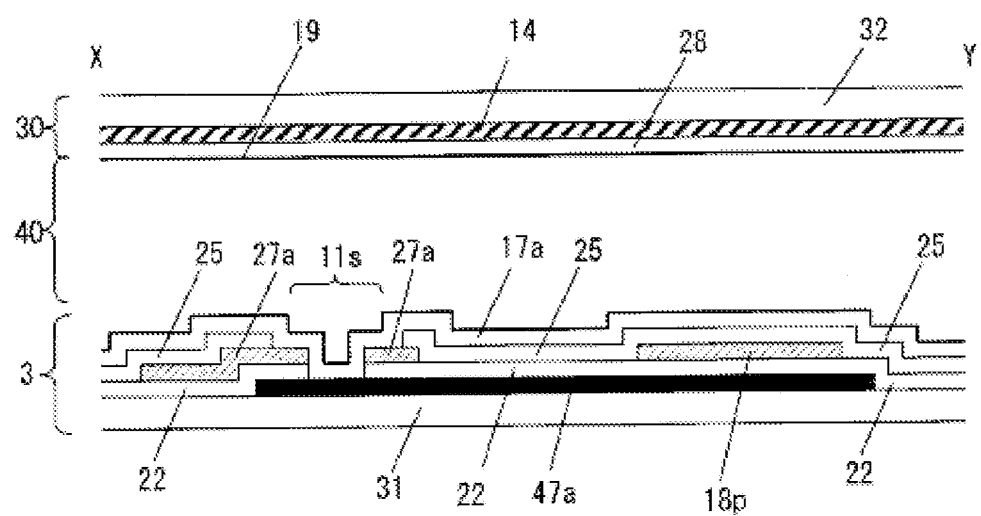
FIG. 8 is a cross-sectional arrow view taken along the line X-Y of FIG. 7.

FIG. 8 is a cross-sectional arrow view taken along the line X-Y of FIG. 7. As shown in the figure, the interlayer insulating film 25 and the gate insulating film 22 are removed in the contact hole 11s, and therefore the capacitance electrode 47a, the drain lead-out electrode 27a, and the pixel electrode 17a are inter-connected. At the location where the contact hole 11s is formed, before the drain lead-out electrode 27a is formed, the gate insulating film 22 is etched away by PEP technology, for example.

Figure 9:
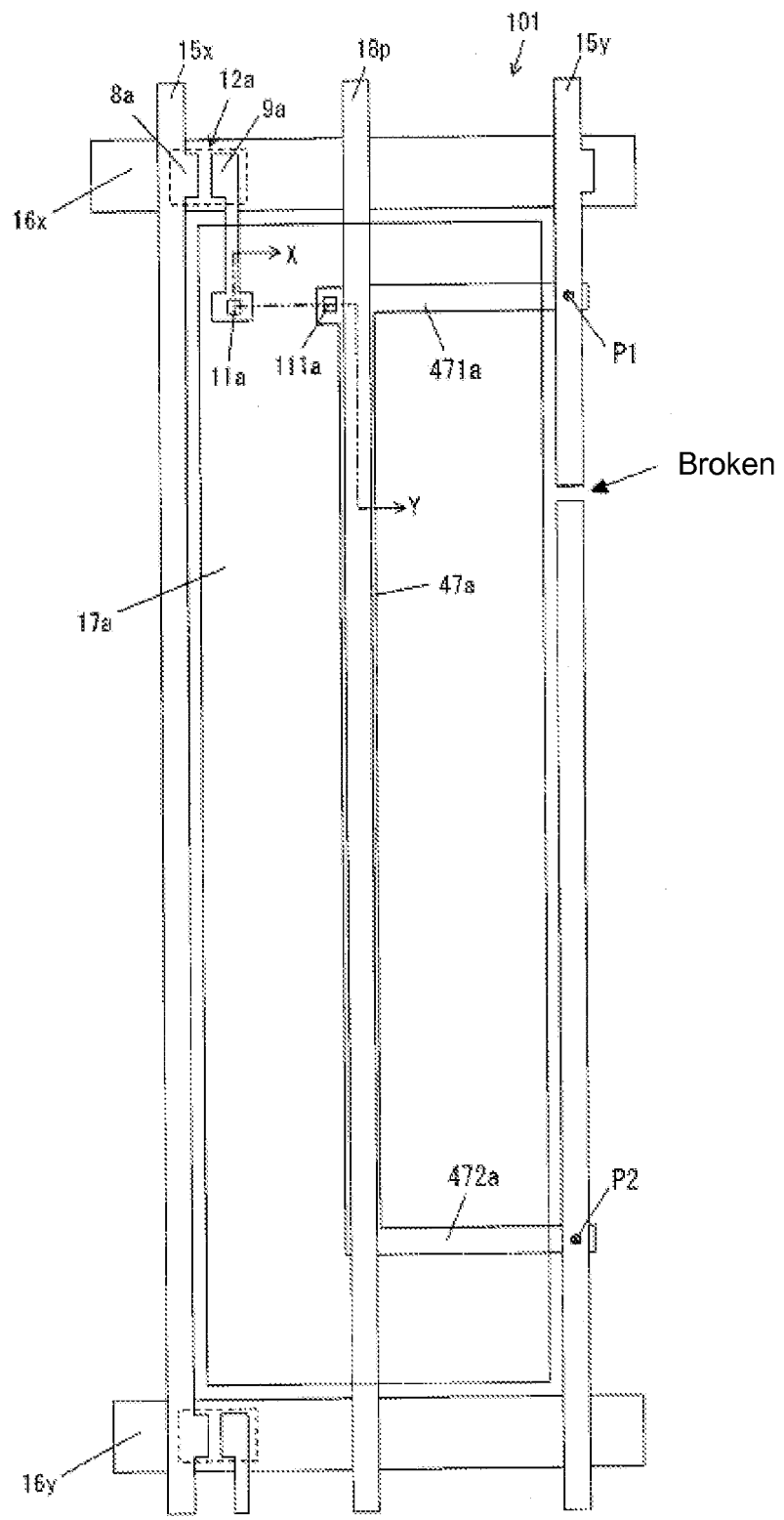
FIG. 9 is a plan view showing another specific example of the liquid crystal panel shown in FIG. 1.

The liquid crystal panel of FIG. 1 can also be configured as shown in FIG. 9. That is, capacitance lead-out electrodes 471a and 472a led out from the capacitance electrode 47a are extended to the location where they overlap with the data signal line 15y. As a result, the capacitance lead-out electrodes 471a and 472a partially overlap the data signal line 15y through the gate insulating film. With this configuration, if a breakage occurs in the data signal line 15y (S breakage), the capacitance lead-out electrodes 471a and 472a, and the capacitance electrode 47a can be used as a bypass for the data signal line 15y. Specifically, if a breakage occurs in the data signal line 15y, the overlapping portion of the capacitance lead-out electrode 471a and the data signal line 15y (P1), and the overlapping portion of the capacitance lead-out electrode 472a and the data signal line 15y (P2) can be melted by laser beam to establish a connection, and a portion of the pixel electrode 17a that corresponds to the inside of the contact hole 111a, which is a connecting portion for the capacitance electrode 47a, is removed (trimmed) by laser or the like. This way, the capacitance electrode 47a can be used as a bypass for the data signal line 15y.

Embodiment 2

Figure 10:
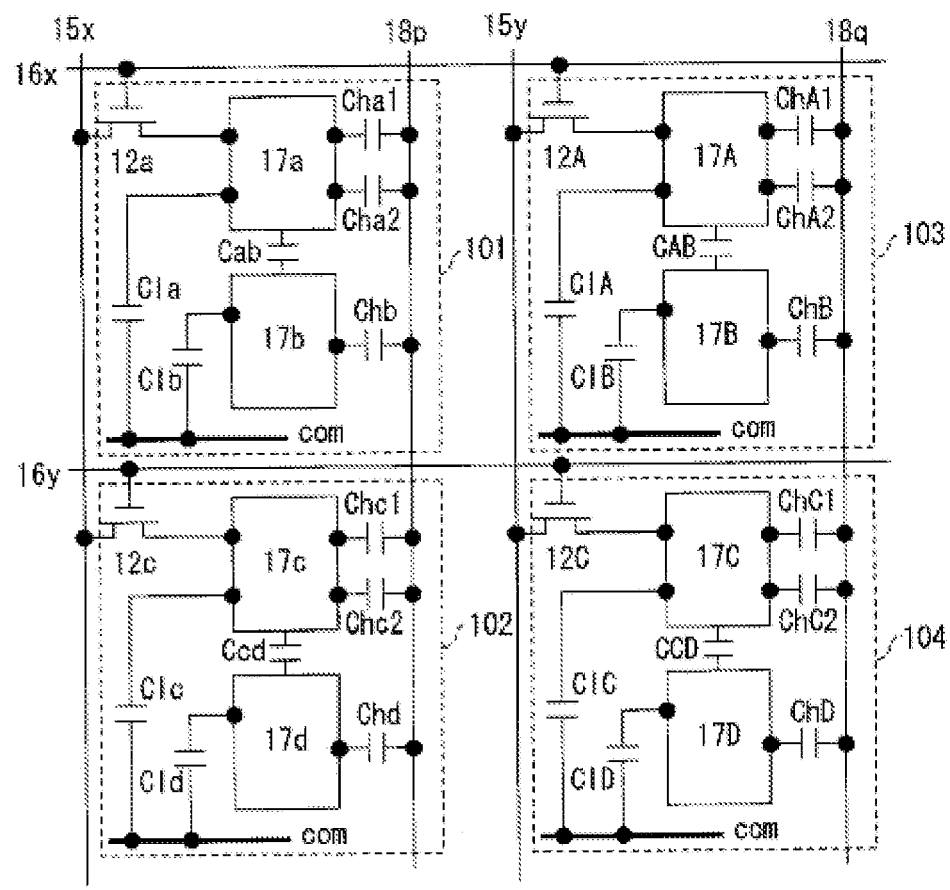
FIG. 10 is an equivalent circuit diagram showing the configuration of the liquid crystal panel according to Embodiment 2.

FIG. 10 is an equivalent circuit diagram showing a part of the liquid crystal panel according to Embodiment 2. As shown in FIG. 10, the present liquid crystal panel includes data signal lines (15x and 15y) extending in the column direction (up/down direction in the figure), scan signal lines (16x and 16y) extending in the row direction (right/left direction in the figure), pixels (101-104) arranged in the row and column directions, storage capacitance wirings (18p and 18q), and a common electrode (opposite electrode) com. All pixels have the same structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

In the present liquid crystal panel, one data signal line and one scan signal line are provided corresponding to each pixel, and two pixel electrodes (first and second pixel electrodes) are arranged in the column direction in each pixel. Two pixel electrodes 17a and 17b provided in pixel 101, and two pixel electrodes 17c and 17d provided in pixel 102 are arranged in a column, and two pixel electrodes 17A and 17B provided in pixel 103 and two pixel electrodes 17C and 17D provided in pixel 104 are arranged in a column. Pixel electrodes 17a and 17A, pixel electrodes 17b and 17B, pixel electrodes 17c and 17C, and pixel electrodes 17d and 17D are adjacent to each other in the row direction. That is, a liquid crystal panel according to Embodiment 2 is a liquid crystal panel of pixel division system in which a plurality of pixel electrodes are provided in a single pixel region.

In a pixel 101, pixel electrodes 17a (first pixel electrode) and 17b (second pixel electrode) are connected to each other through a coupling capacitance Cab; the pixel electrode 17a is connected to a data signal line 15x through a transistor 12a connected to a scan signal line 16x; storage capacitances Cha1 (first capacitance) and Cha2 (second capacitance) are formed between the pixel electrode 17a and a storage capacitance wiring 18p; a storage capacitance Chb is formed between the pixel electrode 17b and the storage capacitance wiring 18p; a liquid crystal capacitance Cla is formed between the pixel electrode 17a and the common electrode com; and a liquid crystal capacitance Clb is formed between the pixel electrode 17b and the common electrode com.

In pixel 102, which is adjacent to the pixel 101 in the column direction, pixel electrodes 17c and 17d are connected to each other through a coupling capacitance Ccd; the pixel electrode 17c is connected to a data signal line 15x through a transistor 12c connected to a scan signal line 16y; storage capacitances Chc1 (first capacitance) and Chc2 (second capacitance) are formed between the pixel electrode 17c and the storage capacitance wiring 18q; a storage capacitance Chd is formed between the pixel electrode 17d and the storage capacitance wiring 18p; a liquid crystal capacitance Clc is formed between the pixel electrode 17c and the common electrode com; and a liquid crystal capacitance Cld is formed between the pixel electrode 17d and the common electrode com.

In pixel 103, which is adjacent to the pixel 101 in the row direction, pixel electrodes 17A and 17B are connected to each other through a coupling capacitance CAB; a pixel electrode 17A is connected to the data signal line 15y through a transistor 12A connected to the scan signal line 16x; storage capacitance ChA1 (first capacitance) and ChA2 (second capacitance) are formed between the pixel electrode 17A and the storage capacitance wiring 18q; a storage capacitance ChB is formed between the pixel electrode 17B and the storage capacitance wiring 18q; a liquid crystal capacitance ClA is formed between the pixel electrode 17A and the common electrode com; and a liquid crystal capacitance ClB is formed between the pixel electrode 17B and the common electrode com.

In a liquid crystal display device equipped with the present liquid crystal panel, scan is performed sequentially, and scan signal lines 16x and 16y are selected sequentially. For example, when the scan signal line 16x is selected, the pixel electrode 17a is connected to the data signal line 15x (through the transistor 12a). Here, the pixel electrode 17a and the pixel electrode 17b are connected to each other through the coupling capacitance Cab. As a result, the relation of $|Va| \geq |Vb|$ is satisfied, where Va is the potential of the pixel electrode 17a after the transistor 12a is turned off and Vb is the potential of pixel electrode 17b after the transistor 12a is turned off (note that "|Vb|," for example, denotes the potential difference between Vb and the com potential=Vcom). Consequently, the sub-pixel including the pixel electrode 17a becomes a bright sub-pixel, and the sub-pixel including the pixel electrode 17b becomes a dark sub-pixel. Half-tone display can be conducted by the area gradation of these bright sub-pixels and dark sub-pixels. With this configuration, the view angle characteristics of the present liquid crystal display device can be improved.

Figure 11:
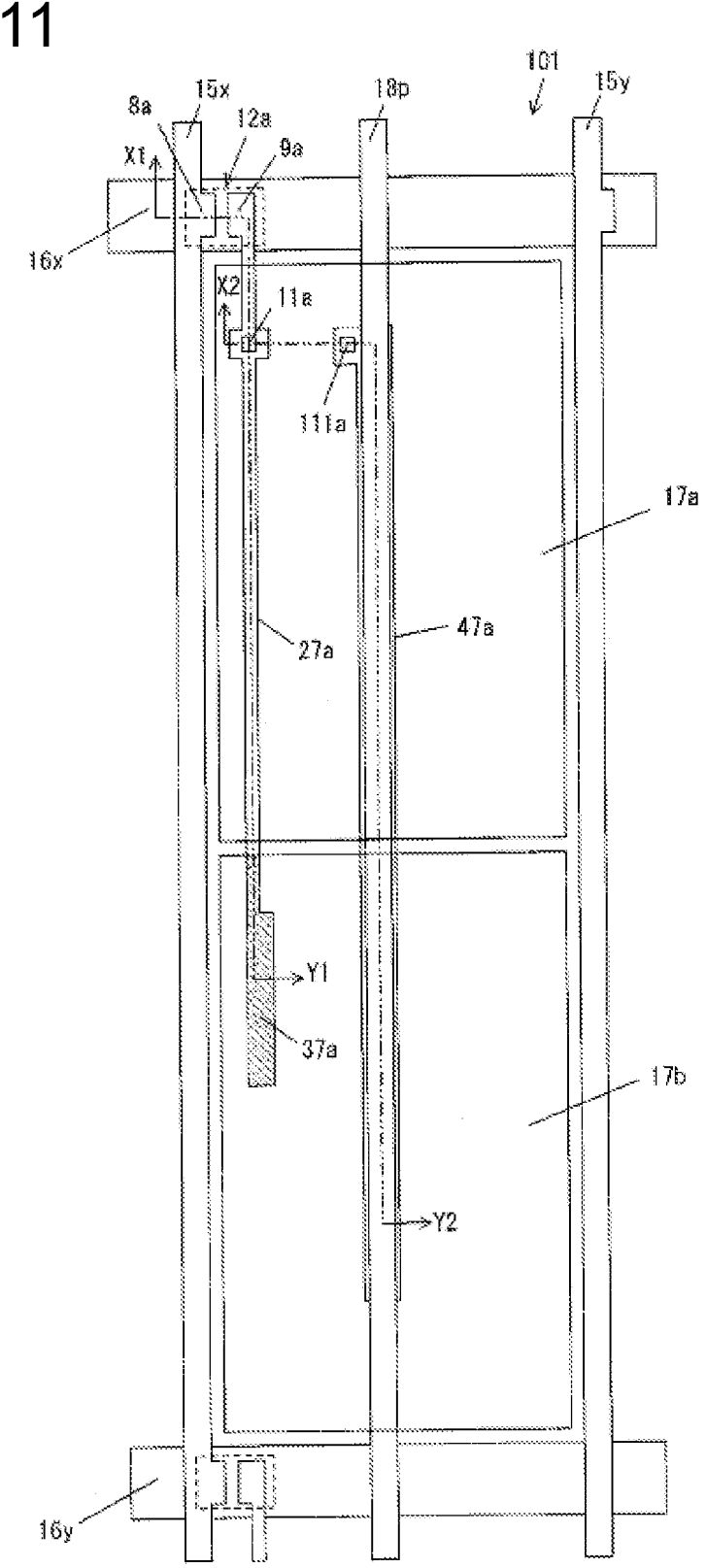
FIG. 11 is a plan view showing a specific example of the liquid crystal panel of FIG. 10.

A specific example of pixel 101 of FIG. 10 is shown in FIG. 11. As shown in the figure, in the proximity of the intersection of the data signal line 15x and the scan signal line 16x, a transistor 12a is disposed, and in the pixel region defined by the signal lines (15x and 16x), a rectangular-shaped pixel electrode 17a (first pixel electrode) and a rectangular-shaped pixel electrode 17b (second pixel electrode) are arranged in the column direction. One of the four sides constituting the perimeter of the first pixel electrode and one of the four sides constituting the perimeter of the second pixel electrode are disposed adjacent to each other. Also, the storage capacitance wiring 18p, which is in the same layer with and in parallel with the data signal line 15x and extending in the column direction, is disposed to overlap with the pixel electrodes 17a and 17b. Further, in the pixel region, a capacitance electrode 47a (first capacitance electrode) is disposed to extend in the column direction and to overlap with the gap between two adjacent sides of the pixel electrodes 17a and 17b, the pixel electrode 17a, the pixel electrode 17b, and the storage capacitance wiring 18p.

Over the scan signal line 16x, a source electrode 8a and a drain electrode 9a of the transistor 12a are formed, and the source electrode 8a is connected to the data signal line 15x. The drain electrode 9a is connected to the drain lead-out electrode 27a; the drain lead-out electrode 27a is connected to a coupling capacitance electrode 37a (second capacitance electrode) formed in the same layer and is also connected to the pixel electrode 17a through the contact hole 11a. The coupling capacitance electrode 37a overlaps the pixel electrode 17b through an interlayer insulating film. At the location of the overlap, a coupling capacitance Cab (see FIG. 10) between the pixel electrodes 17a and 17b is formed.

The capacitance electrode 47a is formed in the same layer with the scan signal line 16x, under the storage capacitance wiring 18p, overlaps the storage capacitance wiring 18p through the gate insulating film, and is connected to the pixel electrode 17a through the contact hole 111a. As a result, a storage capacitance Cha1 (see FIG. 10) is formed where the capacitance electrode 47a overlaps the storage capacitance wiring 18p. Also, the storage capacitance wiring 18p and the pixel electrode 17a overlap with each other through an interlayer insulating film, and at the location of the overlap, a storage capacitance Cha2 (see FIG. 10) is formed. Further, the storage capacitance wiring 18p overlaps the pixel electrode 17b through the interlayer insulating film, and at the location of the overlap, a storage capacitance Chb (see FIG. 10) is formed. Configuration (the shapes and locations of the respective members, and the relation of connection among them) of other pixels is the same as that of the pixel 101.

According to this configuration, the storage capacitance value of the pixel electrode 17a in the pixel 101 is the sum of the storage capacitance Cha1 (first capacitance) formed between the capacitance electrode 47a and the storage capacitance wiring 18p, and the storage capacitance Cha2 (second capacitance) formed between the storage capacitance wiring 18p and the pixel electrode 17a (i.e., Cha1+Cha2). As a result, in the liquid crystal panel of pixel division system, the aperture ratio can be increased without changing the storage capacitance value, by making the widths of the storage capacitance wiring 18p and the capacitance electrode 47a smaller to reduce the overlapping area; and the storage capacitance value can be increased without changing the overlapping area (that is, without changing the aperture ratio).

Figure 12:
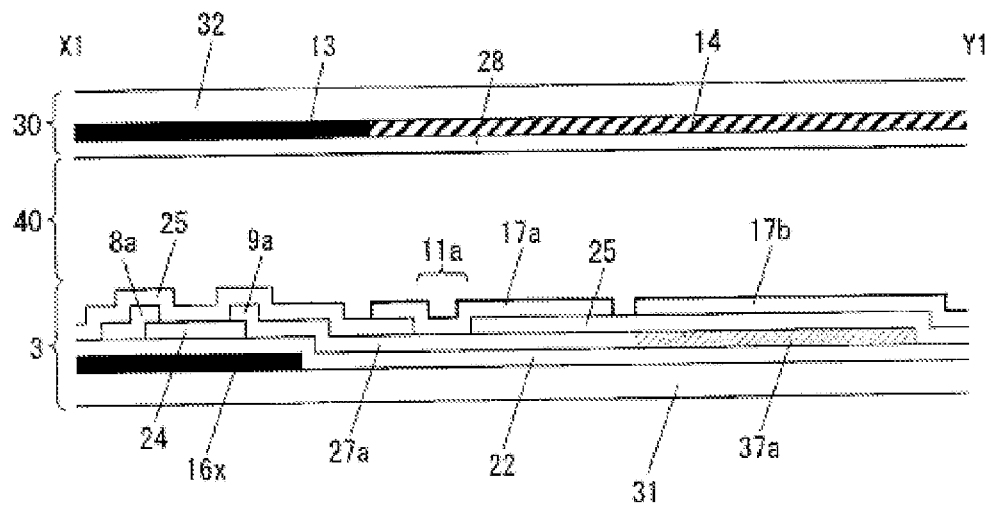
FIG. 12 is a cross-sectional arrow view taken along the line X1-Y1 of FIG. 11.
Figure 13:
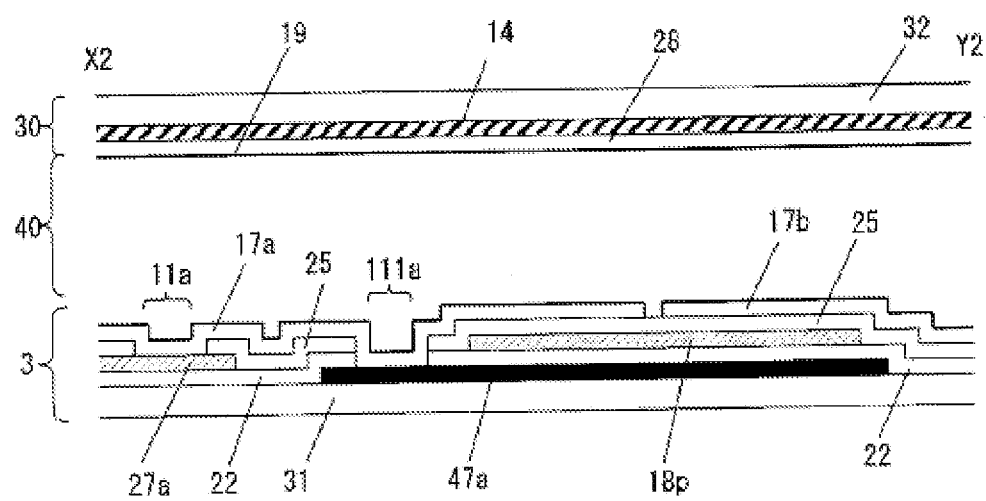
FIG. 13 is a cross-sectional arrow view taken along the line X2-Y2 of FIG. 11.

FIG. 12 and FIG. 13 are cross-sectional arrow views, respectively taken along the line X1-Y1 and the line X2-Y2 of FIG. 11. As shown in the figures, the present liquid crystal panel includes an active matrix substrate 3, a color filter substrate 30 facing the active matrix substrate 3, and a liquid crystal layer 40 interposed between the substrates (3 and 30).

As shown in FIG. 12, the active matrix substrate 3 has a scan signal line 16x formed on the glass substrate 31, and an inorganic gate insulating film 22 is formed to cover the scan signal line 16x. Over the inorganic gate insulating film 22, a semiconductor layer 24 (i-layer and n+ layer), and a source electrode 8a and a drain electrode 9a in contact with the n+ layer, a drain lead-out electrode 27a, and a coupling capacitance electrode 37a (second capacitance electrode) are formed, which are covered by an inorganic interlayer insulating film 25. On the inorganic interlayer insulating film 25, pixel electrodes 17a and 17b are formed, and further, an alignment film (not shown) is formed, covering the pixel electrodes 17a and 17b.

Here, in the contact hole 11a, inorganic interlayer insulating film 25 is removed, and therefore, the pixel electrode 17a and the drain lead-out electrode 27a are connected to each other. Also, the coupling capacitance electrode 37a, which is connected to the drain lead-out electrode 27a in the same layer, overlaps the pixel electrode 17b through the inorganic interlayer insulating film 25 to form a coupling capacitance Cab (see FIG. 10).

As shown in FIG. 13, the active matrix substrate 3 includes a glass substrate 31 with a capacitance electrode 47a formed thereon, and an inorganic gate insulating film 22 formed to cover the capacitance electrode 47a. On the inorganic gate insulating film 22, a drain lead-out electrode 27a connected to drain electrode 9a (FIG. 13), and storage capacitance wiring 18p are formed, and an inorganic interlayer insulating film 25 is formed, covering them. On the inorganic interlayer insulating film 25, pixel electrodes 17a and 17b are formed, and further, an alignment film (not shown) is formed, covering the pixel electrodes 17a and 17b.

Here, in the contact hole 11a, the inorganic interlayer insulating film 25 is removed as described above, and consequently the pixel electrode 17a and the drain lead-out electrode 27a are connected to each other. Also, in contact hole 111a, the inorganic interlayer insulating film 25 and the inorganic gate insulating film 22 are removed, and consequently the pixel electrode 17a and the capacitance electrode 47a are electrically connected to each other. Additionally, the capacitance electrode 47a and the storage capacitance wiring 18p overlap with each other through the inorganic gate insulating film 22, and consequently a storage capacitance Cha1 (see FIG. 10) is formed. Also, the storage capacitance wiring 18p and the pixel electrode 17a overlap with each other through the inorganic interlayer insulating film 25, and consequently a storage capacitance Cha2 (see FIG. 10) is formed. Also, the storage capacitance wiring 18p and the pixel electrode 17b overlap with each other through the inorganic interlayer insulating film 25, and consequently a storage capacitance Chb (see FIG. 10) is formed.

As shown in FIG. 12 and FIG. 13, the color filter substrate 30 includes a glass substrate 32 on which a colored layer 14 is formed. Over the colored layer 14, a common electrode (com) 28 is formed. Further, an alignment film 19 is formed, covering the common electrode (com) 28. Configuration (the shapes and locations of the respective members, and the relation of connection among them) of other pixels is the same as that of the pixel 101.

According to this configuration, the sub-pixel that includes the pixel electrode 17a becomes a bright sub-pixel (hereinafter "BR"), and the sub-pixel that includes the pixel electrode 17b becomes a dark sub-pixel (hereinafter "DA").

Figure 14:
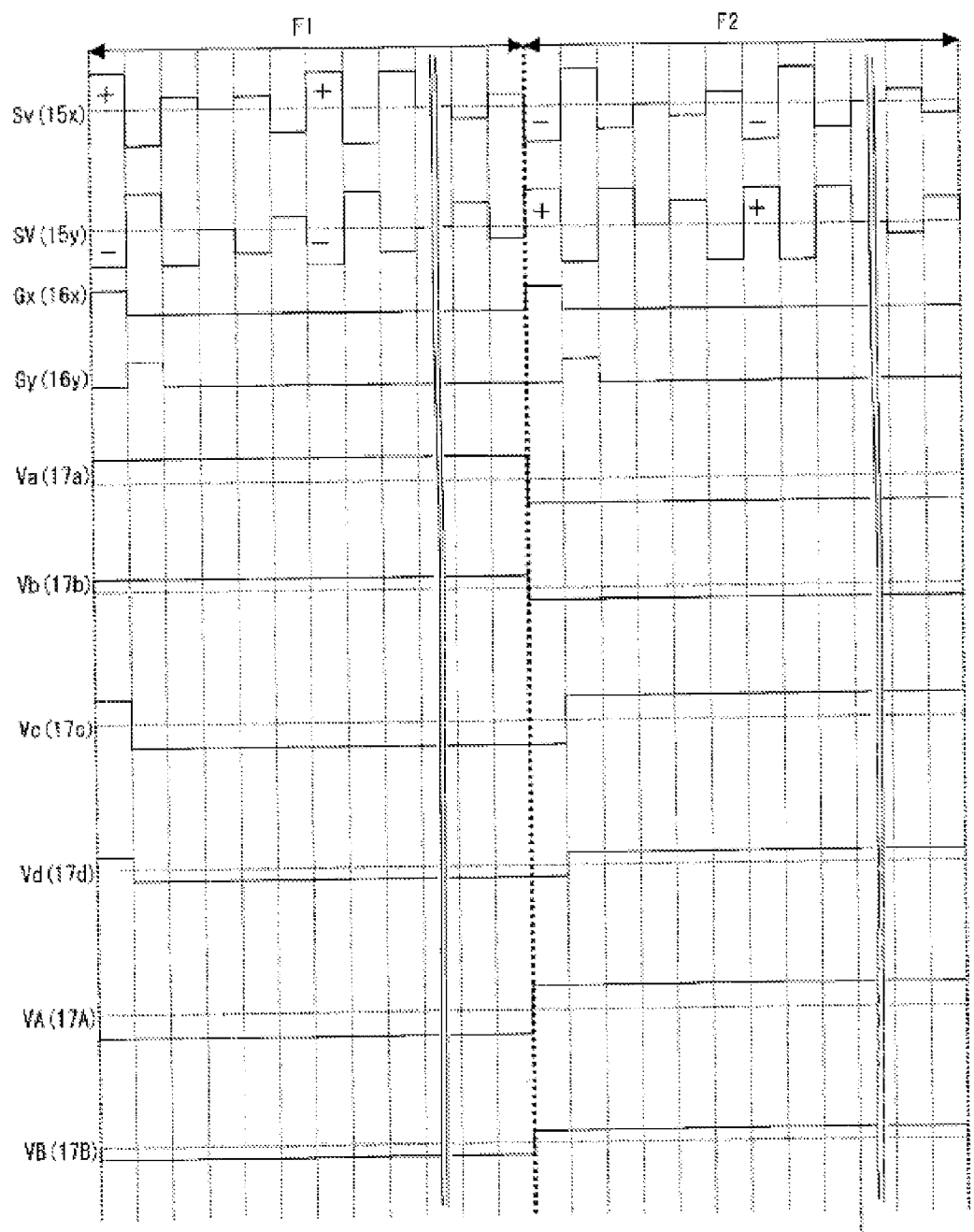
FIG. 14 is a timing chart showing the driving method of the liquid crystal display device equipped with the liquid crystal panel of FIG. 10.
Figure 15:
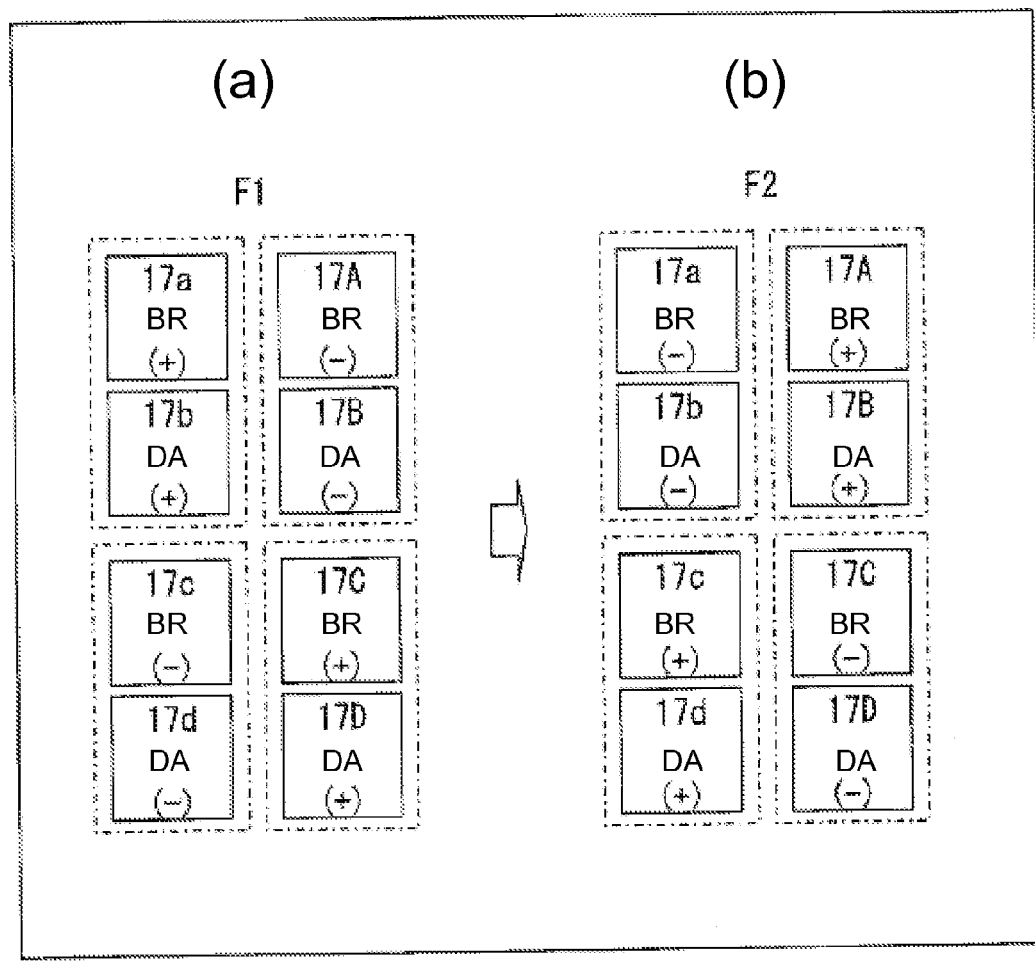
FIG. 15 is a schematic view showing the display state of respective frames when the drive method of FIG. 14 is used for a liquid crystal display device equipped with the liquid crystal panel of FIG. 10.

FIG. 14 is a timing chart showing the driving method of a present liquid crystal display device (liquid crystal display device operating in the normally black mode) equipped with the liquid crystal panel shown in FIG. 10. "Sv" and "SV" respectively denote the signal potentials supplied to two adjacent data signal lines (15x and 15y, for example); "Gx" and "Gy" respectively denote the gate-on pulse signals supplied to the scan signal lines 16x and 16y; and "Va", "Vb", "VA", "VB", "Vc" and "Vd" respectively denote the electrical potentials of the pixel electrodes 17a, 17b, 17A, 17B, 17c, and 17d.

In this driving method, as shown in FIG. 14, scan signal lines are selected sequentially, the polarity of the signal potential supplied to the data signal lines is reversed in every one horizontal scan period (1H), the polarity of the signal potential supplied during the same horizontal scan period in each frame is reversed for each frame, and during the same horizontal scan period, signal potentials of opposite polarities are supplied to two adjacent data signal lines.

Specifically, in F1 of two consecutive frames F1 and F2, scan signal lines are sequentially selected (for example, the scan signal lines 16x and 16y are selected in this order), and to one of the two neighboring data signal lines (data signal line 15x, for example), a signal potential of positive polarity is supplied during the first horizontal scan period (including the writing period of the pixel electrode 17a, for example), and a signal potential of negative polarity is supplied during the second horizontal scan period (including the writing period of the pixel electrode 17c, for example). To the other of the two data signal lines (data signal line 15y, for example), a signal potential of negative polarity is supplied during the first horizontal scan period (including the writing period of the pixel electrode 17A, for example), and a signal potential of positive polarity is supplied during the second horizontal scan period (including the writing period of the pixel electrode 17C, for example). With this configuration, as shown in FIG. 14, relations of $|Va| \geq |Vb|$, $|Vc| \geq |Vd|$, and $|VA| \geq |VB|$ are satisfied, and the sub-pixel that includes the pixel electrode 17a (positive polarity) becomes "BR", the sub-pixel that includes the pixel electrode 17b (positive polarity) becomes "DA", the sub-pixel that includes the pixel electrode 17c (negative polarity) becomes "BR", the sub-pixel that includes the pixel electrode 17d (negative polarity) becomes "DA", the sub-pixel that includes the pixel electrode 17A (negative polarity) becomes "BR", and the sub-pixel that includes the pixel electrode 17B (negative polarity) becomes "DA". FIG. 15(a) shows the overall picture.

In F2, scan signal lines are sequentially selected (for example, the scan signal lines 16x and 16y are selected in this order), and to one of the two neighboring data lines (data signal line 15x, for example), a signal potential of negative polarity is supplied during the first horizontal scan period (including the writing period of the pixel electrode 17a, for example), and a signal potential of positive polarity is supplied during the second horizontal period (including the writing period of the pixel electrode 17c, for example). To the other of the two data signal lines (data signal line 15y, for example), a signal potential of positive polarity is supplied during the first horizontal period (including the writing period of the pixel electrode 17A, for example), and a signal potential of negative polarity is supplied during the second horizontal scan period (including the writing period of pixel electrode 17C, for example). With this configuration, as shown in FIG. 14, relations of $|Va| \geq |Vb|$, $|Vc| \geq |Vd|$, and $|VA| \div |VB|$ are satisfied, and the sub-pixel that includes the pixel electrode 17a (negative polarity) becomes "BR", the sub-pixel that includes the pixel electrode 17b (negative polarity) becomes "DA", the sub-pixel that includes the pixel electrode 17c (positive polarity) becomes "BR", the sub-pixel that includes the pixel electrode 17d (positive polarity) becomes "DA", the sub-pixel that includes the pixel electrode 17A (positive polarity) is "BR", and the sub-pixel that includes the pixel electrode 17B (positive polarity) becomes "DA". FIG. 15(b) shows the overall picture.

Figure 16:
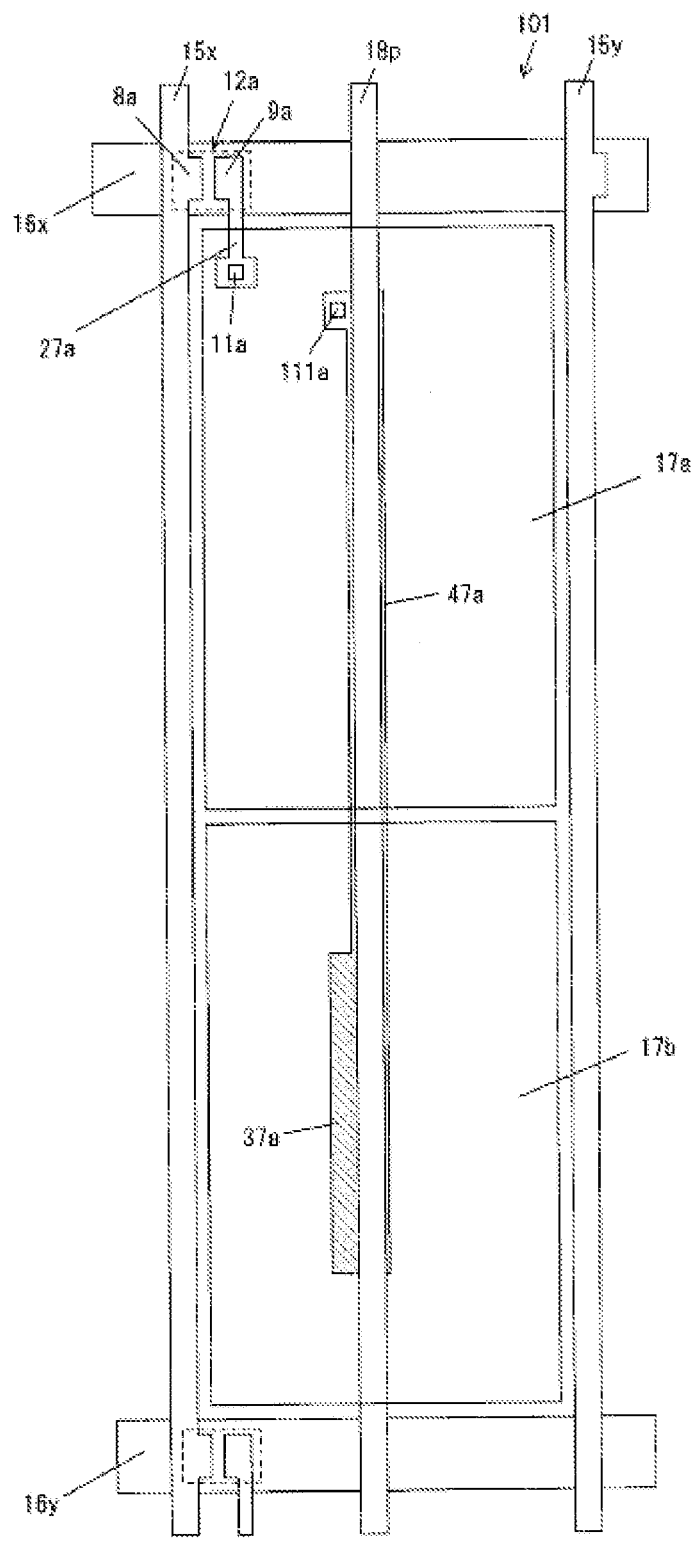
FIG. 16 is a plan view showing another specific example of the liquid crystal panel shown in FIG. 10.

The liquid crystal panel of FIG. 10 can also be configured as shown in FIG. 16. That is, the coupling capacitance electrode 37a is formed such that it extends from the capacitance electrode 47a in the same layer with the capacitance electrode 47a. As a result, the coupling capacitance electrode 37a is connected to the pixel electrode 17a through the contact hole 111a. In this configuration, the coupling capacitance electrode 37a and the pixel electrode 17b overlap with each other through the gate insulating film and the interlayer insulating film to form a coupling capacitance Cab (see FIG. 10). This way, the drain lead-out electrode 27a can be made shorter than in the configuration shown in FIG. 11, and therefore the aperture ratio can be increased.

Figure 17:
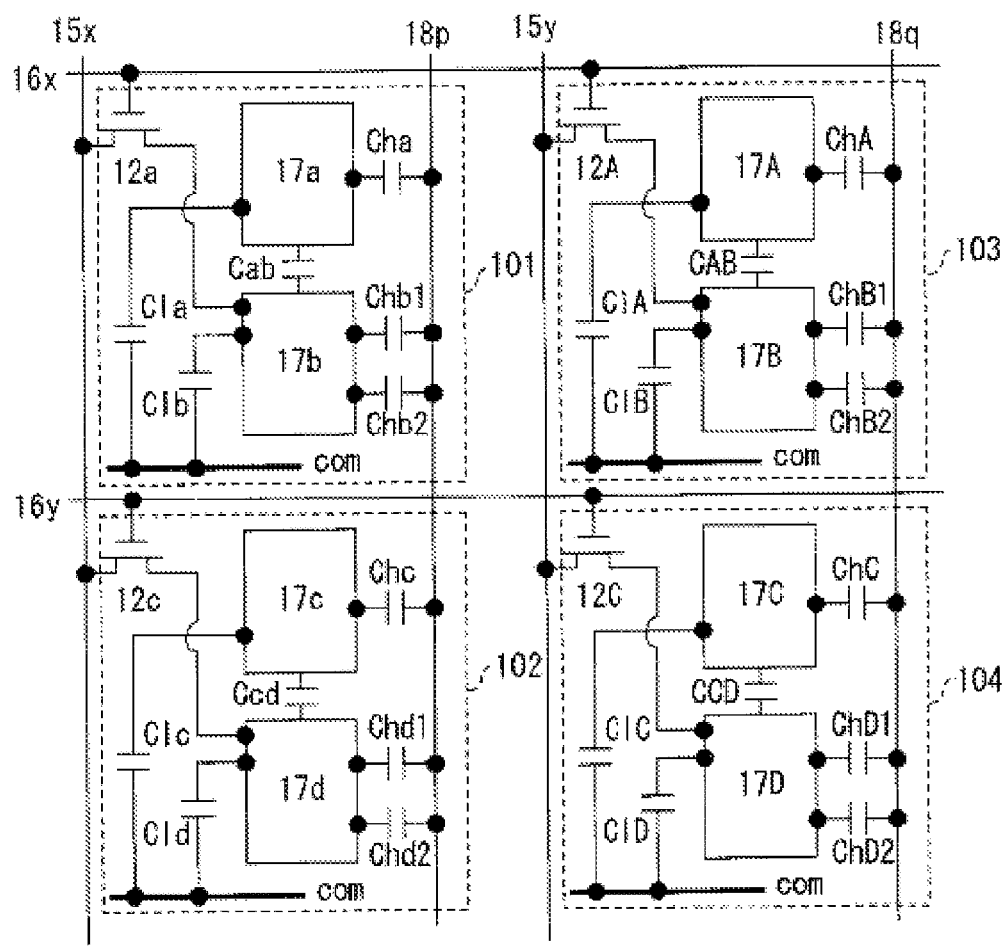
FIG. 17 is an equivalent circuit diagram showing another configuration of the liquid crystal panel according to Embodiment 2.
Figure 18:
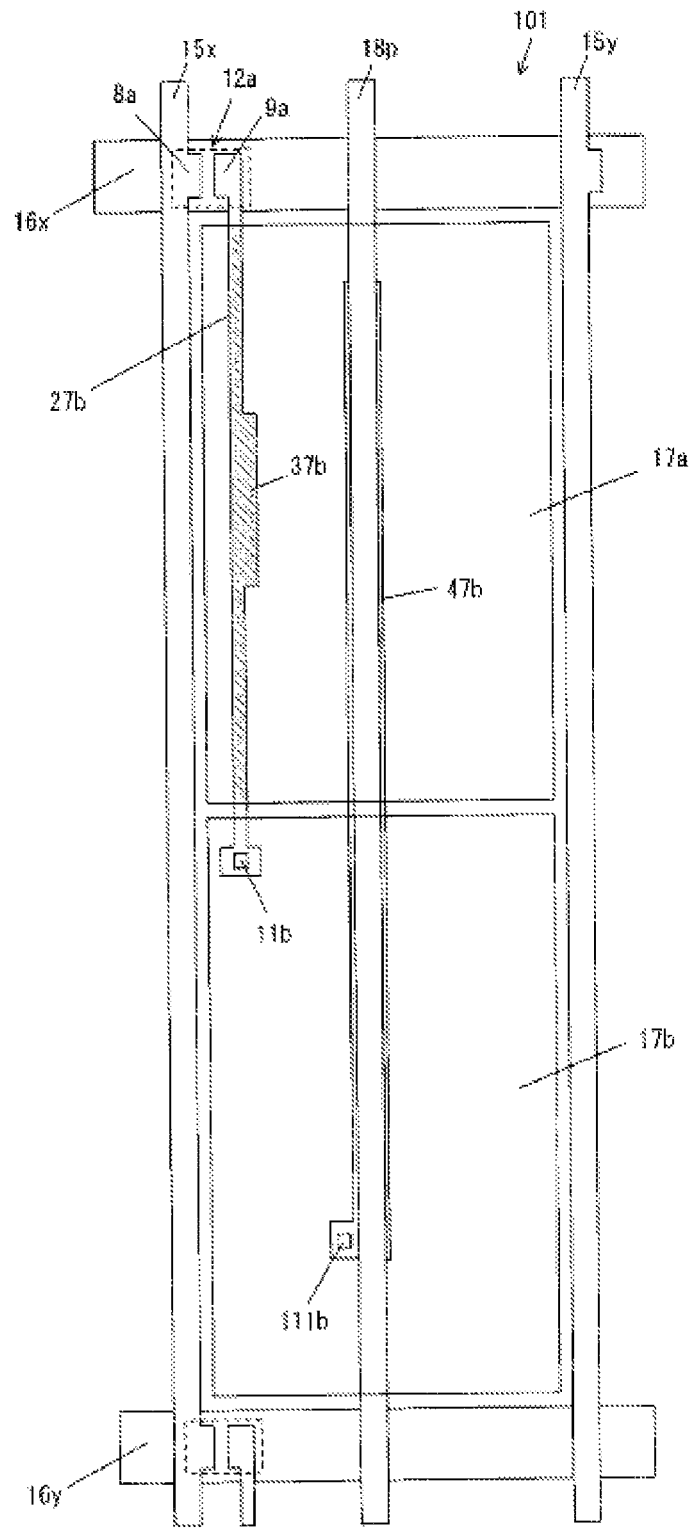
FIG. 18 is a plan view showing a specific example of the liquid crystal panel of FIG. 17.

Here, in the liquid crystal panel of FIG. 10, out of the two pixel electrodes provided in a single pixel, the one proximal to the transistor is connected to the transistor. However, the configuration is not limited to such. As shown in FIG. 17, out of the two pixel electrodes provided in a single pixel, the one distal to the transistor may be connected to the transistor. A specific example of pixel 101 of FIG. 17 is shown in FIG. 18. In the liquid crystal panel shown in FIG. 18, a transistor 12a is disposed in the proximity of the intersection of the data signal line 15x and the scan signal line 16x, and in the pixel region defined by the signal lines (15x and 16x), a rectangular-shaped pixel electrode 17a and a rectangular-shaped pixel electrode 17b are arranged in the column direction, and one of the four sides constituting the perimeter of the first pixel electrode and one of the four sides constituting the perimeter of the second pixel electrode are disposed adjacent to each other. Also, the storage capacitance wiring 18p, which is in the same layer with and in parallel with the data signal line 15x and extending in the column direction, is disposed to overlap with the pixel electrodes 17a and 17b. Further, in the pixel region, the capacitance electrode 47b (first capacitance electrode) is disposed to overlap with the storage capacitance wiring 18p when observed in a plan view.

Over the scan signal line 16x, source electrode 8a and drain electrode 9a of the transistor 12a are formed, and the source electrode 8a is connected to the data signal line 15x. The drain electrode 9a is connected to a drain lead-out electrode 27b, and the drain lead-out electrode 27b is connected to a coupling capacitance electrode 37b formed in the same layer and is connected to the pixel electrode 17b through the contact hole 11b. The coupling capacitance electrode 37b overlaps the pixel electrode 17a through an interlayer insulating film. At the location of the overlap, a coupling capacitance Cab (see FIG. 17) between the pixel electrodes 17a and 17b is formed.

The capacitance electrode 47b is formed in the same layer with the scan signal line 16x, under the storage capacitance wiring 18p. It overlaps with storage capacitance wiring 18p via the gate insulating film, and is connected to the pixel electrode 17b through the contact hole 111b. As a result, a storage capacitance Chb1 (see FIG. 17) is formed where the capacitance electrode 47b and the storage capacitance wiring 18p overlap with each other. Also, the storage capacitance wiring 18p and the pixel electrode 17b overlap with each other through an interlayer insulating film, and a storage capacitance Chb2 (see FIG. 17) is formed at the location of the overlap. Further, the storage capacitance wiring 18p and the pixel electrode 17a overlap with each other through the interlayer insulating film, and a storage capacitance Cha (see FIG. 17) is formed at the location of the overlap. Configuration (the shapes and locations of the respective members, and the relation of connection among them) of other pixels is the same as that of the pixel 101.

For the liquid crystal panel of FIG. 17, the sub-pixel that includes the pixel electrode 17a becomes "DA", and the sub-pixel that includes the pixel electrode 17b becomes "BR".

Figure 19:
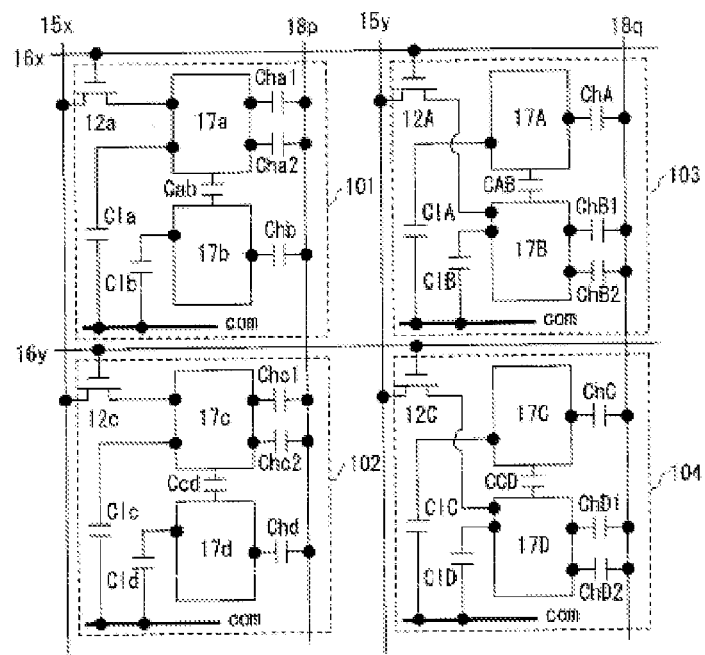
FIG. 19 is an equivalent circuit diagram showing another configuration of the liquid crystal panel according to Embodiment 2.
Figure 20:
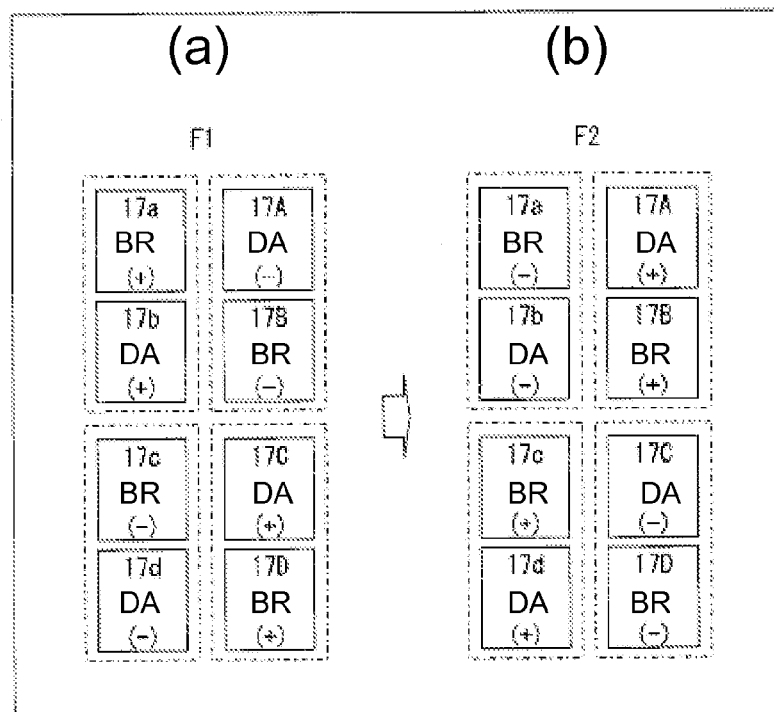
FIG. 20 is a schematic view showing the display state of respective frames when the drive method of FIG. 14 is used for a liquid crystal display device equipped with the liquid crystal panel of FIG. 19.

The liquid crystal panel of FIG. 10 may be configured as shown in FIG. 19. In FIG. 19, in one of the two adjacent pixels in the row direction, the pixel electrode proximal to the transistor is connected to the transistor, and in the other pixel, the pixel electrode distal to the transistor is connected to the transistor.

In the liquid crystal display device equipped with the liquid crystal panel of FIG. 19, when the data signal lines 15x and 15y are driven as shown in FIG. 14, in frame F1, the sub-pixel that includes the pixel electrode 17a (positive polarity) becomes "BR", the sub-pixel that includes the pixel electrode 17b (positive polarity) becomes "DA", the sub-pixel that includes the pixel electrode 17c (negative polarity) becomes "BR", the sub-pixel that includes the pixel electrode 17d (negative polarity) becomes "DA", the sub-pixel that includes the pixel electrode 17A (negative polarity) becomes "DA", and the sub-pixel that includes the pixel electrode 17B (negative polarity) becomes "BR". FIG. 20(a) shows the overall picture. In frame F2, the sub-pixel that includes the pixel electrode 17a (negative polarity) becomes "BR", the sub-pixel that includes the pixel electrode 17b (negative polarity) becomes "DA", the sub-pixel that includes the pixel electrode 17c (positive polarity) becomes "BR", the sub-pixel that includes the pixel electrode 17d (positive polarity) becomes "DA", and the sub-pixel that includes the pixel electrode 17A (positive polarity) becomes "DA", and the sub-pixel that includes the pixel electrode 17B (positive polarity) becomes "BR". FIG. 20(b) shows the overall picture.

In the liquid crystal panel of FIG. 19, because no two bright sub-pixels are arranged side by side in the row direction and no two dark sub-pixels are arranged side by side in the row direction, uneven streaks in the row direction can be suppressed.

Figure 21:
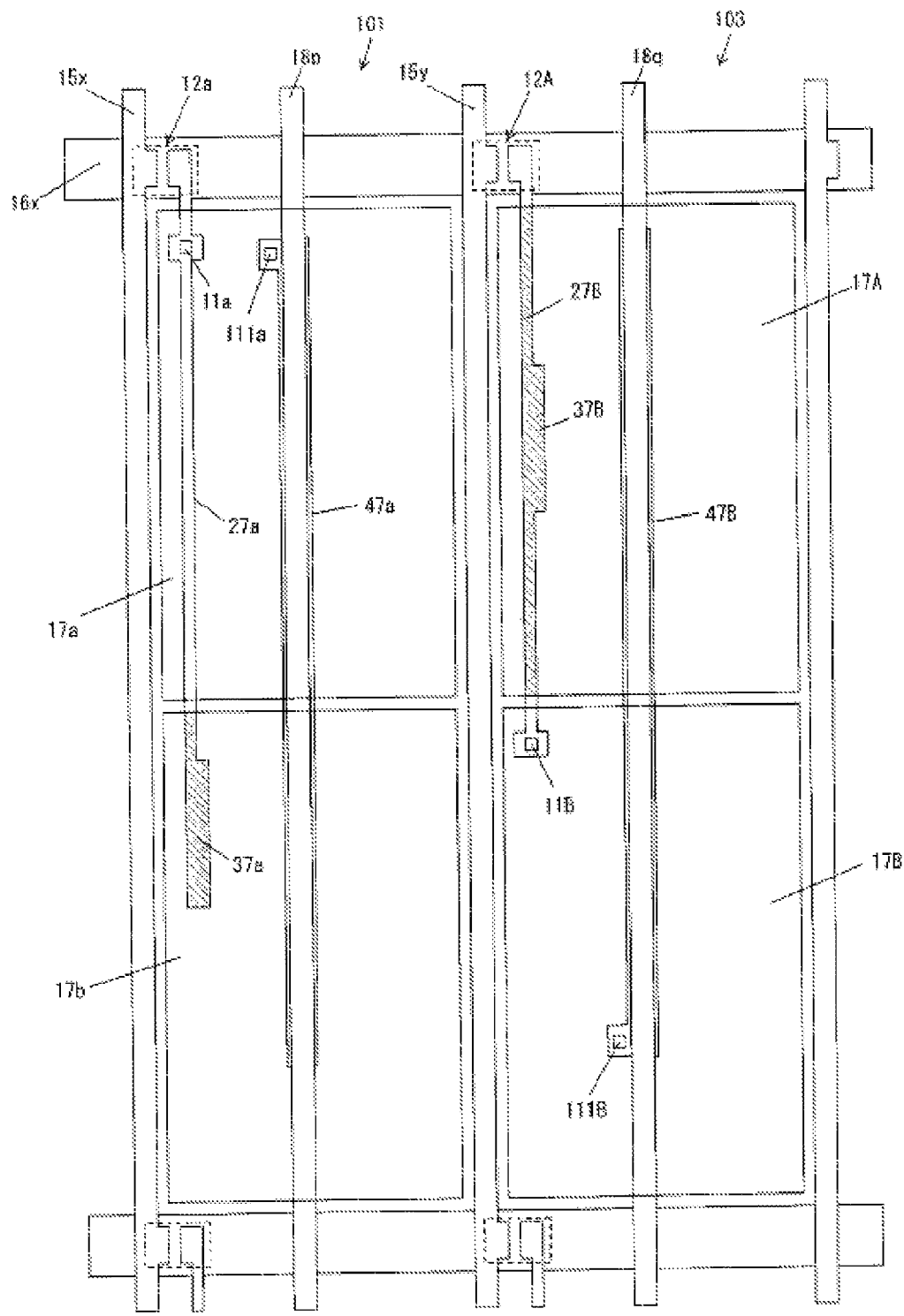
FIG. 21 is a plan view showing a specific example of the liquid crystal panel of FIG. 19.

A specific example of pixels 101 and 103 of FIG. 19 is shown in FIG. 21. As shown in the figure, the configuration of pixel 101 of the present liquid crystal panel is the same as that of FIG. 11 described above, and the configuration of pixel 103 is the same as that of FIG. 18 described above. For this reason, detailed explanation of the configurations is omitted.

Figure 22:
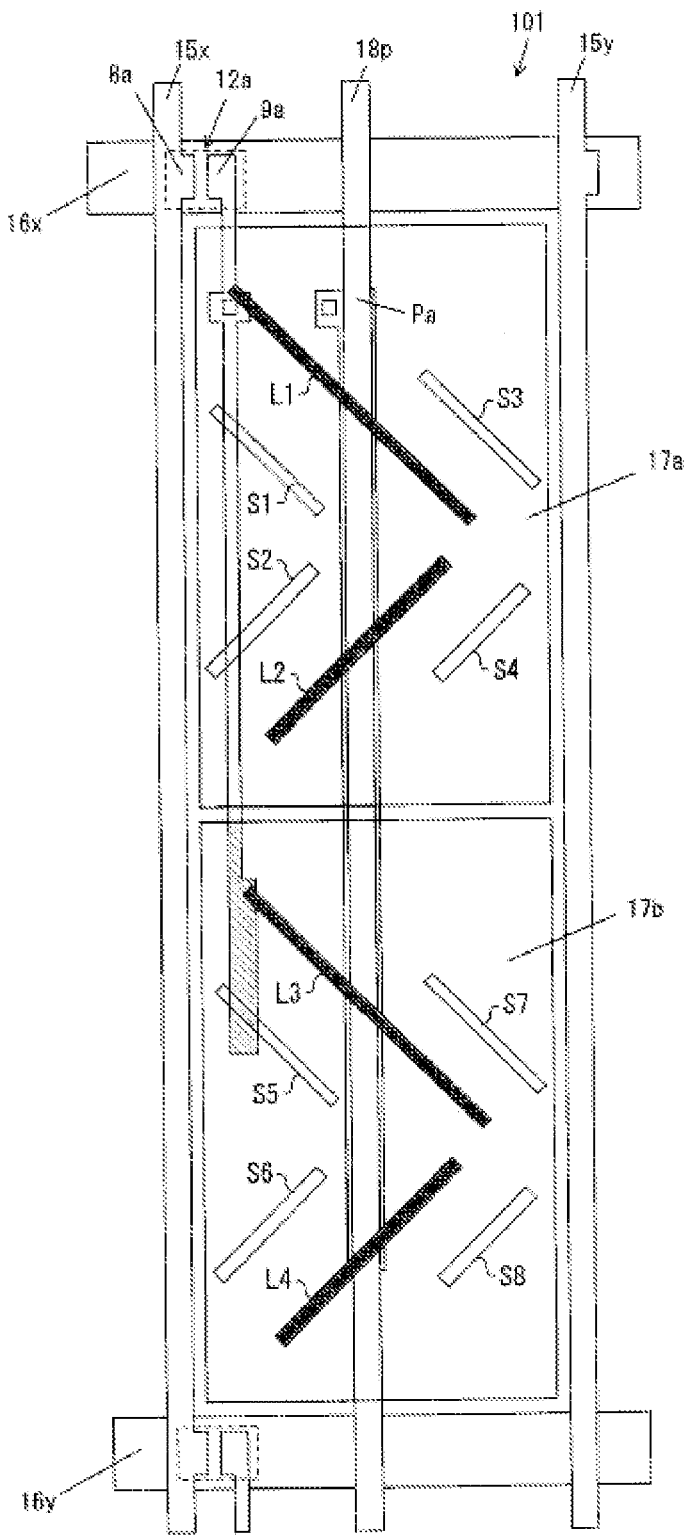
FIG. 22 is a plan view showing another specific example of the liquid crystal panel of FIG. 10.

FIG. 22 shows the structure of the liquid crystal panel shown in FIG. 11 as modified into an MVA (Multi-domain Vertical Alignment) structure. As shown in the figure, alignment control slits S1 to S4 are provided in the pixel electrode 17a, alignment control ribs L1 and L2 are provided on the color filter substrate at the location corresponding to the pixel electrode 17a, alignment control slits S5 to S8 are provided in the pixel electrode 17b, and alignment control ribs L3 and L4 are provided on the color filter substrate at the location corresponding to the pixel electrode 17b. Here, instead of providing the aforementioned alignment control ribs, alignment control slits may be provided in the common electrode of the color filter substrate. Needless to say, the MVA structure shown in FIG. 22 is also applicable to liquid crystal panels according to Embodiment 1 or liquid crystal panels according to Embodiment 3 described below.

Needless to say, the configurations of the liquid crystal panels shown in FIGS. 5, 6, 7, and 9 for the description of Embodiment 1 are also applicable to the respective liquid crystal panels according to Embodiment 2.

Embodiment 3

Figure 23:
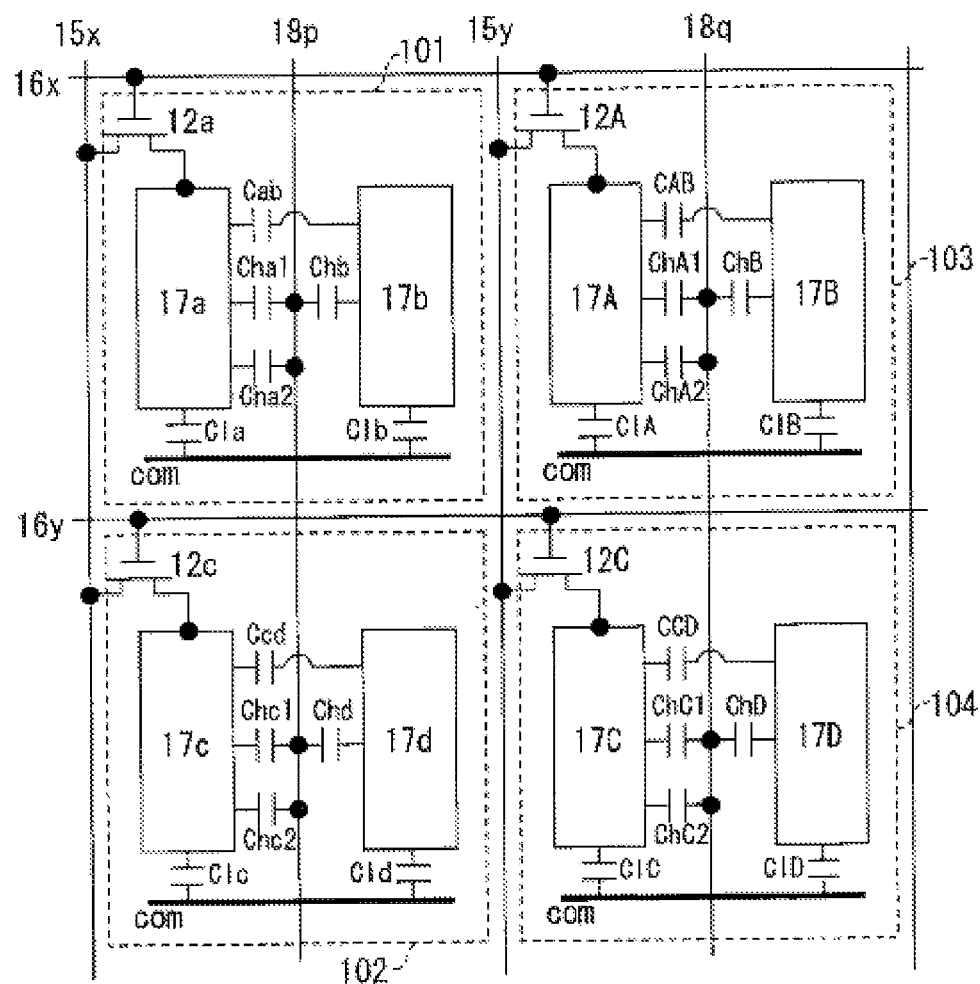
FIG. 23 is an equivalent circuit diagram showing the configuration of the liquid crystal panel according to Embodiment 3.

FIG. 23 is an equivalent circuit diagram showing a part of the liquid crystal panel according to Embodiment 3. As shown in FIG. 23, the present liquid crystal panel includes: data signal lines (15x and 15y) extending in a column direction (up and down directions in the figure); scan signal lines (16x and 16y) extending in a row direction (right and left directions in the figure); pixels arranged in the row and column directions (101 to 104); storage capacitance wirings (18p and 18q); and a common electrode (opposite electrode) com. All pixels have the same structure. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

In the present liquid crystal panel, one data signal line and one scan signal line are provided corresponding to one pixel; two pixel electrodes (first and second pixel electrodes) are arranged in the row direction in one pixel; two pixel electrodes $17a$ and $17b$ provided in the pixel $101$ and the two pixel electrodes $17A$ and $17B$ provided in the pixel $103$ are arranged in a row; two pixel electrodes $17c$ and $17d$ provided in pixel $102$ and two pixel electrodes $17C$ and $17D$ provided in pixel $104$ are arranged in a row; pixel electrodes $17a$ and $17c$, pixel electrodes $17b$ and $17d$, pixel electrodes $17A$ and $17C$, and pixel electrodes $17B$ and $17D$ are adjacent to each other in the column direction. That is, the liquid crystal panel according to Embodiment 3 is a liquid crystal panel of the pixel division system in which multiple pixel electrodes are provided in a single pixel region.

In pixel $101$, pixel electrodes $17a$ (first pixel electrode) and $17b$ (second pixel electrode) are connected together through a coupling capacitance Cab; the pixel electrode $17a$ is connected to the data signal line $15x$ through a transistor $12a$ connected to the scan signal line $16x$; storage capacitances Cha1 (first capacitance) and Cha2 (second capacitance) are formed between the pixel electrode $17a$ and the storage capacitance wiring $18p$; a storage capacitance Chb is formed between the pixel electrode $17b$ and the storage capacitance wiring $18p$; a liquid crystal capacitance Cla is formed between the pixel electrode $17a$ and the common electrode com; and a liquid crystal capacitance Clb is formed between the pixel electrode $17b$ and the common electrode com.

In pixel $102$, which is adjacent to the pixel $101$ in the column direction, pixel electrodes $17c$ and $17d$ are connected together through a coupling capacitance Ccd; pixel electrode $17c$ is connected to the data signal line $15x$ through the transistor $12c$ connected to the scan signal line $16y$; storage capacitances Chc1 (first capacitance) and Chc2 (second capacitance) are formed between the pixel electrode $17c$ and the storage capacitance wiring $18p$; a storage capacitance Chd is formed between the pixel electrode $17d$ and the storage capacitance wiring $18p$; a liquid crystal capacitance Clc is formed between the pixel electrode $17c$ and the common electrode com; and a liquid crystal capacitance Cld is formed between the pixel electrode $17d$ and the common electrode com.

In pixel $103$, which is adjacent to pixel $101$ in the row direction, pixel electrodes $17A$ and $17B$ are connected together through a coupling capacitance CAB; pixel electrode $17A$ is connected to the data signal line $15y$ through a transistor $12A$ connected to the scan signal line $16x$; storage capacitances ChA1 (first capacitance) and ChA2 (second capacitance) are formed between the pixel electrode $17A$ and the storage capacitance wiring $18q$; storage capacitance ChB is formed between the pixel electrode $17B$ and the storage capacitance wiring $18q$; a liquid crystal capacitance ClA is formed between the pixel electrode $17A$ and the common electrode com; and a liquid crystal capacitance ClB is formed between the pixel electrode $17B$ and the common electrode com.

In a liquid crystal display device equipped with the present liquid crystal panel, scan is performed sequentially, and scan signal lines $16x$ and $16y$ are selected sequentially. For example, when the scan signal line $16x$ is selected, the pixel electrode $17a$ is connected to the data signal line $15x$ (through the transistor $12a$). Here, the pixel electrode $17a$ and the pixel electrode $17b$ are connected to each other through the coupling capacitance Cab. As a result, the relation of $|Va| \geq |Vb|$ is satisfied, where Va is the potential of the pixel electrode $17a$ after the transistor $12a$ is turned off and Vb is the potential of the pixel electrode $17b$ after the transistor $12a$ is turned off (note that "$|Vb|$", for example, denotes the potential difference between Vb and com potential=Vcom). Consequently, the sub-pixel that includes the pixel electrode $17a$ becomes a bright sub-pixel, and the sub-pixel including the pixel electrode $17b$ becomes a dark sub-pixel. Half-tone display can be conducted by the area gradation of these bright sub-pixels and dark sub-pixels. With this configuration, the view angle characteristics of the present liquid crystal display device can be improved.

A specific example of pixels $101$ to $104$ of FIG. $23$ is shown in FIG. $24$. Below, pixel $101$ is described. As shown in the figure, in the proximity of the intersection of the data signal line $15x$ and the scan signal line $16x$, a transistor $12a$ is disposed, and in the pixel region defined by the signal lines ($15x$ and $16x$), a rectangular-shaped pixel electrode $17a$ (first pixel electrode) and a rectangular-shaped pixel electrode $17b$ (second pixel electrode) are arranged in the row direction. One of the four sides constituting the perimeter of the first pixel electrode and one of the four sides constituting the perimeter of the second pixel electrode are disposed adjacent to each other. Also, the storage capacitance wiring $18p$, which is in the same layer with and in parallel with the data signal line $15x$ and extending in the column direction, is disposed such that it overlaps with the gap between the two neighboring sides of the pixel electrodes $17a$ and $17b$, the pixel electrode $17a$ and the pixel electrode $17b$. Further, in the pixel region, a capacitance electrode $47a$ (first capacitance electrode) is disposed to extend in the row direction, and to overlap with the gap between the adjacent sides of the pixel electrodes $17a$ and $17b$, the pixel electrode $17a$, the pixel electrode $17b$, and the storage capacitance wiring $18p$.

Over the scan signal line $16x$, source electrode $8a$ and drain electrode $9a$ of the transistor $12a$ are formed, and the source electrode $8a$ is connected to the data signal line $15x$. The drain electrode $9a$ is connected to the drain lead-out electrode $27a$, and the drain lead-out electrode $27a$ is connected to the pixel electrode $17a$ through the contact hole $11a$.

The capacitance electrode $47a$ is formed in the same layer with the scan signal line $16x$, such that it partially overlaps with the storage capacitance wiring $18p$, overlaps with the storage capacitance wiring $18p$ through the gate insulating film, and is connected to the pixel electrode $17a$ through the contact hole $111a$. As a result, a storage capacitance Cha1 (see FIG. $23$) is formed where the capacitance electrode $47a$ and the storage capacitance wiring $18p$ overlap. Also, the storage capacitance wiring $18p$ and the pixel electrode $17a$ overlap through the interlayer insulating film, and a storage capacitance Cha2 (see FIG. $23$) is formed at the location of the overlap. Also, the storage capacitance wiring $18p$ and the pixel electrode $17b$ overlap through the interlayer insulating film, and a storage capacitance Chb (see FIG. $23$) is formed at the location of the overlap. Additionally, the capacitance electrode $47a$ overlaps the pixel electrode $17b$ through the gate insulating film and the interlayer insulating film, and a coupling capacitance Cab (see FIG. $23$) between the pixel electrodes $17a$ and $17b$ is formed at the location of the overlap. That is, the capacitance electrode $47a$ functions as a coupling capacitance electrode at the location where it overlaps with the pixel electrode $17b$ through the gate insulating film and the interlayer insulating film. Configuration (the shapes and locations of the respective members, and the relation of connection among them) of other pixels is the same as that of the pixel $101$.

According to this configuration, the storage capacitance value of the pixel electrode $17a$ in the pixel $101$ is the sum of the storage capacitance Cha1 (first capacitance) formed between the capacitance electrode $47a$ and the storage capacitance wiring 18*p*, and the storage capacitance Cha2 (second capacitance) formed between the storage capacitance wiring 18*p* and the pixel electrode 17*a* (i.e., Cha1+Cha2). As a result, in the liquid crystal panel of pixel division system, the aperture ratio can be increased without changing the storage capacitance value, by making the widths of the storage capacitance wiring 18*p* and the capacitance electrode 47*a* smaller to reduce the overlapping area. Or, the storage capacitance value can be increased without changing the overlapping area (that is, without changing the aperture ratio).

Figure 24:
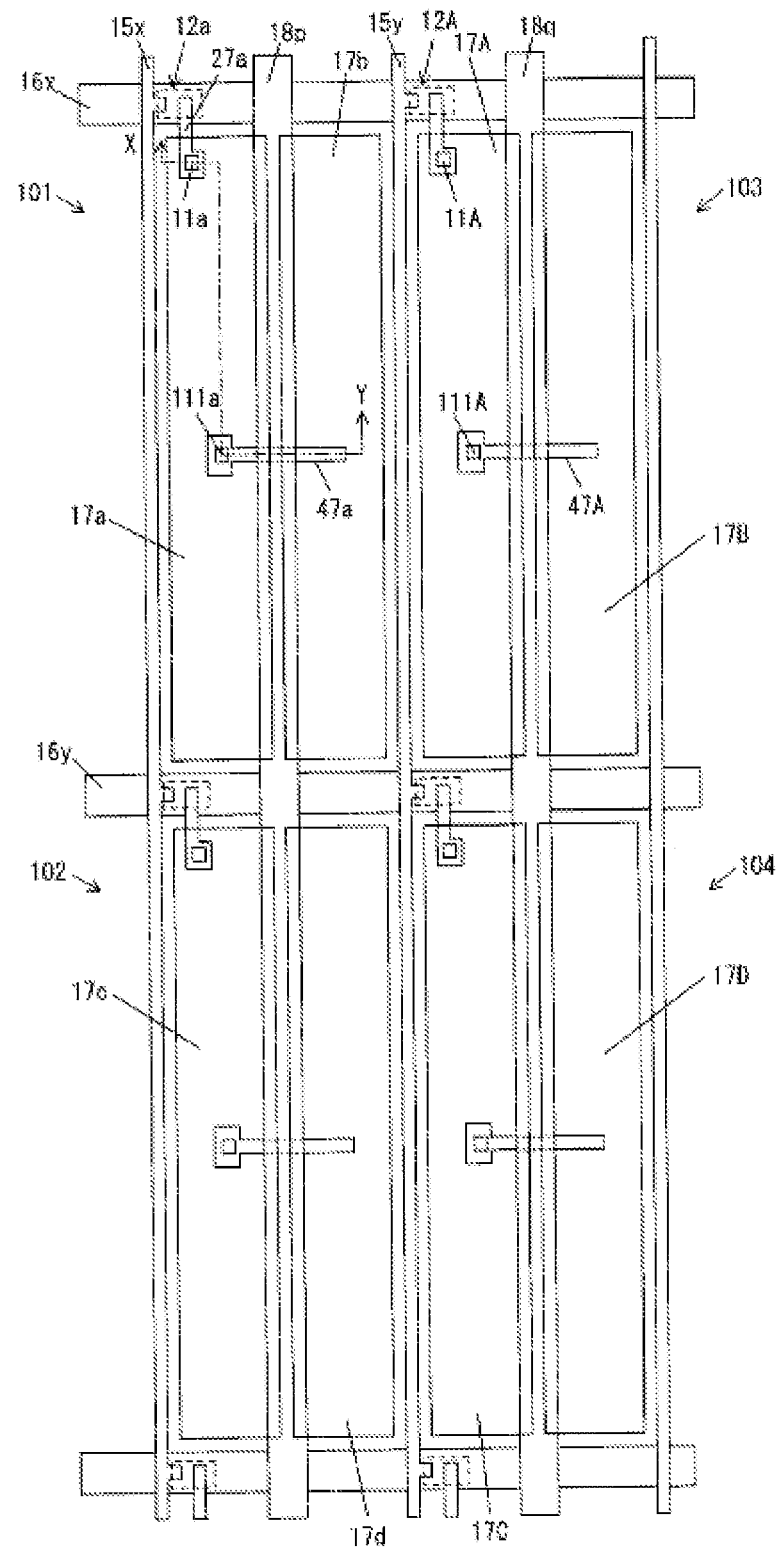
FIG. 24 is a plan view showing a specific example of the liquid crystal panel of FIG. 10.
Figure 25:
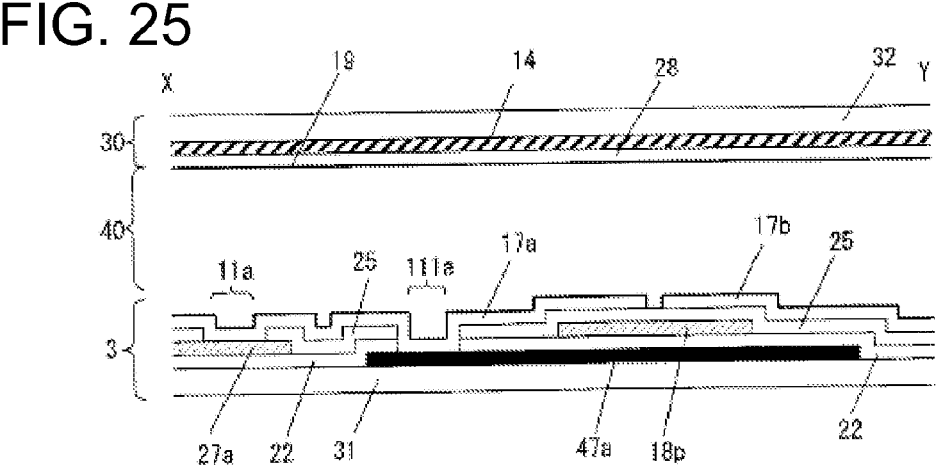
FIG. 25 is a cross-sectional arrow view taken along the line X-Y of FIG. 24.

FIG. 25 is a cross-sectional arrow view taken along the line X-Y of FIG. 24. As shown in the figure, the present liquid crystal panel includes an active matrix substrate 3, a color filter substrate 30 facing the active matrix substrate 3, and a liquid crystal layer 40 interposed between the substrates (3 and 30).

The active matrix substrate 3 has a capacitance electrode 47*a* formed on the glass substrate 31, and an inorganic gate insulating film 22 is formed to cover the capacitance electrode 47*a*. Although not illustrated, scan signal lines are also formed on the glass substrate 31. Over the inorganic gate insulating film 22, semiconductor layers (i-layer and n+ layer; not shown), a source electrode and a drain electrode (both not shown) in contact with the n+ layer, a drain lead-out electrode 27*a*, and a storage capacitance wiring 18*p* are formed, which are covered by an inorganic interlayer insulating film 25. On the inorganic interlayer insulating film 25, pixel electrodes 17*a* and 17*b* are formed, and further, an alignment film (not shown) is formed to cover the pixel electrodes 17*a* and 17*b*.

Here, in the contact hole 11*a*, inorganic interlayer insulating film 25 is removed, and therefore, the pixel electrode 17*a* and the drain lead-out electrode 27*a* are connected to each other. Also, in contact hole 111*a*, the inorganic interlayer insulating film 25 and the inorganic gate insulating film 22 are removed, and consequently the pixel electrode 17*a* and the capacitance electrode 47*a* are electrically connected to each other. Additionally, the capacitance electrode 47*a* and the storage capacitance wiring 18*p* overlap through the inorganic gate insulating film 22, and consequently a storage capacitance Cha1 (see FIG. 23) is formed. Also, the storage capacitance wiring 18*p* and the pixel electrode 17*a* overlap through the inorganic interlayer insulating film 25, and consequently a storage capacitance Cha2 (see FIG. 23) is formed. The storage capacitance wiring 18*p* and the pixel electrode 17*b* overlap through the inorganic interlayer insulating film 25, and consequently a storage capacitance Chb (see FIG. 23) is formed. Additionally, the capacitance electrode 47*a* and the pixel electrode 17*b* overlap through the inorganic gate insulating film 22 and the inorganic interlayer insulating film 25, and therefore a coupling capacitance Cab (see FIG. 23) is formed.

Here, as shown in FIG. 25, for the color filter substrate 30, a colored layer 14 is formed on the glass substrate 32, a common electrode (com) 28 is formed over the colored layer 14, and further, an alignment film 19 is formed, covering the common electrode (com) 28.

According to this configuration, the sub-pixel that includes the pixel electrode 17*a* becomes "BR", and the sub-pixel that includes the pixel electrode 17*b* becomes "DA".

Figure 26:
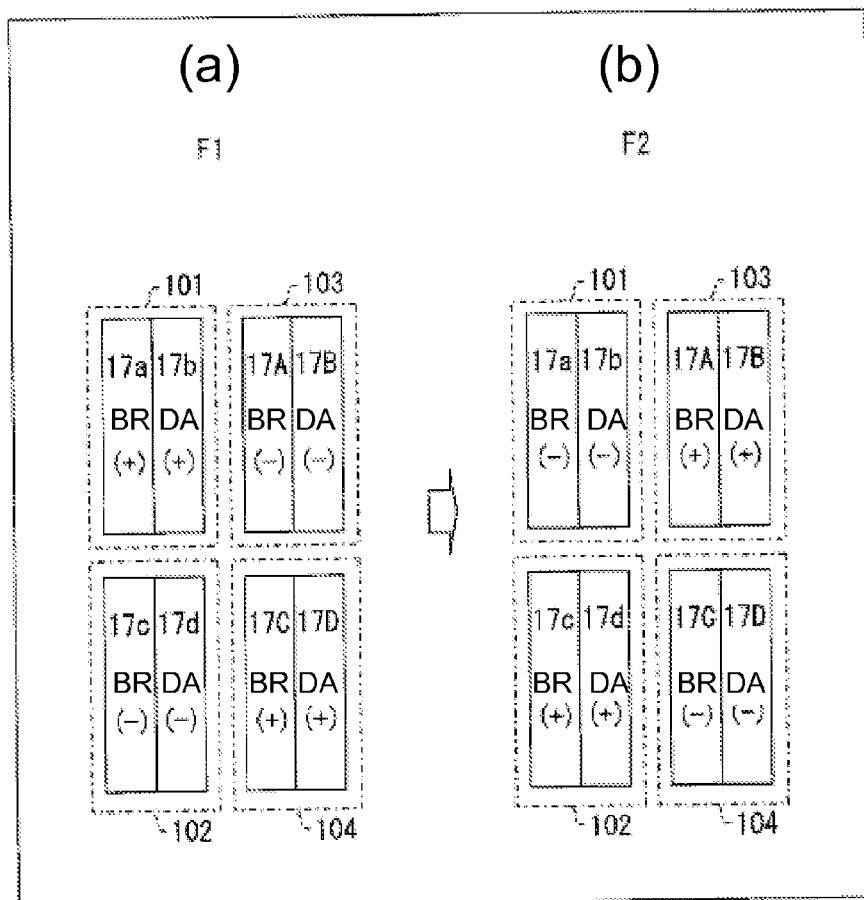
FIG. 26 is a schematic view showing the display state of respective frames when the drive method of FIG. 14 is used for a liquid crystal display device equipped with the liquid crystal panel of FIG. 24.

The drive method of the present liquid crystal display device (liquid crystal display device operating in the normally black mode) equipped with the present liquid crystal panel is the same as the drive method shown in the timing chart in FIG. 14 of Embodiment 2. According to this drive method, in the first frame (F1), the sub-pixel that includes the pixel electrode 17*a* (positive polarity) becomes a bright sub-pixel (hereinafter referred to as "BR"), the sub-pixel that includes the pixel electrode 17*b* (positive polarity) becomes a dark sub-pixel (hereinafter referred to as "DA"), the sub-pixel that includes the pixel electrode 17*c* (negative polarity) becomes "BR", the sub-pixel that includes the pixel electrode 17*d* (negative polarity) becomes "DA", the sub-pixel that includes the pixel electrode 17A (negative polarity) becomes "BR", and the sub-pixel that includes the pixel electrode 17B (negative polarity) becomes "DA". FIG. 26(*a*) shows the overall picture.

In the second frame (F2), the sub-pixel that includes the pixel electrode 17*a* (negative polarity) becomes "BR", the sub-pixel that includes the pixel electrode 17*b* (negative polarity) becomes "DA", the sub-pixel that includes the pixel electrode 17*c* (positive polarity) becomes "BR", the sub-pixel that includes the pixel electrode 17*d* (positive polarity) becomes "DA", the sub-pixel that includes the pixel electrode 17A (positive polarity) becomes "BR", the sub-pixel that includes the pixel electrode 17B (positive polarity) becomes "DA". FIG. 26(*b*) shows the overall picture.

Figure 27:
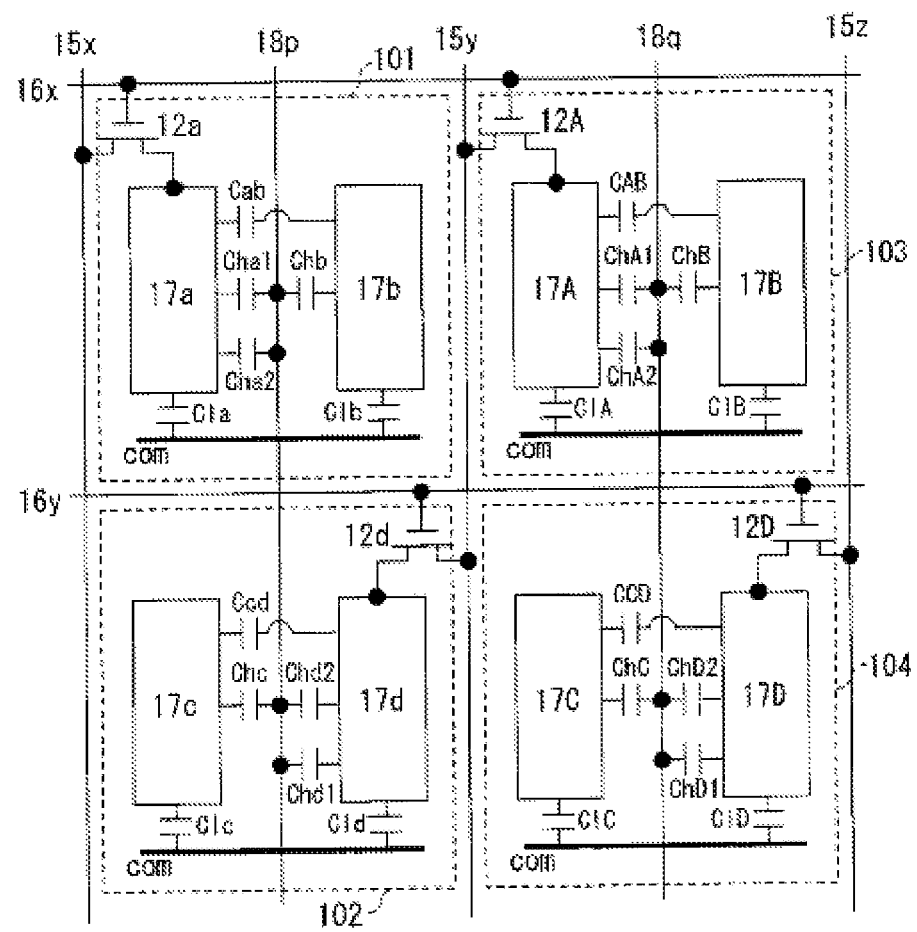
FIG. 27 is an equivalent circuit diagram showing another configuration of the liquid crystal panel according to Embodiment 3.

FIG. 27 shows another configuration of the liquid crystal panel according to Embodiment 3. As shown in FIG. 27, the present liquid crystal panel includes data signal lines (15*x*, 15*y*, and 15*z*) extending in the column direction (up/down direction in the figure), scan signal lines (16*x* and 16*y*) extending in the row direction (right/left direction in the figure), pixels (101 to 104) arranged in the row and column directions, storage capacitance wirings (18*p* and 18*q*), and a common electrode (opposite electrode) com. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

The way the pixel electrodes (17*a*, 17*b*, 17*c*, 17*d*, 17A, 17B, 17C, and 17D) are arranged in pixels 101 to 104 are the same as the present liquid crystal panel shown in FIG. 23.

In pixel 101, the pixel electrodes 17*a* and 17*b* are connected together through the coupling capacitance Cab; the pixel electrode 17*a* is connected to the data signal line 15*x* through the transistor 12*a* connected to the scan signal line 16*x*; storage capacitances Cha1 (first capacitance) and Cha2 (second capacitance) are formed between the pixel electrode 17*a* and the storage capacitance wiring 18*p*; a storage capacitance Chb is formed between the pixel electrode 17*b* and the storage capacitance wiring 18*p*; a liquid crystal capacitance Cla is formed between the pixel electrode 17*a* and the common electrode com; and a liquid crystal capacitance Clb is formed between the pixel electrode 17*b* and the common electrode com.

In pixel 102, which is adjacent to the pixel 101 in the column direction, pixel electrodes 17*c* and 17*d* are connected together through the coupling capacitance Ccd; the pixel electrode 17*d* is connected to the data signal line 15*y* through the transistor 12*d* connected to the scan signal line 16*y*; storage capacitances Chd1 (first capacitance) and Chd2 (second capacitance) are formed between the pixel electrode 17*d* and the storage capacitance wiring 18*p*; a storage capacitance Chc is formed between the pixel electrode 17*c* and the storage capacitance wiring 18*p*; a liquid crystal capacitance Clc is formed between the pixel electrode 17*c* and the common electrode com; and a liquid crystal capacitance Cld is formed between the pixel electrode 17*d* and the common electrode com.

In pixel 103, which is adjacent to the pixel 101 in the row direction, pixel electrodes 17A and 17B are connected together through the coupling capacitance CAB; the pixel electrode 17A is connected to the data signal line 15*y* through the transistor 12A connected to the scan signal line 16x; storage capacitances ChA1 (first capacitance) and ChA2 (second capacitance) are formed between the pixel electrode 17A and the storage capacitance wiring 18q; a storage capacitance ChB is formed between the pixel electrode 17B and the storage capacitance wiring 18q; a liquid crystal capacitance ClA is formed between the pixel electrode 17A and the common electrode com; and a liquid crystal capacitance ClB is formed between the pixel electrode 17B and the common electrode com.

Figure 28:
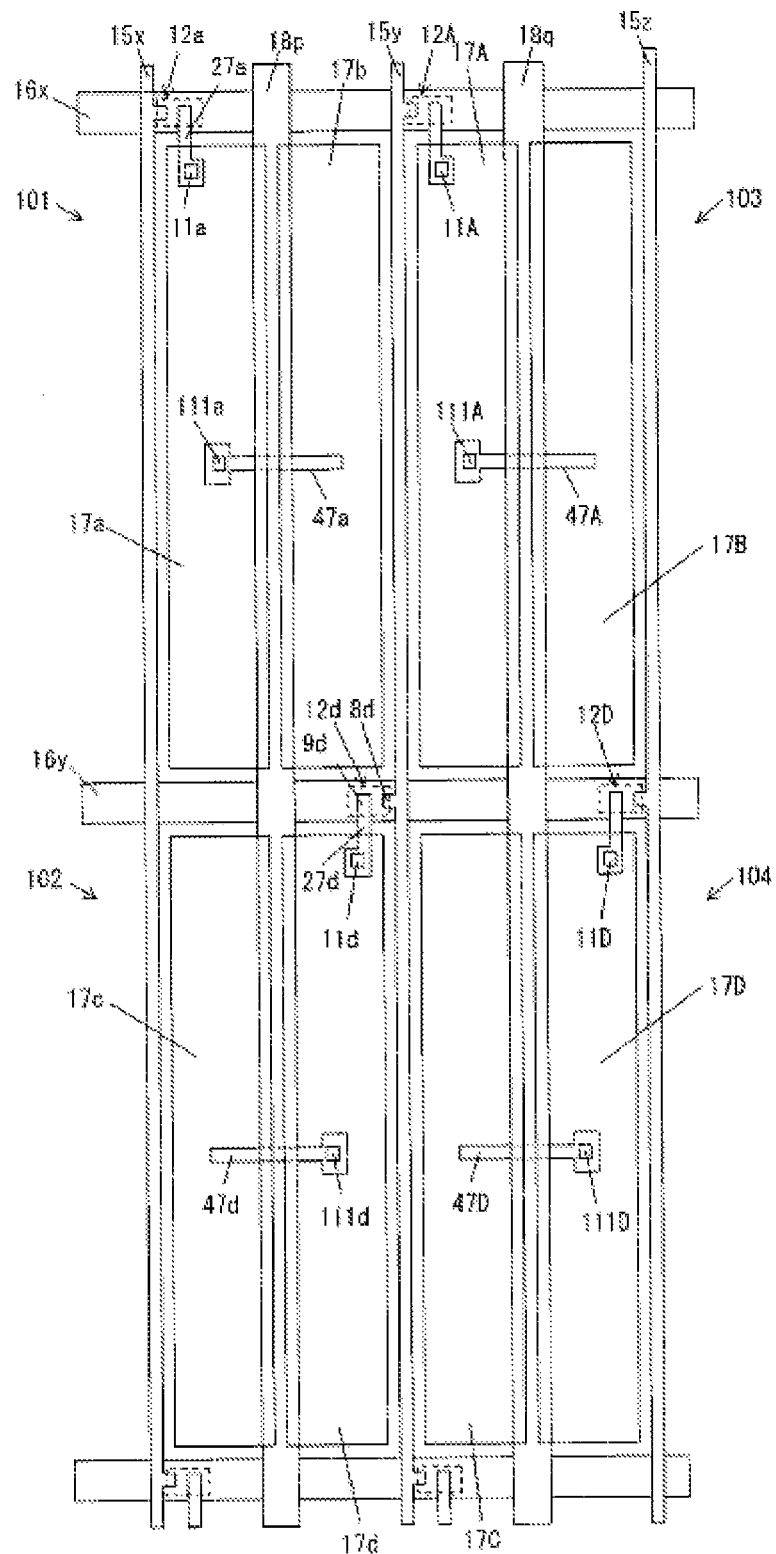
FIG. 28 is a plan view showing a specific example of the liquid crystal panel of FIG. 27.
Figure 29:
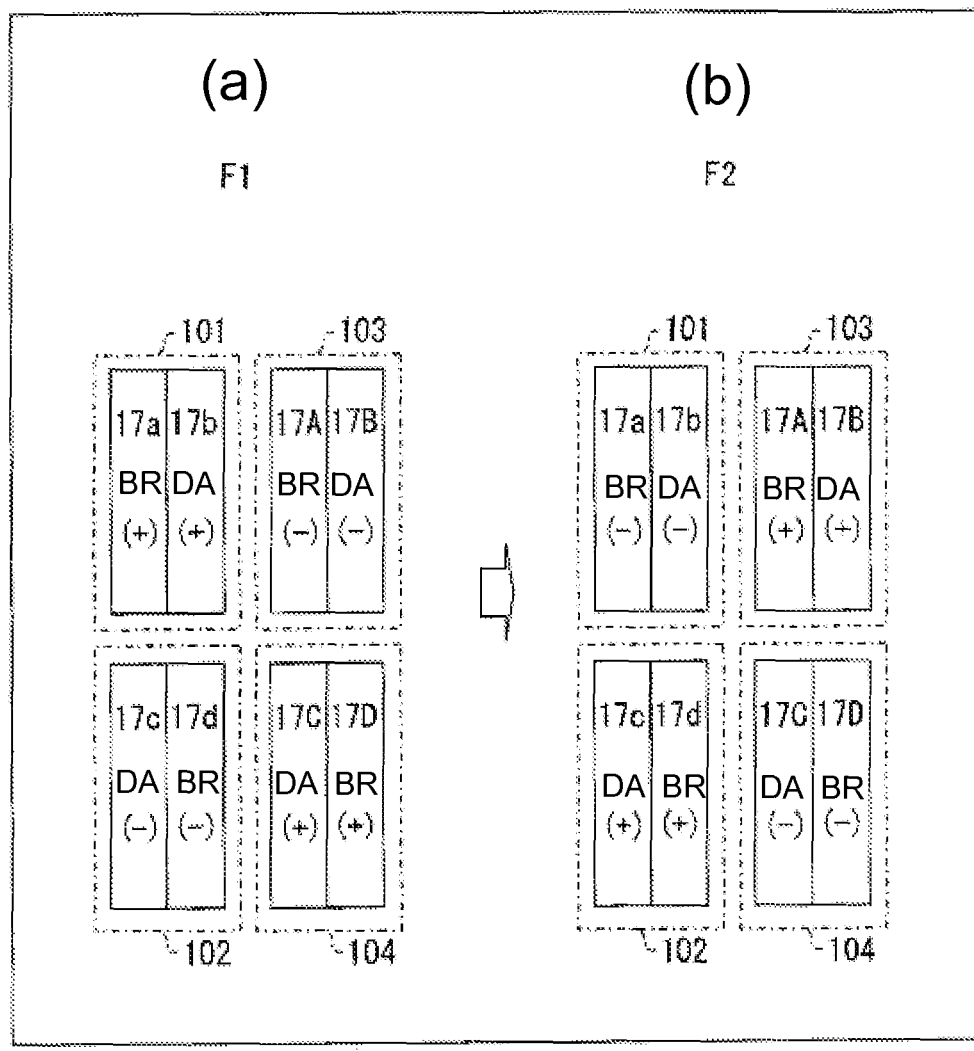
FIG. 29 is a schematic view showing the display state of respective frames when the drive method of FIG. 14 is used for a liquid crystal display device equipped with the liquid crystal panel of FIG. 28.

Because the pixel 101 in FIG. 27 is the same as the pixel 101 in FIG. 24, here, a specific example of the pixel 102 is explained with reference to FIG. 28. As shown in FIG. 28, a transistor 12d is disposed in the proximity of the intersection of the data signal line 15y and the scan signal line 16y; in a pixel region defined by the signal lines (15y and 16y), a rectangular-shaped pixel electrode 17c (second pixel electrode) and a rectangular-shaped pixel electrode 17d (first pixel electrode) are disposed in the row direction; and one of the four sides constituting the perimeter of the first pixel electrode and one of the four sides constituting the perimeter of the second pixel electrode are adjacent to each other. The storage capacitance wiring 18p, which extends in the column direction in the same layer with and in parallel with the data signal line 15y, is disposed to overlap with the gap between the two adjacent sides of pixel electrodes 17c and 17d, the pixel electrode 17c, and the pixel electrode 17d. Further, in the pixel region, the capacitance electrode 47d (first capacitance electrode) extends in the row direction, and is disposed to overlap with the gap between the two adjacent sides of the pixel electrodes 17c and 17d, the pixel electrode 17c, the pixel electrode 17d, and the storage capacitance wiring 18p.

Over the scan signal line 16y, a source electrode 8d and a drain electrode 9d of the transistor 12d are formed, and the source electrode 8d is connected to the data signal line 15y. The drain electrode 9d is connected to the drain lead-out electrode 27d, and the drain lead-out electrode 27d is connected to the pixel electrode 17d through the contact hole 11d.

A capacitance electrode 47d is formed in the same layer with the scan signal line 16y such that it partially overlaps with the storage capacitance wiring 18p. It overlaps with the storage capacitance wiring 18p through the gate insulating film, and is connected to the pixel electrode 17d through the contact hole 111d. As a result, a storage capacitance Chd1 (see FIG. 27) is formed where the capacitance electrode 47d and the storage capacitance wiring 18p overlap. Also, the storage capacitance wiring 18p and the pixel electrode 17d overlap through the interlayer insulating film, and a storage capacitance Chd2 (see FIG. 27) is formed at the location of the overlap. The storage capacitance wiring 18p and the pixel electrode 17c overlap through the interlayer insulating film, and a storage capacitance Chc (see FIG. 27) is formed at the location of the overlap. The capacitance electrode 47d overlaps the pixel electrode 17c through the gate insulating film and the interlayer insulating film, and a coupling capacitance Ccd (see FIG. 27) between the pixel electrodes 17c and 17d is formed at the location of the overlap. That is, the capacitance electrode 47d functions as a coupling capacitance electrode where it overlaps with the pixel electrode 17c through the gate insulating film and the interlayer insulating film.

If the driving method shown in the timing chart of FIG. 14, which is for Embodiment 2, is applied to this configuration, in the first frame (F1), the sub-pixel that includes the pixel electrode 17a (positive polarity) becomes a bright sub-pixel (hereinafter "BR"), the sub-pixel that includes the pixel electrode 17b (positive polarity) becomes a dark sub-pixel (hereinafter "DA"), the sub-pixel that includes the pixel electrode 17c (negative polarity) becomes "DA", the sub-pixel that includes the pixel electrode 17d (negative polarity) becomes "BR", the sub-pixel that includes the pixel electrode 17A (negative polarity) becomes "BR", and the sub-pixel that includes the pixel electrode 17B (negative polarity) becomes "DA". FIG. 29(a) shows the overall picture.

In the second frame (F2), the sub-pixel that includes the pixel electrode 17a (negative polarity) becomes "BR", the sub-pixel that includes the pixel electrode 17b (negative polarity) becomes "DA", the sub-pixel that includes the pixel electrode 17c (positive polarity) becomes "DA", the sub-pixel that includes the pixel electrode 17d (positive polarity) becomes "BR", the sub-pixel that includes the pixel electrode 17A (positive polarity) becomes "BR", and the sub-pixel that includes the pixel electrode 17B (positive polarity) becomes "DA". FIG. 29(b) shows the overall picture.

According to this configuration, similar to the configuration of the liquid crystal panel shown in FIG. 23, the aperture ratio can be improved without changing the storage capacitance, and the storage capacitance value can be increased without changing the overlapping area (that is, without changing the aperture ratio). Also because no two bright sub-pixels are arranged side by side in the row direction, and no two dark sub-pixels are arranged side by side in the row direction, uneven streaks in the row direction can be suppressed.

Figure 30:
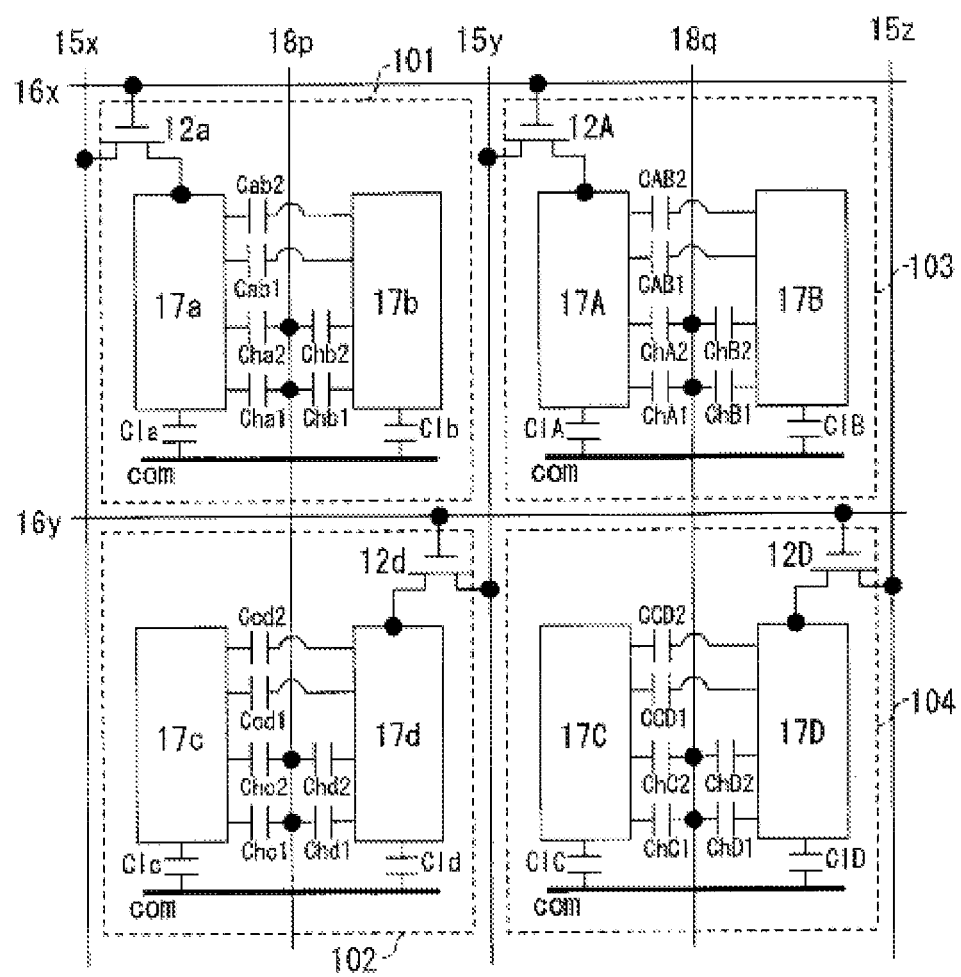
FIG. 30 is an equivalent circuit diagram showing another configuration of the liquid crystal panel according to Embodiment 3.

FIG. 30 shows another configuration of the liquid crystal panel according to Embodiment 3. As shown in FIG. 30, the present liquid crystal panel includes data signal lines (15x, 15y, and 15z) extending the column direction (up/down direction in the figure), scan signal lines (16x and 16y) extending in the row direction (right/left direction in the figure), pixels (101 to 104) arranged in the row and column directions, storage capacitance wirings (18p and 18q), and a common electrode (opposite electrode) com. The pixel column that includes pixels 101 and 102 and the pixel column that includes pixels 103 and 104 are adjacent to each other, and the pixel row that includes pixels 101 and 103 and the pixel row that includes pixels 102 and 104 are adjacent to each other.

Pixel electrodes (17a, 17b, 17c, 17d, 17A, 17B, 17C, and 17D) provided in pixels 101 to 104 are arranged in the same manner as in the present liquid crystal panel shown in FIG. 23.

In pixel 101, the pixel electrodes 17a and 17b are connected to each other through coupling capacitances Cab1 and Cab2; the pixel electrode 17a is connected to the data signal line 15x through the transistor 12a connected to the scan signal line 16x; storage capacitances Cha1 (first capacitance) and Cha2 (second capacitance) are formed between the pixel electrode 17a and the storage capacitance wiring 18p; storage capacitances Chb1 and Chb2 are formed between the pixel electrode 17b and the storage capacitance wiring 18p; a liquid crystal capacitance Cla is formed between the pixel electrode 17a and the common electrode com; and a liquid crystal capacitance Clb is formed between the pixel electrode 17b and the common electrode com.

In pixel 102, which is adjacent to the pixel 101 in the column direction, the pixel electrodes 17c and 17d are connected to each other through the coupling capacitances Ccd1 and Ccd2; the pixel electrode 17d is connected to the data signal line 15y through the transistor 12d connected to the scan signal line 16y; storage capacitances Chd1 (first capacitance) and Chd2 (second capacitance) are formed between the pixel electrode 17d and the storage capacitance wiring 18p; storage capacitances Chc1 and Chc2 are formed between the pixel electrode 17c and the storage capacitance wiring 18p; a liquid crystal capacitance Clc is formed between the pixel electrode 17c and the common electrode com, and a liquid crystal capacitance Cld is formed between the pixel electrode 17d and the common electrode com.

In pixel 103, which is adjacent to the pixel 101 in the row direction, the pixel electrodes 17A and 17B are connected to each other through the coupling capacitances CAB1 and CAB2; the pixel electrode 17A is connected to the data signal line 15y through the transistor 12A connected to the scan signal line 16x; storage capacitances ChA1 (first capacitance) and ChA2 (second capacitance) are formed between the pixel electrode 17A and the storage capacitance wiring 18q; a storage capacitances ChB1 and Chb2 are formed between the pixel electrode 17B and the storage capacitance wiring 18q; a liquid crystal capacitance ClA is formed between the pixel electrode 17A and the common electrode com; and a liquid crystal capacitance ClB is formed between the pixel electrode 17B and the common electrode com.

Figure 31:
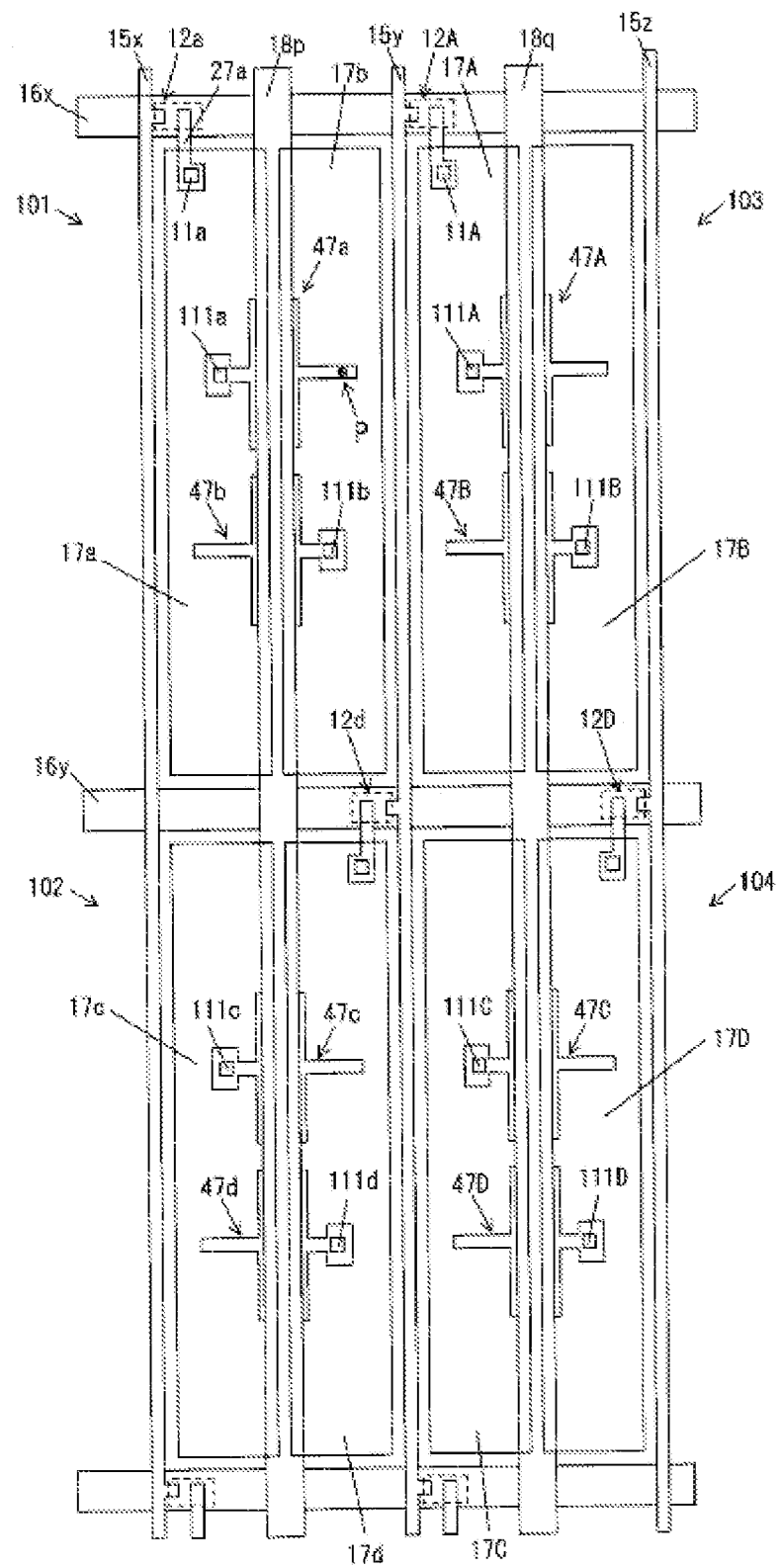
FIG. 31 is a plan view showing a specific example of the liquid crystal panel of FIG. 30.
Figure 32:
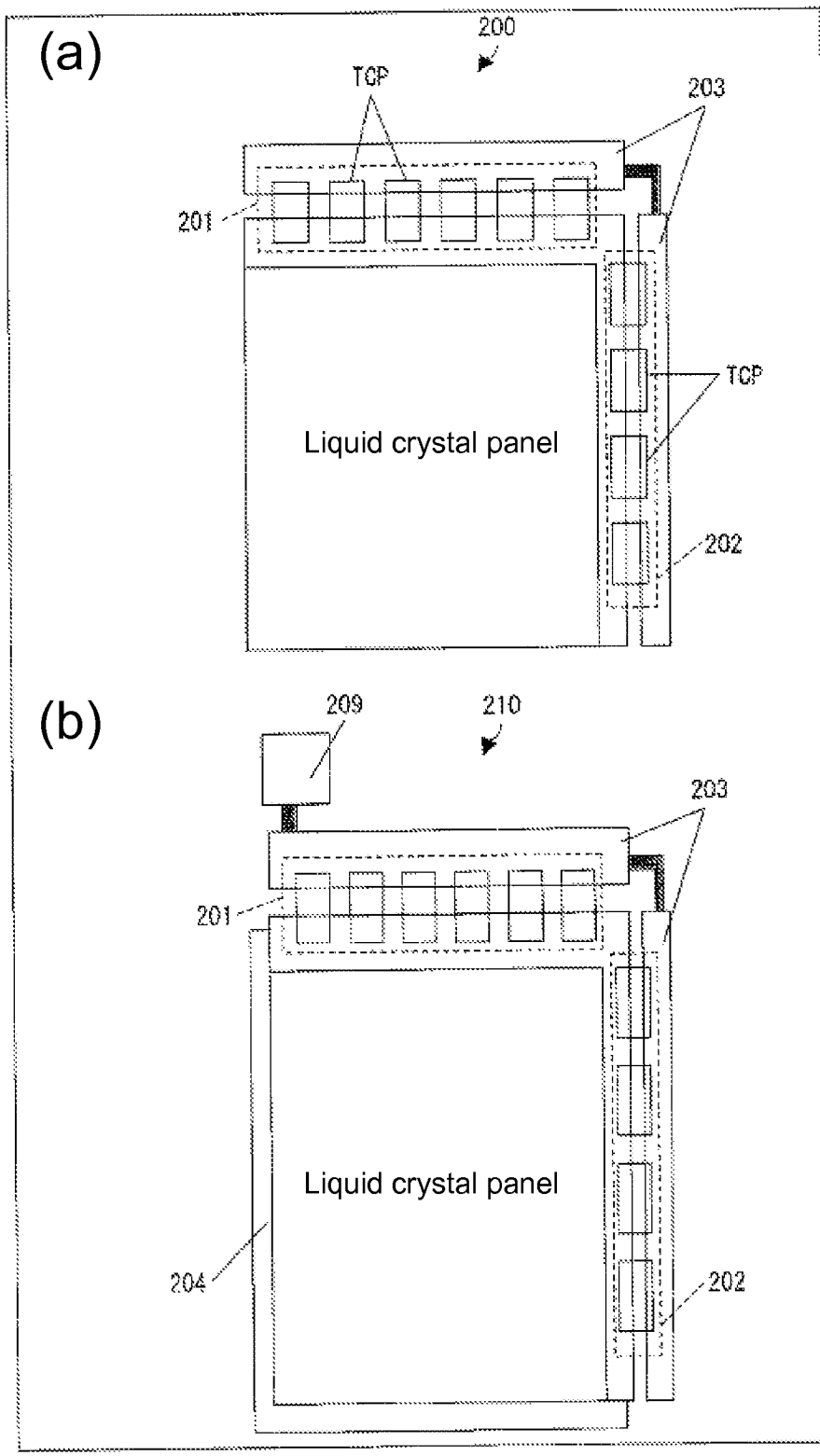
FIG. 32($a$) is a schematic view showing the configuration of a present liquid crystal display unit, and FIG. 32($b$) is a schematic view showing the configuration of a present liquid crystal display device.

A specific example of pixel 101 of FIG. 30 is shown in FIG. 31. As shown in the figure, a transistor 12a is disposed in the proximity of the intersection of the data signal line 15x and the scan signal line 16x; in the pixel region defined by the signal lines (15x and 16x), a rectangular-shaped pixel electrode 17a (first pixel electrode) and a rectangular-shaped pixel electrode 17b (second pixel electrode) are arranged in the row direction; and one of the four sides constituting the perimeter of the first pixel electrode and one of the four sides constituting the perimeter of the second pixel electrode are adjacent to each other. The storage capacitance wiring 18p, which is in the same layer with and is parallel with the data signal line 15x and extending in the column direction, is disposed such that it overlaps with the gap between the two adjacent sides of the pixel electrodes 17a and 17b, the pixel electrode 17a, and the pixel electrode 17b. Further, in the pixel region, a capacitance electrode 47a (first capacitance electrode) extends in the row direction, and is disposed to overlap with the gap between the two adjacent sides of the pixel electrodes 17a and 17b, the pixel electrode 17a, the pixel electrode 17b, and the storage capacitance wiring 18p. A capacitance electrode 47b (third capacitance electrode) is in parallel with the capacitance electrode 47a and extends in the row direction, and is disposed to overlap with the gap between the two adjacent sides of the pixel electrodes 17a and 17b, the pixel electrode 17a, the pixel electrode 17b, and the storage capacitance wiring 18p.

Over the scan signal line 16x, a source electrode 8a and a drain electrode 9a of the transistor 12a are formed, and the source electrode 8a is connected to the data signal line 15x. The drain electrode 9a is connected to a drain lead-out electrode 27a, and the drain lead-out electrode 27a is connected to the pixel electrode 17a through the contact hole 11a.

The capacitance electrode 47a is formed in the same layer with the scan signal line 16x, under the storage capacitance wiring 18p. A portion of the capacitance electrode 47a that extends in the column direction (especially the portion having a wider width) overlaps with the storage capacitance wiring 18p through the gate insulating film, and is connected to the pixel electrode 17a through the contact hole 111a. As a result, a storage capacitance Cha1 (see FIG. 30) is formed where the capacitance electrode 47a and the storage capacitance wiring 18p overlap with each other. Also, the storage capacitance wiring 18p and the pixel electrode 17a overlap through the interlayer insulating film, and a storage capacitance Cha2 (see FIG. 30) is formed at the location of the overlap. Further, the portion of the capacitance electrode 47a that extends in the row direction overlaps with the pixel electrode 17b through the gate insulating film and the interlayer insulating film, and the coupling capacitance Cab1 (see FIG. 30) between the pixel electrodes 17a and 17b is formed at the location of the overlap. That is, the capacitance electrode 47a functions as the coupling capacitance electrode where it overlaps with the pixel electrode 17b through the gate insulating film and the interlayer insulating film.

A portion of the capacitance electrode 47b that extends in the column direction (especially the portion having a wider width) overlaps with the storage capacitance wiring 18p through the gate insulating film, and is connected to the pixel electrode 17b through the contact hole 111b. As a result, a storage capacitance Chb1 (see FIG. 30) is formed where the capacitance electrode 47b and the storage capacitance wiring 18p overlap with each other. Also, the storage capacitance wiring 18p and the pixel electrode 17b overlap with each other through the interlayer insulating film, and a storage capacitance Chb2 (see FIG. 30) is formed at the location of the overlap. Further, the portion of the capacitance electrode 47b that extends in the row direction overlaps with the pixel electrode 17a through the gate insulating film and the interlayer insulating film, and the coupling capacitance Cab2 (see FIG. 30) between the pixel electrodes 17a and 17b is formed at the location of the overlap. That is, the capacitance electrode 47b functions as a coupling capacitance electrode where it overlaps with the pixel electrode 17a through the gate insulating film and the interlayer insulating film.

According to this configuration, the storage capacitance value of the pixel electrode 17a can be made greater than that of the liquid crystal panel shown in FIG. 24 by the amount equivalent to the portion of the capacitance electrode 47a that extends in the column direction. Also, because the capacitance electrode 47b is provided, the coupling capacitance value of the pixel electrodes 17a and 17b, and the storage capacitance value of the pixel electrode 17b can be made greater.

Also, in the liquid crystal panel of FIG. 31, the pixel electrode 17a and the pixel electrode 17b are connected together (capacitively coupled) by the two coupling capacitances (Cab1 and Cab2) disposed side by side. Therefore, even if a short-circuiting occurs (in the manufacturing process or the like) between the capacitance electrode 47a and the pixel electrode 17b at, for example, P in FIG. 31, the capacitance coupling between the pixel electrodes 17a and 17b can be maintained by cutting the capacitance electrode 47a by laser between the contact hole 111a and the location of the short-circuit. Further, even if the contact hole 111a is not formed properly in the manufacturing process or the like, the capacitance coupling between the pixel electrodes 17a and 17b can be maintained. If a short-circuiting occurs between the capacitance electrode 47b and the pixel electrode 17a, the capacitance electrode 47b can be cut between the contact hole 111b and the location of the short-circuit by laser.

If a short-circuiting occurs between the capacitance electrode 47a and the storage capacitance wiring 18p or the pixel electrode 17b, the capacitance coupling between the pixel electrodes 17a and 17b can be maintained also by removing (trimming) the pixel electrode 17a inside the contact hole 111a by laser or the like to electrically isolate the pixel electrode 17a from the capacitance electrode 47a.

This way, according to the configuration described above, a higher production yield of the liquid crystal panel and the active matrix substrate for use in the liquid crystal panel can be achieved.

In the liquid crystal panel of FIG. 31, the capacitance electrode 47a roughly matches the capacitance electrode 47b when rotated 180° with respect to a point on the storage capacitance wiring 18p in the pixel 101, and overlaps with the storage capacitance wiring 18p and the pixel electrodes 17a and 17b. Consequently, even if the pixel electrodes 17a and 17b are misaligned relative to the capacitance electrodes 47a and 47b in the row direction, the overlapping area of the capacitance electrode 47a and the pixel electrode 17b and the overlapping area of the capacitance electrode 47b and the pixel electrode 17a compensate with one another, making the sum of the two coupling capacitances (Cab1 and Cab2) less likely to change.

Needless to say, the configurations of liquid crystal panels shown in FIGS. 5, 6, 7, and 9 in the description of Embodiment 1 is also applicable to the liquid crystal panels of Embodiment 3.

Here, although in Embodiments 1 to 3 above, liquid crystal panels in which the storage capacitance wiring is formed in the same layer with the data signal line are described, the present liquid crystal panel is not limited to this, and the storage capacitance wiring and the data signal line may be formed in separate layers. For example, the gate insulating film can be a double-layer structure with the storage capacitance wiring formed between the layers. Also, the interlayer insulating film can be a double-layer structure with the storage capacitance wiring formed between the layers. According to these configurations, the extending direction of the storage capacitance wiring can be set without restrictions. For example, the storage capacitance wiring can be configured to extend in parallel with the scan signal line.

That is, the present liquid crystal panel may be of any configuration as long as: the storage capacitance wiring (18p) is formed in a layer between the first capacitance electrode (47a) electrically connected to the first pixel electrode (17a) and the first pixel electrode (17a); the first capacitance electrode (47a) and the storage capacitance wiring (18p) overlap with each other through a first insulating film (a gate insulating film, or a gate insulating film and an interlayer insulating film); and the storage capacitance wiring (18p) and the first pixel electrode (17a) overlap with each other through a second insulating film (an interlayer insulating film, or a gate insulating film and an interlayer insulating film).

Lastly, configuration examples of a liquid crystal display unit and a liquid crystal display device of the present invention is described. In embodiments discussed above, the present liquid crystal display unit and liquid crystal display device are configured as follows. That is, two polarizing plates A and B are attached on respective sides of the liquid crystal panel so that the polarizing axis of the polarizing plate A and the polarizing axis of the polarizing plate B cross each other at a right angle. For the polarizing plates, an optical compensation sheet or the like may be layered as necessary. Next, as shown in FIG. 32(a), drivers (gate driver 202 and source driver 201) are connected. Here, connection of a driver by TCP (Tape Career Package) system is described as an example. First, ACF (Anisotropic Conductive Film) is temporarily pressure-bonded to the terminal section of the liquid crystal panel. Next, TCP with a driver mounted thereon is punched out from the carrier tape, aligned to the panel terminal electrode, and heated for permanent pressure-bonding. Then, a circuit substrate 203 (PWB: Printed Wiring Board) for coupling the driver TCPs, and TCP input terminals are connected together by ACF. The liquid crystal display unit 200 is thus complete. Subsequently, as shown in FIG. 32(b), a display control circuit 209 is connected to drivers (201 and 202) of the liquid crystal display unit through circuit substrates 203 for unification with an illumination device (backlight unit) 204, to complete a liquid crystal display device 210.

The "polarity of the potential" herein refers to either the potential equal to or higher than the reference potential (positive), or the potential equal to or lower than the reference potential (negative). Here, the reference potential may be Vcom (common potential), which is the potential of the common electrode (opposite electrode), or any other potential.

Figure 33:
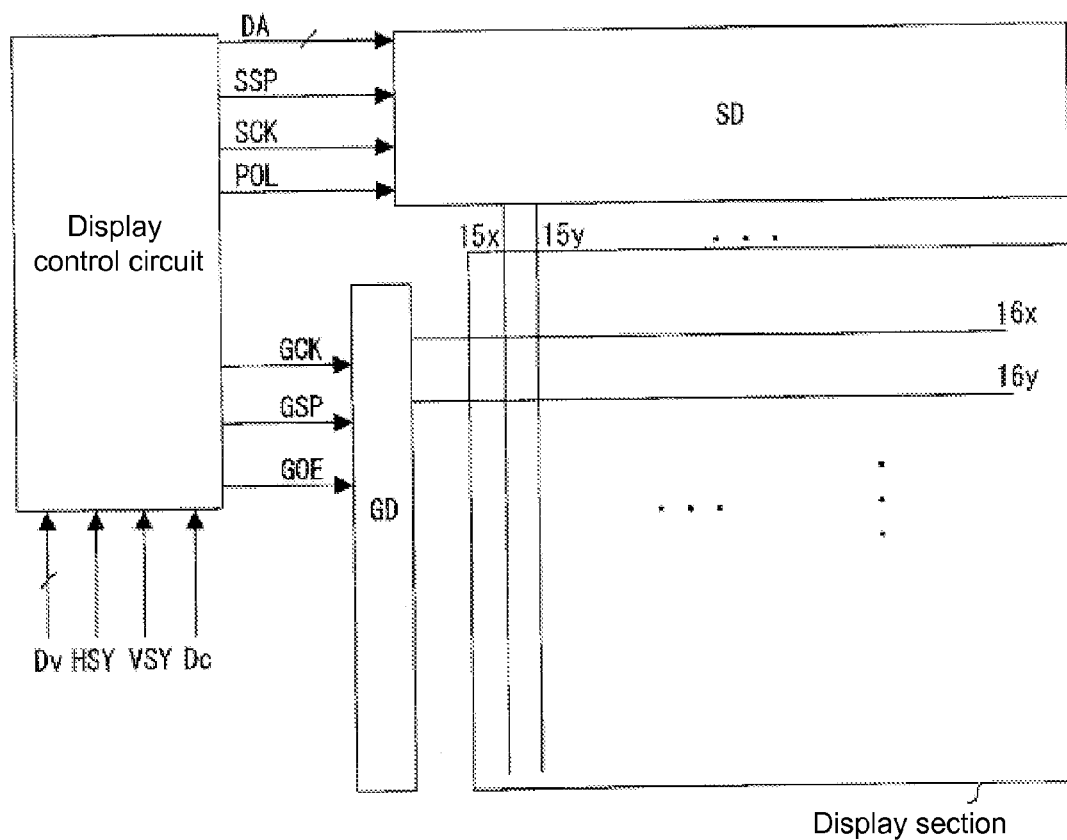
FIG. 33 is a block diagram explaining the overall configuration of a present liquid crystal display device.

FIG. 33 is a block diagram showing the configuration of the present liquid crystal display device. As shown in the figure, the liquid crystal display device includes a display section (liquid crystal panel), a source driver (SD), a gate driver (GD), and a display control circuit. The source driver drives the data signal lines, the gate driver drives the scan signal lines, and the display control circuit controls the source driver and the gate driver.

The display control circuit receives a digital video signal Dv representing images to be displayed, a horizontal synchronization signal HSY and a vertical synchronization signal VSY corresponding to the digital video signal Dv, and a control signal Dc for controlling the display action, from an external signal source (a tuner, for example). The display control circuit generates signals for displaying images represented by the digital video signal Dv on the display section, according to the received signals Dv, HSY, VSY, and Dc, and outputs them. These are a data start pulse signal SSP, a data clock signal SCK, a charge share signal sh, a digital image signal DA (the signal corresponding to the video signal Dv) representing the image to be displayed, a gate start pulse signal GSP, a gate clock signal GCK, and a gate driver output control signal (scan signal output control signal) GOE.

More specifically, the video signal Dv is subjected to the timing adjustment and the like in the internal memory as necessary, and then is output from the display control circuit as a digital image signal DA. The display control circuit generates: a data clock signal SCK, which is composed of pulses corresponding to the respective pixels of the images represented by the digital image signal DA; a data start pulse signal SSP, which, according to the horizontal synchronization signal HSY, shifts to a high level (H level) for a predetermined period of time for every horizontal scan period; a gate start pulse signal GSP, which, according to the vertical synchronization signal VSY, shifts to H level for a predetermined period of time for every frame period (one vertical scan period); a gate clock signal GCK according to the horizontal synchronization signal HSY; and the charge share signal sh and the gate driver output control signal GOE according to the horizontal synchronization signal HSY and the control signal Dc.

Among the signals generated by the display control circuit as described above, the digital image signal DA, the charge share signal sh, the signal POL for controlling the polarity of signal potentials (data signal potentials), the data start pulse signal SSP, and the data clock signal SCK are input to the source driver, and the gate start pulse signal GSP, the gate clock signal GCK, and the gate driver output control signal GOE are input to the gate driver.

The source driver sequentially generates analog potentials (signal potentials) corresponding to the pixel values of images represented by the digital image signal DA at respective scan signal lines for every horizontal scan period, based on the digital image signal DA, data clock signal SCK, charge share signal sh, data start pulse signal SSP, and polarity inversion signal POL, and outputs these data signals to the data signal lines (15x and 15x, for example).

The gate driver generates the gate-on pulse signals based on the gate start pulse signal GSP, the gate clock signal GCK, and the gate driver output control signal GOE, and outputs the signals to the scan signal lines to selectively drive the scan signal lines.

As described above, the data signal line and the scan signal line in the display section (liquid crystal panel) is driven by the source driver and the gate driver, and signal potentials are written from the data signal lines to the pixel electrodes through transistors (TFT) connected to the selected scan signal lines. Consequently, voltages are applied to the liquid crystal layer for respective sub-pixels, by which the amount of the light from the backlight that is transmitted is controlled, and images represented by the digital video signal Dv are displayed on respective sub-pixels.

Figure 34:
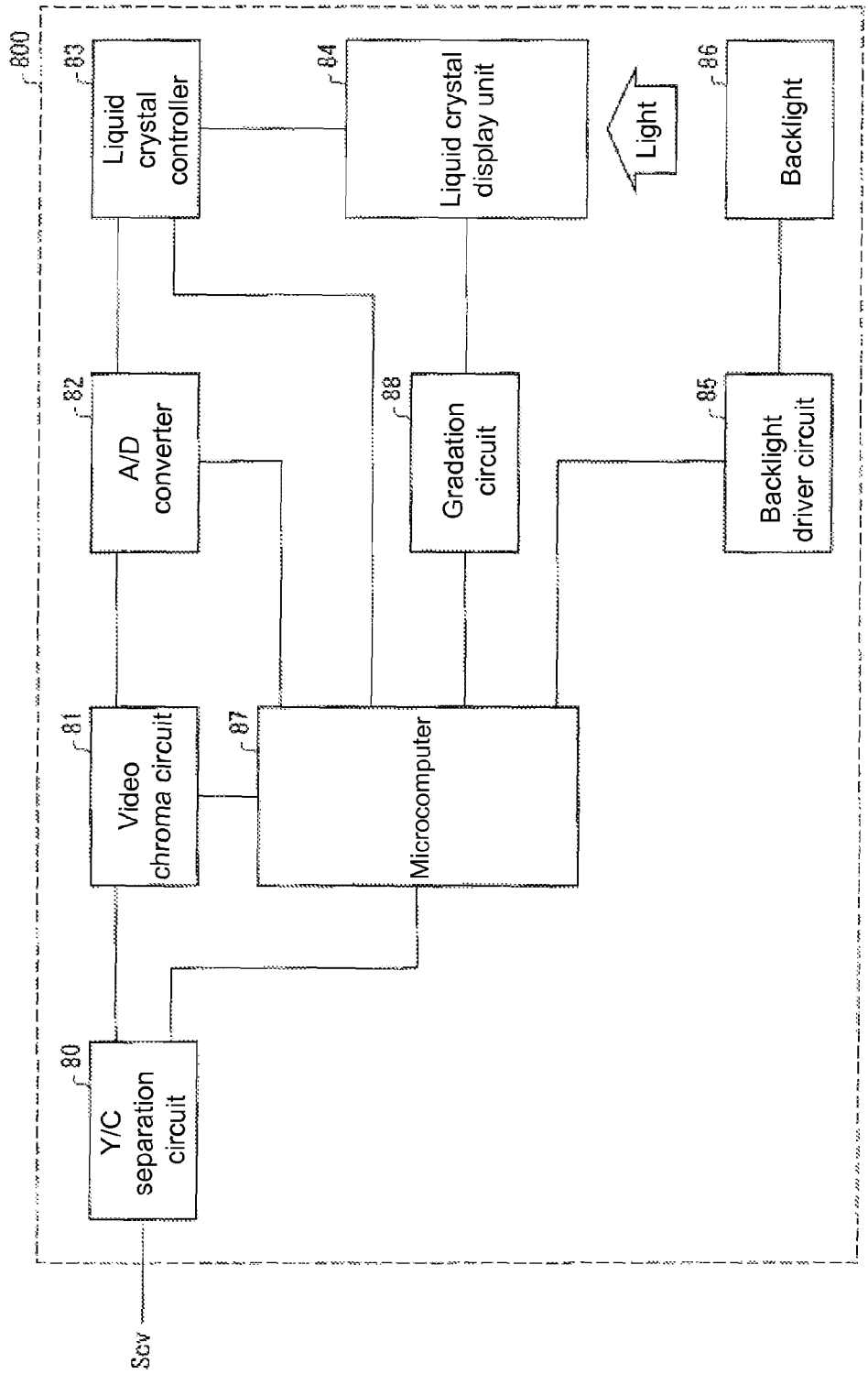
FIG. 34 is a block diagram explaining the functions of the present liquid crystal display device.

Next, a configuration example of the present liquid crystal display device as applied to a television receiver is described. FIG. 34 is a block diagram showing the configuration of a liquid crystal display device 800 for television receiver. The liquid crystal display device 800 includes a liquid crystal display unit 84, a Y/C separation circuit 80, a video chroma circuit 81, an A/D converter 82, a liquid crystal controller 83, a backlight driver circuit 85, a backlight 86, a microcomputer 87, and a gradation circuit 88. The liquid crystal display unit 84 is composed of a liquid crystal panel and a source driver and a gate driver for driving the liquid crystal panel.

In the liquid crystal display device 800 having a configuration described above, first, a composite color image signal Scv, which is a television signal, is input from outside to the Y/C separation circuit 80. There, the signal is separated into a luminance signal and a color signal. The luminance signal and the color signal are converted to analog RGB signals corresponding to three primary colors of the light by the video chroma circuit 81. Further, the analog RGB signals are converted to a digital RGB signal by the A/D converter 82. The digital RGB signal is input to the liquid crystal controller 83. In the Y/C separation circuit 80, horizontal and vertical synchronization signals are also obtained from the composite color image signal Scv, which is input from outside. These synchronization signals are also input to the liquid crystal controller 83 through the microcomputer 87.

To the liquid crystal display unit 84, the digital RGB signal is input from the liquid crystal controller 83, together with the timing signal based on the aforementioned synchronization signals at a predetermined timing. Also, in the gradation circuit 88, gradation potentials of respective three primary colors R, G, and B for color display are generated, and the gradation potentials are also supplied to the liquid crystal display unit 84. In the liquid crystal display unit 84, signals for driving (data signals=signal potentials and scan signals, and the like) are generated by the internal source driver, gate driver, and the like according to the RGB signals, the timing signals, and gradation potentials. According to the signals for driving, color images are displayed on the internal liquid crystal panel. In order for the images to be displayed by the liquid crystal display unit 84, the light needs to be radiated from behind the liquid crystal panel in the liquid crystal display unit. In the liquid crystal display device 800, the backlight driver circuit 85 drives the backlight 86 under the control of the microcomputer 87, and irradiates the backside of the liquid crystal panel with the light. Overall system control, including the processes described above, is conducted by the microcomputer 87. Not only image signals based on television broadcasting, but signals of images captured by cameras and of other images such as those supplied via internet connection can also be used as image signals input from outside (composite color image signals). In the liquid crystal display device 800, image display based on various image signals is possible.

Figure 35:
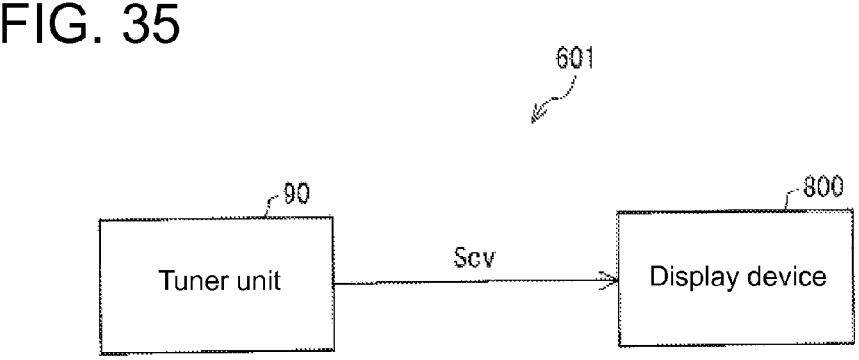
FIG. 35 is a block diagram explaining the functions of the present television receiver.

When the liquid crystal display device 800 is used to display images of television broadcasting, as shown in FIG. 35, a tuner unit 90 is connected to the liquid crystal display device 800 to constitute a television receiver 601. The tuner unit 90 extracts signals of a channel to be received from the waves (high frequency signals) received through an antenna (not shown), and converts the extracted signals to a middle frequency signal. The tuner section 90 then detects the middle frequency signal to retrieve composite color image signal Scv as a television signal. The composite color image signal Scv is input to the liquid crystal display device 800 as described above. Images according to the composite color image signal Scv are displayed by the liquid crystal display device 800.

Figure 36:
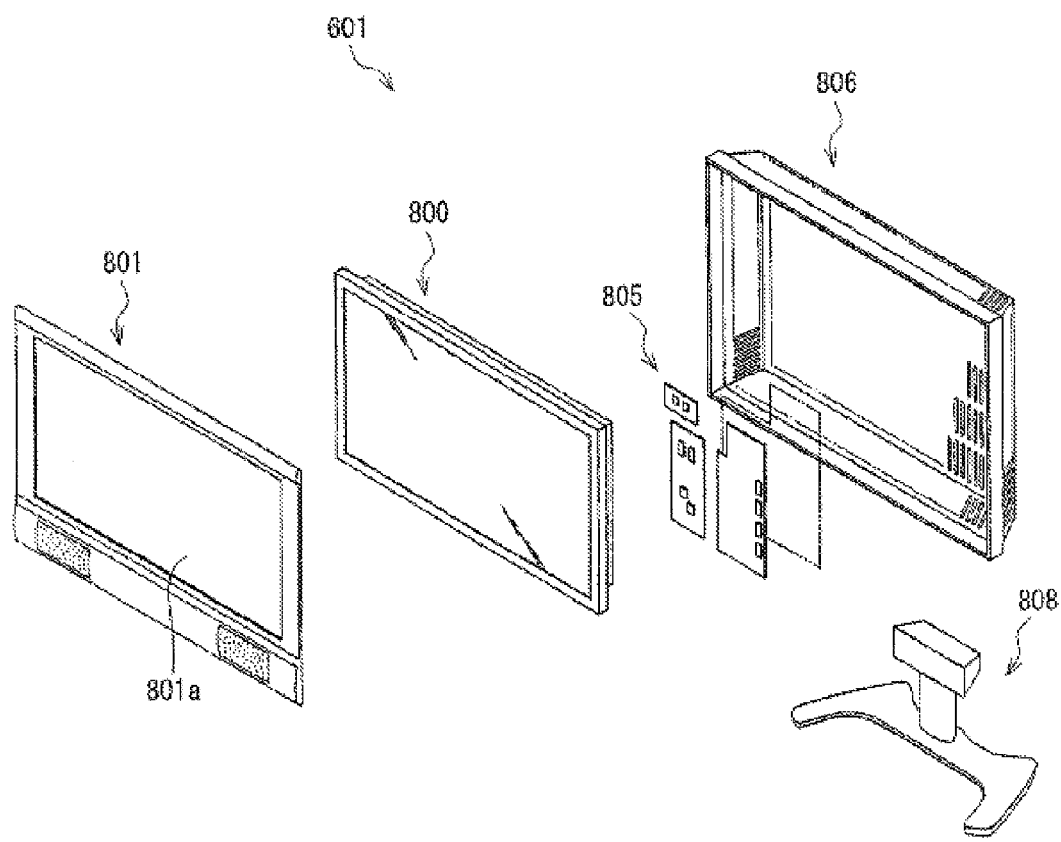
FIG. 36 is an exploded perspective view showing a configuration of a present television receiver.
Figure 37:
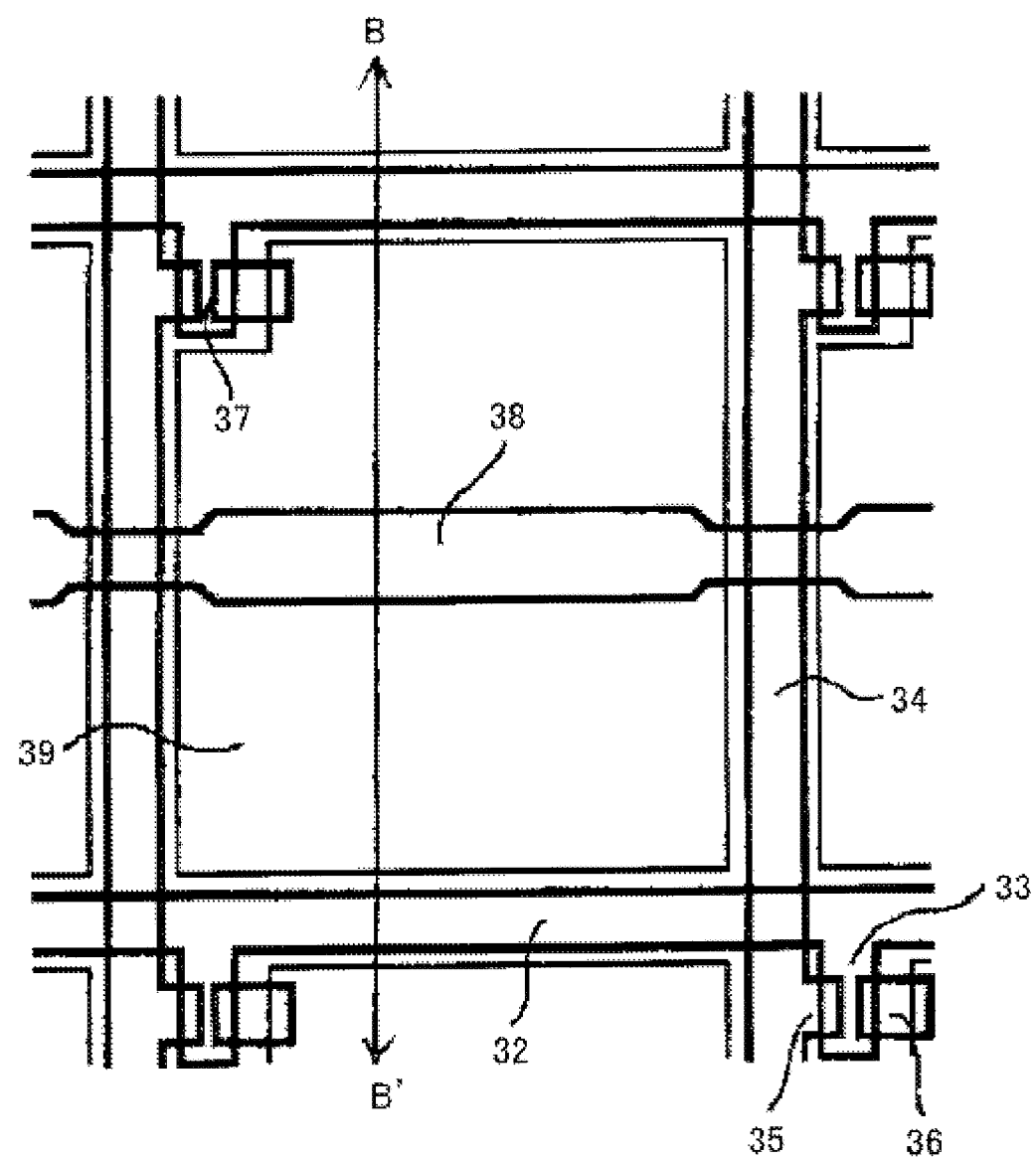
FIG. 37 is a plan view showing the configuration of a conventional liquid crystal panel.

FIG. 36 is an exploded perspective view showing a configuration example of the present television receiver. As shown in the figure, the television receiver 601 includes a first case 801 and a second case 806, in addition to the liquid crystal display device 800, as its constituting elements, and the liquid crystal display device 800 is held in the first case 801 and the second case 806. In the first case 801, there is an opening portion 801a that transmits the image to be displayed on the liquid crystal display device 800. The second case 806 covers the back side of the liquid crystal display device 800. For the second case 806, an operation circuit 805 for operating the display device 800 is provided, and a supporting member 808 is attached at the bottom.

The present invention is not limited to the embodiments described above. Any appropriate modifications of the embodiments described above based on the common technical knowledge, and any combinations of them are also included in embodiments of the present invention.

The present active matrix substrate includes scan signal lines extending in the row direction when data lines extend in the column direction, transistors connected to the data signal lines and scan signal lines, and storage capacitance wirings. In each pixel region, a first pixel electrode connected to the data signal line through the transistor is provided, and in each pixel region, a first capacitance electrode electrically connected to the first pixel electrode is provided. The storage capacitance wiring is formed in a layer between the first capacitance electrode and the first pixel electrode; the first capacitance electrode and the storage capacitance wiring overlap through a first insulating film; and the storage capacitance wiring and the first pixel electrode overlap through a second insulating film.

According to the above configuration, the storage capacitance is composed of a capacitance (first capacitance) formed where the first capacitance electrode and the storage capacitance wiring overlap, and a capacitance (second capacitance) formed where the storage capacitance wiring and the first pixel electrode overlap. As a result, in comparison to the conventional configuration (see FIG. 38), the storage capacitance value can be increased (by the amount equivalent to the first capacitance).

In the above configuration, because the storage capacitance wiring is formed in a layer between the first capacitance electrode and the first pixel electrode, the first capacitance electrode that forms the first capacitance can be disposed under the storage capacitance wiring. As a result, in comparison to the conventional configuration (see FIG. 38), the aperture ratio is not reduced.

According to the configuration described above, two storage capacitances (first and second capacitances) can be formed in the direction of the thickness of the substrate. Consequently, in comparison to the conventional configuration, the storage capacitance value can be increased without sacrificing the aperture ratio.

The present active matrix substrate may also have a configuration in which the first capacitance electrode is formed in the same layer with the scan signal line.

The present active matrix substrate may also have a configuration in which the storage capacitance wiring is formed in the same layer with the data signal line.

The present active matrix substrate may also have a configuration in which the storage capacitance wiring extends in the column direction.

The present active matrix substrate may also have a configuration in which the thickness of the second insulating film is equal to or smaller than the thickness of the first insulating film.

The present active matrix substrate may also have a configuration in which the first insulating film includes at least a gate insulating film, and a second insulating film includes at least an interlayer insulating film.

The present active matrix substrate may also have a configuration in which the first insulating film is a gate insulating film.

The present active matrix substrate may also have a configuration in which the second insulating film is an interlayer insulating film that covers a channel of the transistor.

The present active matrix substrate may also have a configuration in which the first capacitance electrode has a row direction width that is wider than the row direction width of the storage capacitance wiring when observed in a plan view.

The present active matrix substrate may also have a configuration in which neighboring pixel regions have different liquid crystal thicknesses and have different overlapping areas of the first capacitance electrode and the storage capacitance wiring according to the thicknesses of the liquid crystal layer.

The present active matrix substrate may also have a configuration in which a capacitance lead-out electrode led out from the first capacitance electrode partially overlaps the data signal line through the first insulating film.

The present active matrix substrate may also have a configuration in which a second pixel electrode connected to the first pixel electrode through a capacitance is included.

The present active matrix substrate may also have a configuration in which a second capacitance electrode electrically connected to the first pixel electrode is included, and the capacitance is formed between the second capacitance electrode and the second pixel electrode due to the overlapping of the second capacitance electrode and the second pixel electrode through the second insulating film.

The present active matrix substrate may also have a configuration in which a second capacitance electrode electrically connected to the first capacitance electrode is included, and a capacitance is formed between the second capacitance electrode and the second pixel electrode due to the overlapping of the second capacitance electrode and the second pixel electrode through the first and the second insulating films.

The present active matrix substrate may also have a configuration in which the first and second pixel electrodes are arranged in the column direction.

The present active matrix substrate may also have a configuration in which the first and second pixel electrodes are arranged in the row direction.

The present active matrix substrate may also have a configuration in which, in one of two pixel regions arranged next to each other in the column direction, the transistor is connected to one of two adjacent data signal lines, and in the other of the two pixel regions, the transistor is connected to the other of the two data signal lines.

The present active matrix substrate may also have a configuration in which the first pixel electrode provided in one of the aforementioned two pixel regions and the second pixel electrode provided in the other pixel region are adjacent to each other in the column direction.

The present active matrix substrate may also have a configuration in which the storage capacitance wiring extends in the column direction and overlaps with the first and the second pixel electrodes and the space between them.

The present active matrix substrate may also have a configuration in which a third capacitance electrode formed in the same layer with the first capacitance electrode and the scan signal line is included; the first capacitance electrode connected to the first pixel electrode through a contact hole reaches under the second pixel electrode, crossing under the storage capacitance wiring; and the third capacitance electrode connected to the second pixel electrode through a contact hole reaches under the first pixel electrode, crossing under the storage capacitance wiring.

The present active matrix substrate may also have a configuration in which the first and the third capacitance electrodes are arranged symmetrically with respect to a point or a line.

The present active matrix substrate may also have a configuration in which the first capacitance electrode is made of a transparent electrode layer.

The present active matrix substrate may also have a configuration in which the first pixel electrode and the first capacitance electrode are connected together through a contact hole that runs through the first and the second insulating films.

The present active matrix substrate may also have a configuration in which a drain lead-out electrode led out from one of the conductive electrodes of the transistor and the first pixel electrode are connected together through a contact hole, and the first pixel electrode and the first capacitance electrode are connected together through a contact hole which is different from the aforementioned contact hole.

The present active matrix substrate may also have a configuration in which the first capacitance electrode, a drain lead-out electrode led out from one of the conductive electrodes of the transistor, and the first pixel electrode are interconnected through the same contact hole running through the first and the second insulating films.

The present active matrix substrate may also have a configuration in which an opening portion of the contact hole is formed in the drain lead-out electrode, and the drain lead-out electrode is removed or notched at a location that overlaps the first capacitance electrode.

The present liquid crystal panel is characterized in that it is equipped with the aforementioned active matrix substrate. Also, the present liquid crystal display unit is characterized in that it is equipped with the aforementioned liquid crystal panel and drivers. Additionally, the present liquid crystal display device is characterized in that it includes the aforementioned liquid crystal display unit and a light source device. Also, the present television receiver is characterized in that it includes the aforementioned liquid crystal display device and a tuner unit that receives the television broadcasting.

INDUSTRIAL APPLICABILITY

An active matrix substrate of the present invention and a liquid crystal panel equipped with the active matrix substrate are suitable, for example, for a liquid crystal television.

DESCRIPTION OF REFERENCE CHARACTERS

101-104 pixel
12*a*, 12*c*, 12A, 12C transistor 15x, 15y, 15z data signal line
16x, 16y scan signal line
17a, 17b, 17c, 17d pixel electrode
17A, 17B, 17C, 17D pixel electrode
18p, 18q storage capacitance wiring
22 inorganic gate insulating film (first insulating film, second insulating film)
25 inorganic interlayer insulating film (first insulating film, second insulating film)
26 organic interlayer insulating film
40 liquid crystal layer
37a coupling capacitance electrode (second capacitance electrode)
47a capacitance electrode (first capacitance electrode)
47b capacitance electrode (third capacitance electrode)
84 liquid crystal display unit
601 television receiver
800 liquid crystal display device

The invention claimed is:

1. An active matrix substrate, comprising: scan signal lines extending in a row direction when data signal lines extend in a column direction, a transistor connected to said data signal line and the scan signal line; and a storage capacitance wiring,
    wherein, in a single pixel region, a first pixel electrode connected to said data signal line through the transistor is provided,
    wherein, in the single pixel region, a first capacitance electrode electrically connected to said first pixel electrode is provided,
    wherein said storage capacitance wiring is formed in a layer between said first capacitance electrode and said first pixel electrode,
    wherein said first capacitance electrode and said storage capacitance wiring overlap through a first insulating film, and said storage capacitance wiring and said first pixel electrode overlap through a second insulating film, and
    wherein said first insulating film is a gate insulating film.

2. The active matrix substrate according to claim 1, wherein said first capacitance electrode is formed in a same layer with said scan signal line.

3. The active matrix substrate according to claim 1, wherein said storage capacitance wiring is formed in a same layer with said data signal line.

4. The active matrix substrate according to claim 1, wherein said storage capacitance wiring extends in the column direction.

5. The active matrix substrate according to claim 1, wherein the thickness of said second insulating film is equal to or smaller than the thickness of said first insulating film.

6. The active matrix substrate according to claim 1,
    wherein said second insulating film is configured to include at least an interlayer insulating film.

7. The active matrix substrate according to claim 1, wherein said second insulating film is an interlayer insulating film that covers a channel of said transistor.

8. The active matrix substrate according to claim 1, wherein said first capacitance electrode has a row direction width that is wider than a row direction width of the storage capacitance wiring when observed in a plan view.

9. The active matrix substrate according to claim 1,
    wherein neighboring pixel regions have different liquid crystal thicknesses, and
    wherein neighboring pixel regions have different overlapping areas of the first capacitance electrode and the storage capacitance wiring in accordance with the thicknesses of a liquid crystal layer.

10. The active matrix substrate according to claim 1, wherein a capacitance lead-out electrode led out from said first capacitance electrode partially overlaps said data signal line through said first insulating film.

11. The active matrix substrate according to claim 1, further comprising a second pixel electrode connected to said first pixel electrode through a capacitance.

12. The active matrix substrate according to claim 11, further comprising a second capacitance electrode electrically connected to said first pixel electrode,
    wherein said capacitance is formed between the second capacitance electrode and the second pixel electrode due to an overlapping of the second capacitance electrode and the second pixel electrode through the second insulating film.

13. The active matrix substrate according to claim 11, further comprising a second capacitance electrode electrically connected to said first capacitance electrode,
    wherein said capacitance is formed between said second capacitance electrode and said second pixel electrode due to an overlapping of said second capacitance electrode and said second pixel electrode through said first and second insulating films.

14. The active matrix substrate according to claim 11, wherein said first and second pixel electrodes are arranged in the column direction.

15. The active matrix substrate according to claim 11, wherein said first and second pixel electrodes are arranged in the row direction.

16. The active matrix substrate according to claim 15, wherein in one of two pixel regions arranged next to each other in the column direction, said transistor is connected to one of two adjacent data signal lines, and in the other of said two pixel regions, said transistor is connected to the other of said two data signal lines.

17. The active matrix substrate according to claim 16, wherein said first pixel electrode provided in one of said two pixel regions and said second pixel electrode provided in the other pixel region are adjacent to each other in the column direction.

18. The active matrix substrate according to claim 15, wherein said storage capacitance wiring extends in the column direction and overlaps with said first and second pixel electrodes and a space between them.

19. The active matrix substrate according to claim 18, further comprising a third capacitance electrode formed in a same layer with said first capacitance electrode and said scan signal line,
    wherein said first capacitance electrode connected to said first pixel electrode through a contact hole reaches under said second pixel electrode, crossing under said storage capacitance wiring; and said third capacitance electrode connected to said second pixel electrode through a contact hole reaches under said first pixel electrode, crossing under said storage capacitance wiring.

20. The active matrix substrate according to claim 19, wherein said first and third capacitance electrodes are arranged symmetrically with respect to a point or a line.

21. The active matrix substrate according to claim 1, wherein said first capacitance electrode is made of a transparent electrode layer.

22. The active matrix substrate according to claim 1, wherein said first pixel electrode and said first capacitance electrode are connected together through a contact hole that runs through said first and second insulating films.

23. The active matrix substrate according to claim 1, wherein a drain lead-out electrode led out from one of conductive electrodes of said transistor and said first pixel electrode are inter-connected through a contact hole, and said first pixel electrode and said first capacitance electrode are connected together through a contact hole which is different from said contact hole.

24. The active matrix substrate according to claim 1, wherein said first capacitance electrode, a drain lead-out electrode led out from one of conductive electrodes of said transistor, and said first pixel electrode are inter-connected through a same contact hole running through said first and second insulating films.

25. The active matrix substrate according to claim 24, wherein an opening portion of said contact hole is formed in said drain lead-out electrode, and said drain lead-out electrode is removed or notched at a location that overlaps said first capacitance electrode.

26. A liquid crystal panel comprising the active matrix substrate according to claim 1.

27. A liquid crystal display unit comprising the liquid crystal panel according to claim 26 and drivers.

28. A liquid crystal display device comprising the liquid crystal display unit according to claim 27 and a light source device.

29. A television receiver comprising the liquid crystal display device according to claim 28 and a tuner unit receiving television broadcasting.

\* \* \* \* \*